(12) United States Patent
Wan

(10) Patent No.: US 12,710,281 B2
(45) Date of Patent: Aug. 18, 2026

(54) CROSS-DEVICE NAVIGATION TASK SYNCHRONIZATION METHOD AND APPARATUS, DEVICE, AND STORAGE MEDIUM

(71) Applicant: HUAWEI TECHNOLOGIES CO., LTD., Shenzhen (CN)

(72) Inventor: Li Wan, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/293,549

(22) PCT Filed: Oct. 21, 2022

(86) PCT No.: PCT/CN2022/126717

§ 371 (c)(1),
(2) Date: Jan. 30, 2024

(87) PCT Pub. No.: WO2023/071940

PCT Pub. Date: May 4, 2023

(65) Prior Publication Data

US 2025/0102313 A1 Mar. 27, 2025

(30) Foreign Application Priority Data

Oct. 25, 2021 (CN) ......................... 202111244792.3

(51) Int. Cl.
*G01C 21/00* (2006.01)
*G01C 21/36* (2006.01)

(52) U.S. Cl.
CPC ..... *G01C 21/3626* (2013.01); *G01C 21/3664* (2013.01)

(58) Field of Classification Search
CPC ............ G01C 21/3626; G01C 21/3664; G01C 21/3423; G01C 21/362; G01C 21/3688;

(Continued)

(56) References Cited

U.S. PATENT DOCUMENTS

2009/0157583 A1* 6/2009 Couckuyt .......... G06Q 30/0273
705/14.69
2012/0131212 A1* 5/2012 Tang .................. G01C 21/3423
709/228

(Continued)

FOREIGN PATENT DOCUMENTS

CN 107515005 A 12/2017
CN 109115235 A 1/2019

(Continued)

OTHER PUBLICATIONS

International Search Report and Written Opinion in International Appln. No. PCT/CN2022/126717, mailed on Dec. 15, 2022, 15 pages (with English translation).

(Continued)

*Primary Examiner* — Shardul D Patel
(74) *Attorney, Agent, or Firm* — Fish & Richardson P.C.

(57) ABSTRACT

This disclosure provides synchronization methods and apparatuses for cross-device navigation tasks. One method includes: a first terminal obtains navigation data from a first navigation application through a first navigation transfer module in response to a preset cross-device transmission condition is satisfied. The first terminal generates navigation synchronization information of the navigation data through the first navigation transfer module. A second terminal receives the navigation synchronization information sent by the first terminal, and transmits the navigation synchronization information to a second navigation application through a second navigation transfer module, and updates a navigation task of a second navigation application based on the navigation synchronization information.

20 Claims, 52 Drawing Sheets

(58) Field of Classification Search
CPC ...... G01C 21/00; H04W 4/80; H04L 67/1095; Y02D 30/70
USPC .......................................................... 701/451
See application file for complete search history.

(56) References Cited

U.S. PATENT DOCUMENTS

| | | | | |
|---|---|---|---|---|
| 2014/0278094 | A1* | 9/2014 | Stracke, Jr. | G01C 21/362 701/533 |
| 2014/0365901 | A1 | 12/2014 | Moha et al. | |
| 2018/0315313 | A1* | 11/2018 | Klochikhin | G08G 1/147 |
| 2021/0199459 | A1* | 7/2021 | Zhao | G01C 21/362 |

FOREIGN PATENT DOCUMENTS

| | | | |
|---|---|---|---|
| CN | 110672106 | A | 1/2020 |
| CN | 112398855 | A | 2/2021 |
| JP | 2010060504 | A | 3/2010 |
| TW | 202124914 | A | 7/2021 |
| TW | 202126070 | A | 7/2021 |
| WO | 2021017909 | A1 | 2/2021 |

OTHER PUBLICATIONS

Extended European Search Report in European Appln. No. 22885817.1, mailed on Oct. 28, 2024, 7 pages.
Office Action in Japanese Appln. No. 2024-520828, mailed on Jun. 2, 2025, 7 pages (with English translation).
EP Communication Pursuant to Article 94(3) EPC in European Appln. No. 22885817.1, mailed on Jun. 15, 2026, 11 pages.

* cited by examiner

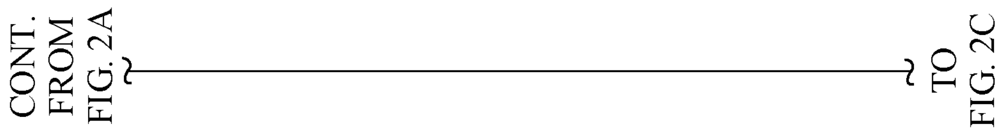
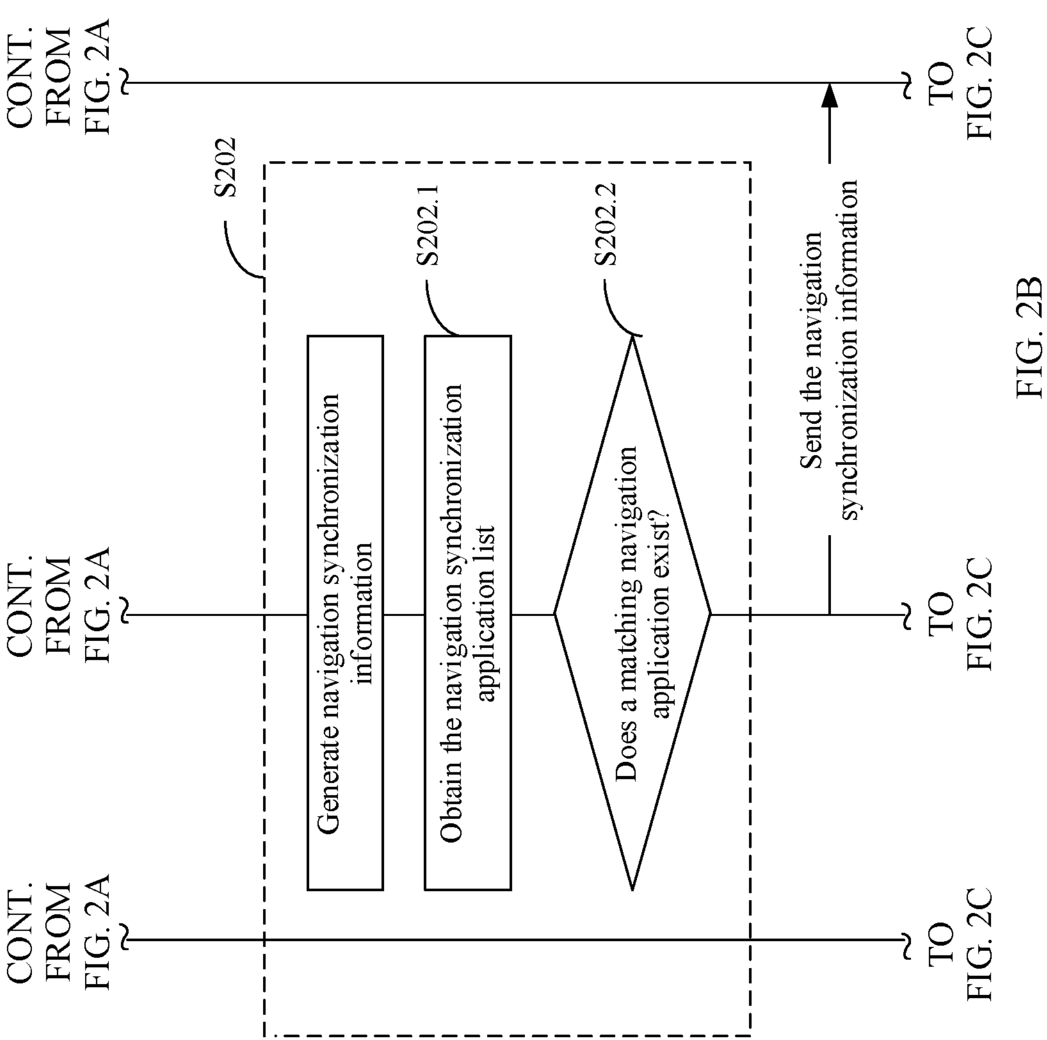
FIG. 2B

CONT FROM FIG. 3(b)-1

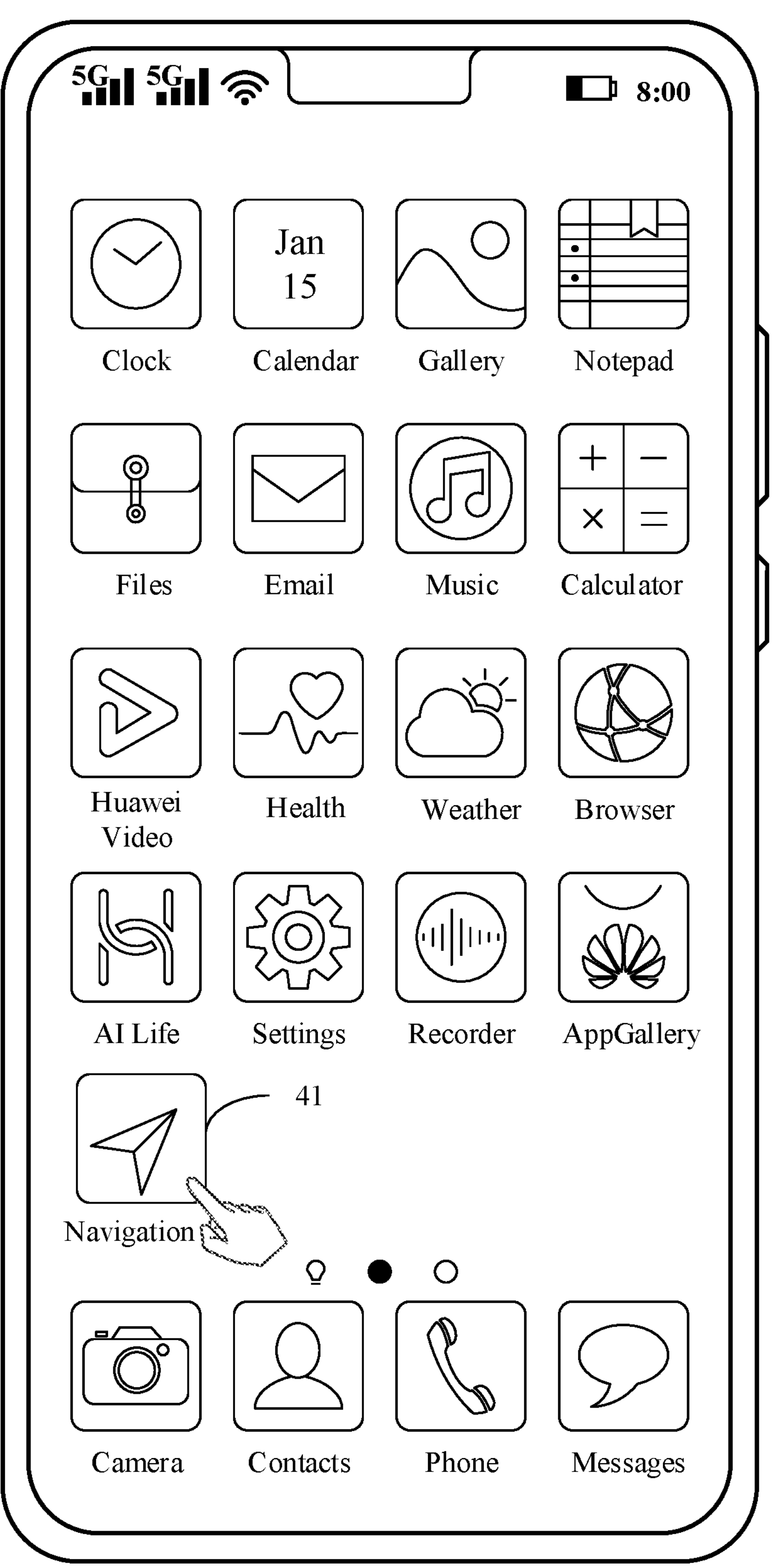
FIG. 4a(1)

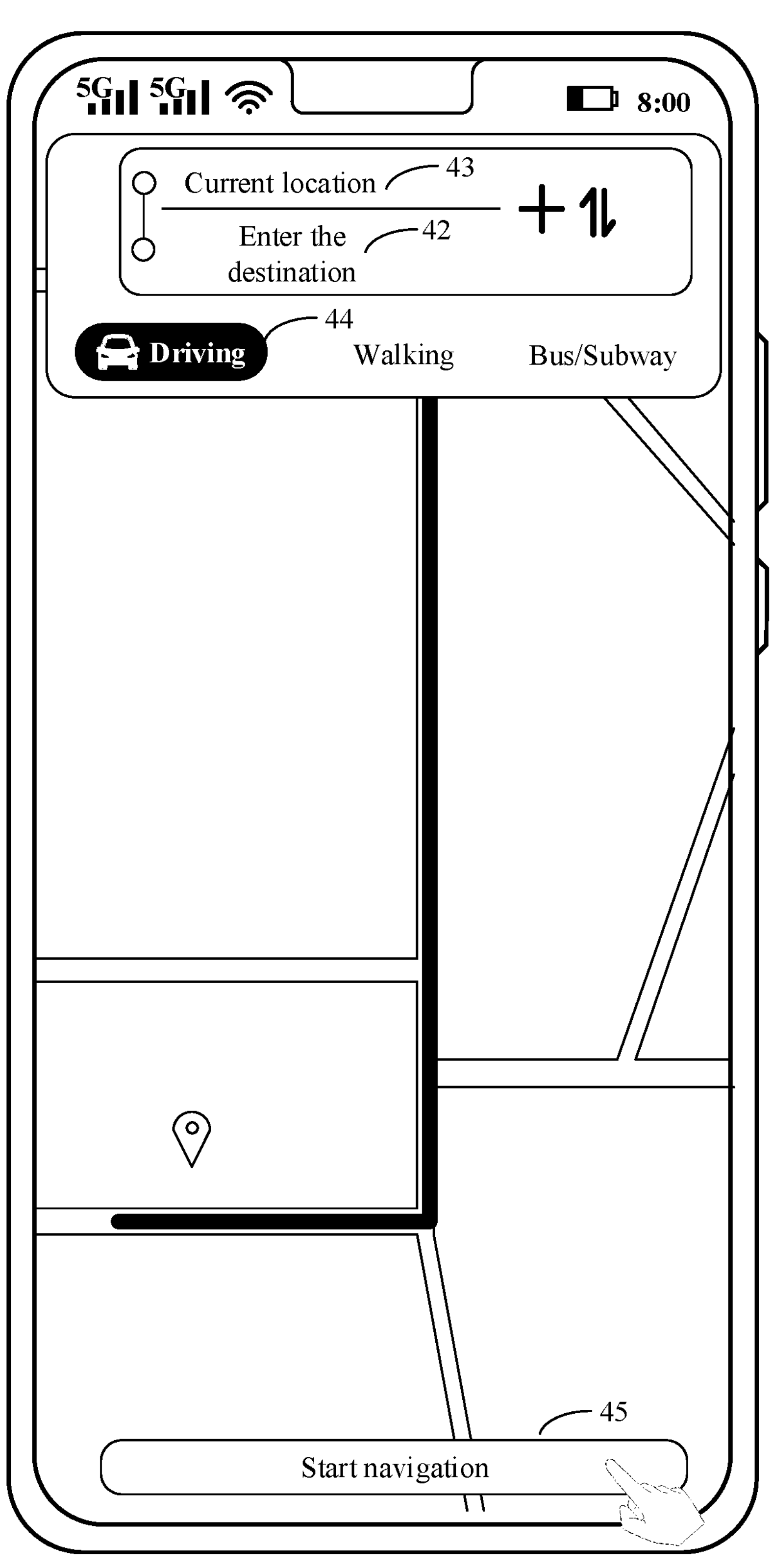
FIG. 4a(2)

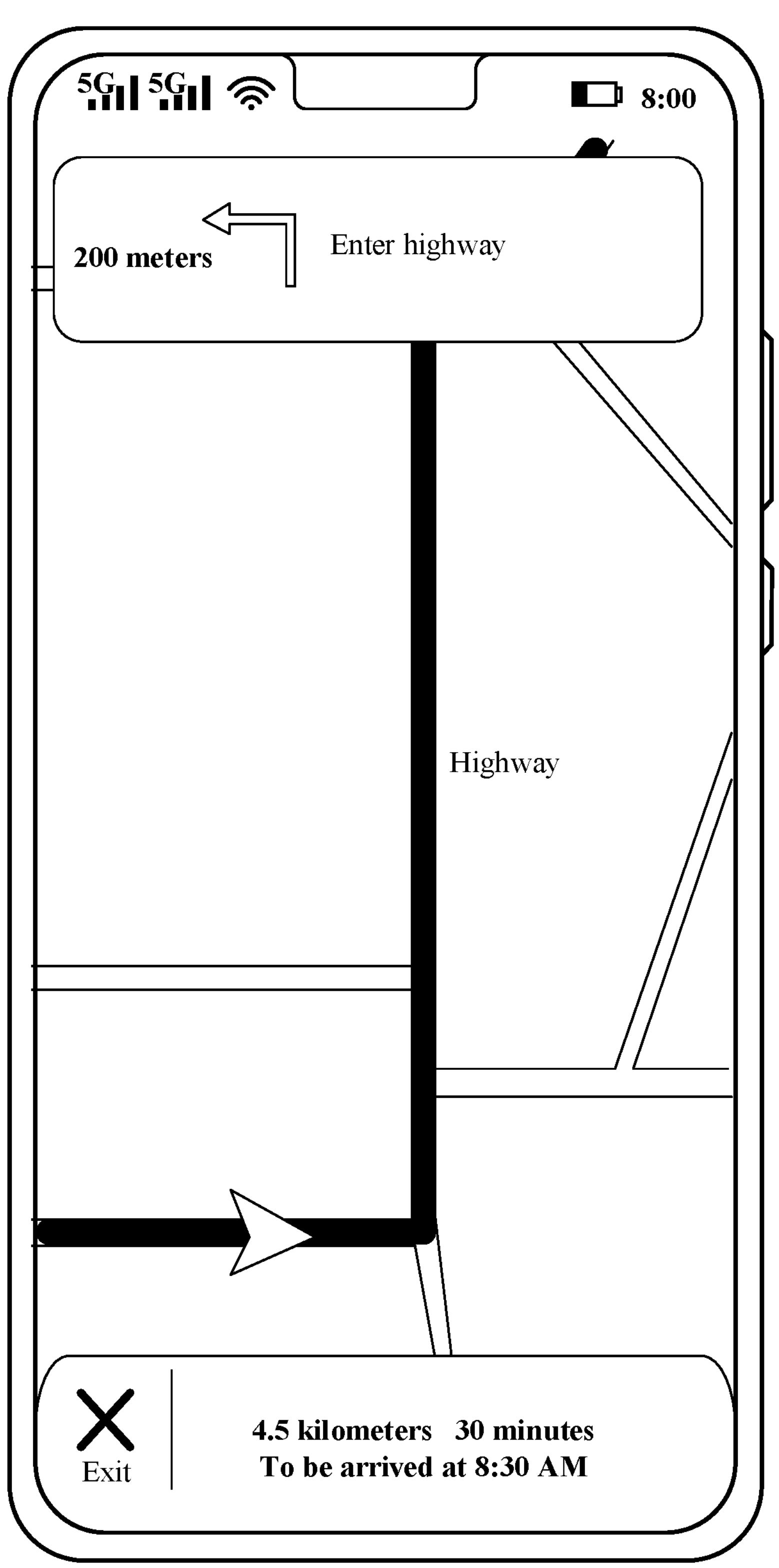
FIG. 4a(3)

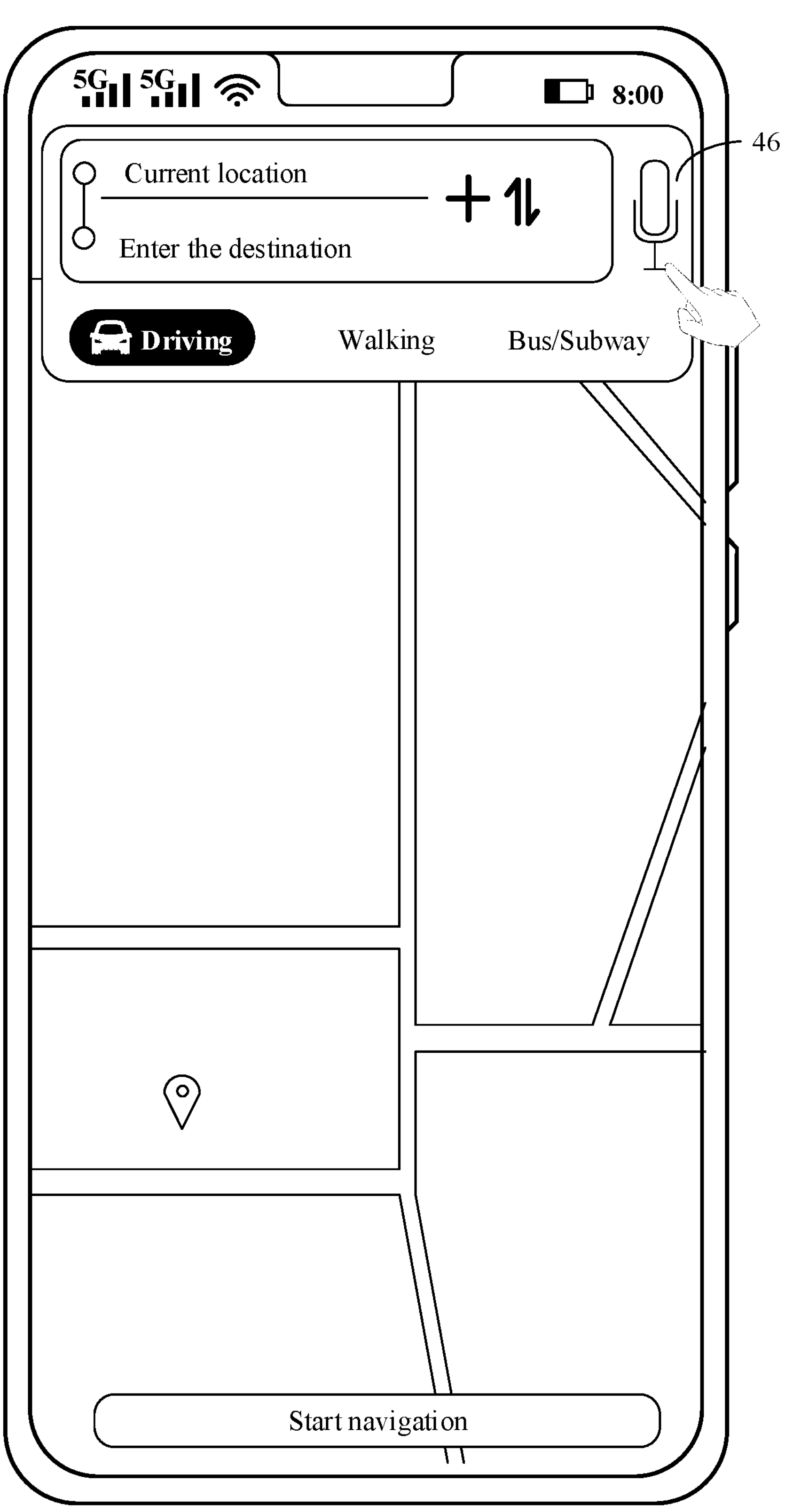
FIG. 4b(1)

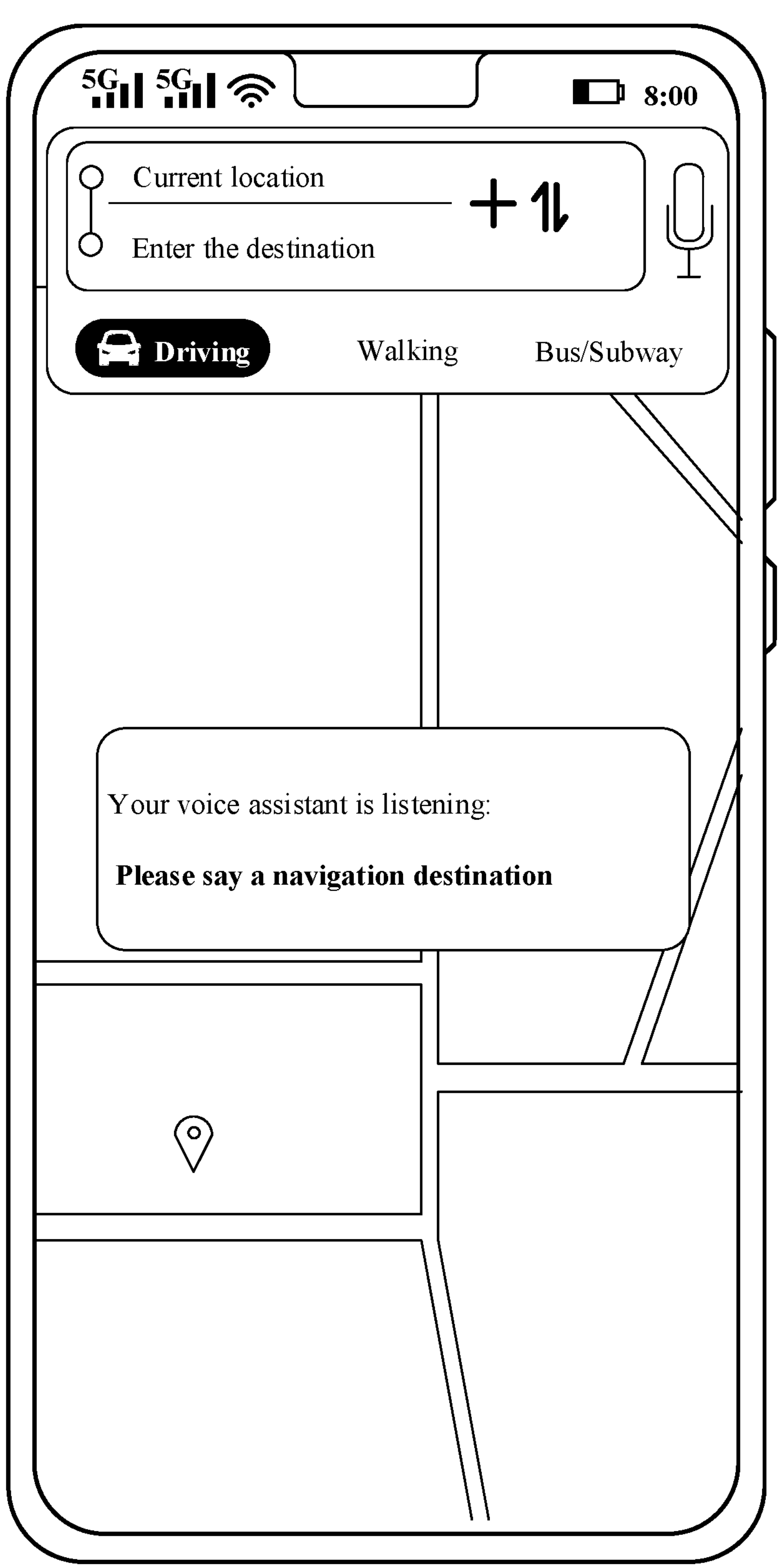
FIG. 4b(2)

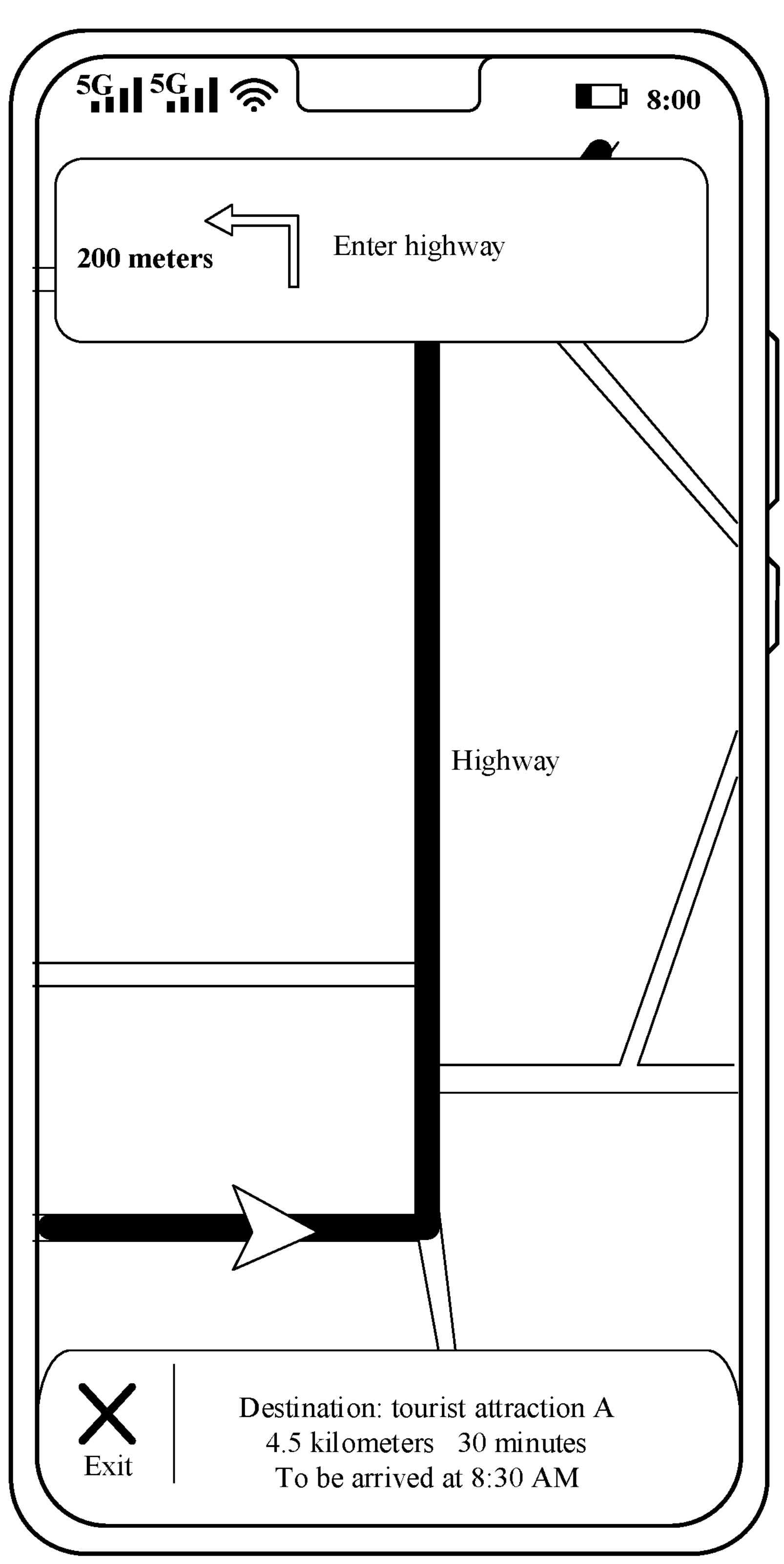
FIG. 4b(3)

CONT FROM FIG. 8(a)

CONT. FROM FIG. 8(a)

CONT. FROM FIG. 9(a)

TO FIG. 9(d)

CONT. FROM FIG. 9(a)

TO FIG. 9(d)

CONT. FROM FIG. 9(b)

CONT FROM FIG. 9(c)

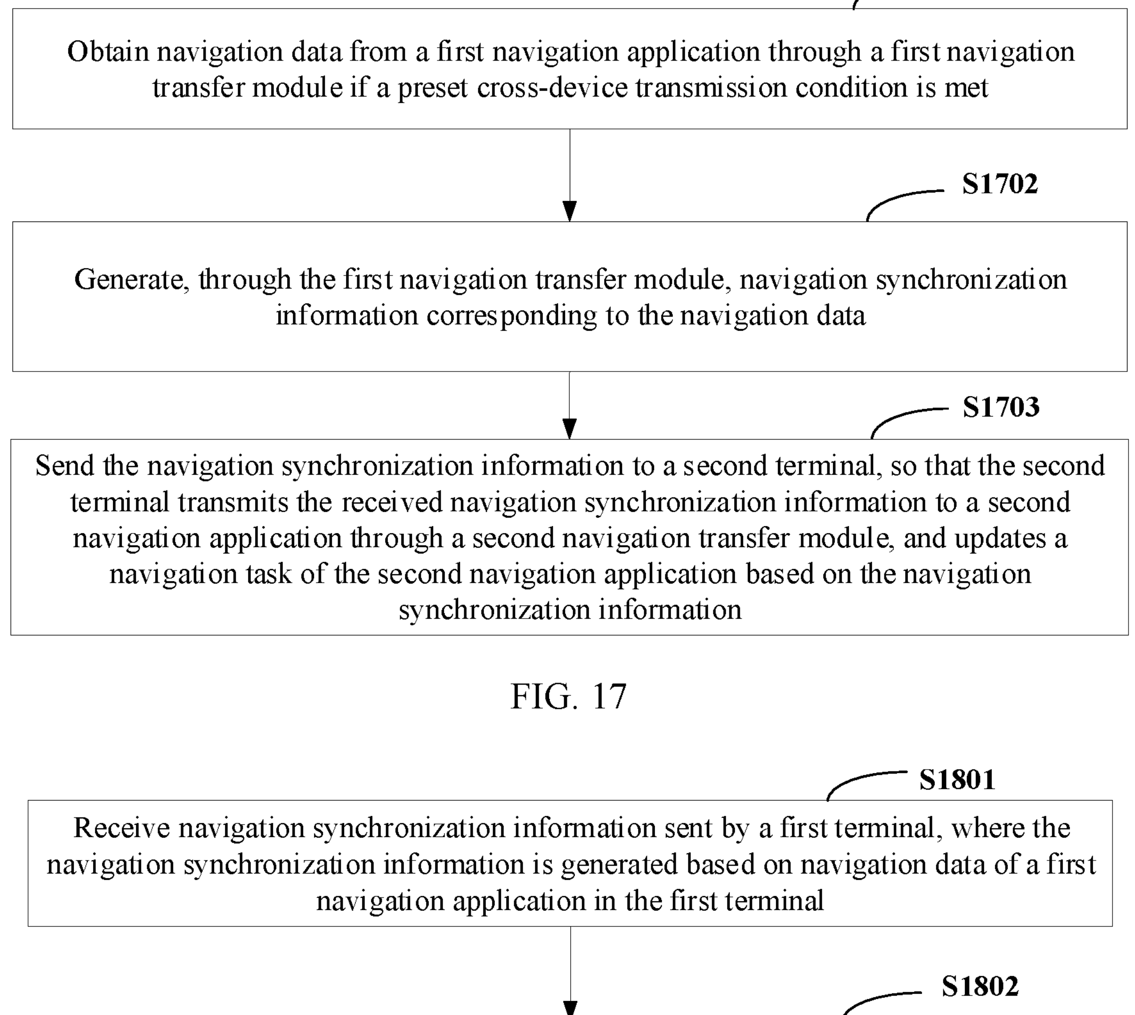

Receive navigation synchronization information sent by a first terminal, where the navigation synchronization information is generated based on navigation data of a first navigation application in the first terminal

S1802

Transmit the navigation synchronization information to a second navigation application through a second navigation transfer module

S1803

Update a navigation task of the second navigation application based on the navigation synchronization information

FIG. 18

CROSS-DEVICE NAVIGATION TASK SYNCHRONIZATION METHOD AND APPARATUS, DEVICE, AND STORAGE MEDIUM

CROSS-REFERENCE TO RELATED APPLICATIONS

This application is a national stage of International Application No. PCT/CN2022/126717, filed on Oct. 21, 2022, which claims priority to Chinese Patent Application No. 202111244792.3, filed on Oct. 25, 2021. Both of the aforementioned applications are hereby incorporated by reference in their entireties.

TECHNICAL FIELD

This application pertains to the field of device control technologies, and in particular, relates to a cross-device navigation task synchronization method and apparatus, a device, and a storage medium.

BACKGROUND

With the continuous development of navigation technologies, application scenarios of the navigation technologies continuously increase. Navigation gradually develops from initial navigation for a driven vehicle to navigation for a walking user, and is even finely classified in the application scenario field such as cycling navigation. A navigation application becomes one of indispensable important applications in the life and a work process of people. Therefore, how to quickly and conveniently complete a navigation task becomes a technical problem that urgently needs to be resolved.

For an existing navigation application, a user may set a navigation destination in a navigation application of a terminal. The navigation application may generate a navigation task based on a location of the user and the specified navigation destination, and prompt the user with a moving direction in a moving process of the user, to achieve a navigation purpose. However, in an actual navigation process of the user, there may be a plurality of different navigation scenarios, and different terminals are usually used for navigation in different navigation scenarios. For example, in a vehicle driving scenario, navigation may be performed for the user by using a navigation application in a vehicle-mounted terminal; and in a walking scenario, a navigation task may be completed for the user by using a smartphone that can be carried by the user. Therefore, if the plurality of different navigation scenarios are included in the navigation process, the user needs to set a navigation task for a plurality of times in different terminals, thereby greatly increasing configuration operations of the user and reducing navigation task setting efficiency.

SUMMARY

Embodiments of this application provide a cross-device navigation task synchronization method and apparatus, a device, and a storage medium. In this way, the following problem in navigation technologies can be resolved: In a cross-device navigation scenario, navigation task setting efficiency is low and repeated settings of a user are increased because the user needs to set a navigation task for a plurality of times.

According to a first aspect, an embodiment of this application provides a cross-device navigation task synchronization method, including:

A first terminal obtains navigation data from a first navigation application if a preset cross-device transmission condition is met.

The first terminal generates navigation synchronization information of the navigation data.

The second terminal receives the navigation synchronization information sent by the first terminal, and transmits the navigation synchronization information to a second navigation application.

The second terminal updates a navigation task of the second navigation application based on the navigation synchronization information.

In a possible implementation of the first aspect, the first terminal includes a first navigation transfer module, and the second terminal includes a second navigation transfer module.

That a first terminal obtains navigation data from a first navigation application if a preset cross-device transmission condition is met is specifically: The first terminal obtains the navigation data from the first navigation application through the first navigation transfer module if the preset cross-device transmission condition is met.

That the first terminal generates navigation synchronization information of the navigation data is specifically: The first terminal generates the navigation synchronization information of the navigation data through the first navigation transfer module.

That the second terminal receives the navigation synchronization information sent by the first terminal, and transmits the navigation synchronization information to a second navigation application is specifically: The second terminal receives the navigation synchronization information sent by the first terminal, and transmits the navigation synchronization information to the second navigation application through the second navigation transfer module.

Beneficial effect of implementing this embodiment of this application is as follows: When the first terminal detects that the cross-device transmission condition is met, the first terminal automatically obtains the navigation data of the started navigation task from the first navigation application through the local first navigation transfer module of the first terminal, generates, through the first navigation transfer module, the navigation synchronization information corresponding to the navigation data, and sends the navigation synchronization information to the second terminal, thereby implementing cross-device navigation data transmission. After receiving the navigation synchronization information, the second terminal may generate and transmit the navigation synchronization information to the second navigation application through the local second navigation transfer module, and then the second terminal may update the navigation task of the second navigation application based on the navigation synchronization information, thereby implementing cross-device navigation task synchronization. In comparison with an existing navigation technology, cross-device navigation task synchronization can be implemented in this application. In a scenario in which cross-device navigation needs to be performed, the user does not need to set a task of a navigation application of a terminal for a plurality of times. Instead, navigation data can be automatically transferred through a navigation transfer module, to update the navigation task of the navigation application, thereby greatly improving navigation task setting efficiency and reducing repeated operations of the user. In addition, after obtaining the navigation data from the first navigation application, the first navigation transfer module in the first terminal does not directly send the navigation data to the second navigation transfer module of the second terminal, but converts the navigation data into the corresponding navigation synchronization information. The navigation synchronization information can be transmitted between navigation transfer modules of different terminals. Then, the navigation synchronization information is transmitted to the second navigation application through the second navigation transfer module. The navigation synchronization information is not directly transmitted between the navigation applications of the two terminals. Therefore, a same navigation application does not need to be installed on the first terminal and the second terminal. In this way, cross-device and cross-application navigation data transfer can be implemented, thereby further improving an application scope of navigation task synchronization.

In a possible implementation of the first aspect, that the first terminal obtains the navigation data from the first navigation application through the first navigation transfer module if the preset cross-device transmission condition is met includes:

The second terminal sends a communication label to the first terminal through a second near field communication module in response to a touch operation with the first terminal. The communication label carries a navigation task synchronization start identifier.

In response to the communication label, the first terminal starts the first navigation transfer module, and obtains the navigation data from the first navigation application through the first navigation transfer module.

In a possible implementation of the first aspect, before the second terminal sends the communication label to the first terminal through the second near field communication module in response to the touch operation with the first terminal, the method further includes:

The second terminal sends a label write request to a label service thread through the second navigation transfer module if a preset label write condition is met.

The second terminal responds to the label write request through the label service thread, adds the start identifier to the communication label, and writes the communication label to the second near field communication module.

In a possible implementation of the first aspect, the second terminal is an intelligent vehicle control terminal mounted on a vehicle, and the first terminal is a user terminal carried by a user.

Correspondingly, before the first terminal obtains the navigation data from the first navigation application through the first navigation transfer module if the preset cross-device transmission condition is met, the method further includes:

The second terminal establishes a communication connection to the first terminal if the second terminal detects a door open event about the vehicle.

The second terminal obtains a navigation synchronization application list, and obtains a setting status of the second navigation transfer module if the navigation synchronization application list is not empty.

The second terminal sends a navigation transfer notification to the first terminal if the second navigation transfer module is in an on state, so that the first terminal sends the navigation synchronization information.

In a possible implementation of the first aspect, that the first terminal obtains the navigation data from the first navigation application through the first navigation transfer module if the preset cross-device transmission condition is met includes:

The first terminal receives the navigation transfer notification sent by the second terminal.

The first terminal obtains the navigation data from the first navigation application through the first navigation transfer module in response to the navigation transfer notification.

In a possible implementation of the first aspect, that the second terminal establishes a communication connection to the first terminal if the second terminal detects a door open event about the vehicle includes:

The second terminal recognizes a connection status of each registered terminal in a preset registered device list through the second navigation transfer module.

If the second terminal recognizes that the first terminal is in the registered device list and a connection status of the first terminal is a connectable state, the second terminal establishes the communication connection to the first terminal based on connection information associated with the first terminal in the registered device list.

If the second terminal recognizes that the first terminal is not in the registered device list, or the first terminal is in the registered device list and a connection status of the first terminal is an unconnectable state, the second terminal sends a wake-up instruction to the first terminal through the second near field communication module.

The first terminal receives the wake-up instruction sent by the second terminal through the second near field communication module and receives the wake-up instruction sent by the second terminal through the second near field communication module.

The first terminal sends a wireless connection request to the second terminal in response to the wake-up instruction, to establish the communication connection to the second terminal.

In a possible implementation of the first aspect, the second terminal is a user terminal carried by a user, and the first terminal is an intelligent vehicle control terminal mounted on a vehicle.

Correspondingly, that the first terminal obtains the navigation data from the first navigation application through the first navigation transfer module if the preset cross-device transmission condition is met includes:

The first terminal establishes a near field communication connection to the second terminal if the first terminal detects a parking event about the vehicle. The near field communication connection is used to send the navigation synchronization information to the second terminal.

The first terminal obtains a navigation synchronization application list, and obtains a setting status of the first navigation transfer module if the navigation synchronization application list is not empty.

The first terminal obtains the navigation data from the first navigation application through the first navigation transfer module if the first terminal recognizes that the first navigation transfer module is in an on state.

In a possible implementation of the first aspect, that the first terminal establishes a near field communication connection to the second terminal if the first terminal detects a parking event about the vehicle includes:

The first terminal recognizes a connection status of each registered terminal in a preset registered device list through the first navigation transfer module.

If the first terminal recognizes that the second terminal is in the registered device list and a connection status of the second terminal is a connectable state, the first terminal establishes the near field communication connection to the second terminal based on connection information associated with the second terminal in the registered device list.

If the first terminal recognizes that the second terminal is not in the registered device list, or the second terminal is in the registered device list and a connection status of the second terminal is an unconnectable state, the first terminal sends a wake-up instruction to the second terminal through a first near field communication module.

The second terminal sends a near field connection request to the first terminal in response to the wake-up instruction, to establish the near field communication connection to the first terminal.

In a possible implementation of the first aspect, that the second terminal receives the navigation synchronization information sent by the first terminal, and transmits the navigation synchronization information to the second navigation application through the second navigation transfer module includes:

The second terminal caches the navigation synchronization information in a cache region through the second navigation transfer module, and detects a heartbeat signal of the communication connection to the first terminal.

If the second terminal has not received the heartbeat signal within a preset valid time, the second terminal recognizes that the near field communication connection to the first terminal is broken, and transmits the navigation synchronization information to the second navigation application.

In a possible implementation of the first aspect, before the first terminal obtains the navigation data from the first navigation application through the first navigation transfer module if the preset cross-device transmission condition is met, the method further includes:

The first terminal generates a navigation task through the first navigation application in response to a navigation operation of the user. The navigation data is generated based on the navigation task.

The first terminal receives, through the first navigation transfer module, a service registration instruction transmitted by the first navigation application. The service registration instruction is used to authorize the first navigation application to have permission to transmit navigation data between devices.

In response to the service registration instruction, the first terminal adds the first navigation application to the navigation synchronization application list, and sets the first navigation transfer module to the on state. The on state is used to: when the cross-device transmission condition is met, send, to the second terminal, the navigation synchronization information generated based on the first navigation application.

In a possible implementation of the first aspect, after the second terminal receives the navigation synchronization information sent by the first terminal, transmits the navigation synchronization information to the second navigation application through the second navigation transfer module, and updates the navigation task of the second navigation application based on the navigation synchronization information, the method further includes:

The second terminal sends navigation synchronization complete information to the first terminal through the second navigation transfer module.

The first terminal transmits, to the first navigation application through the first navigation transfer module in response to the navigation synchronization complete information, an end instruction about the navigation task, to stop the navigation task of the first navigation application.

In a possible implementation of the first aspect, before the second terminal receives the navigation synchronization information sent by the first terminal, the method further includes:

The first terminal obtains a navigation application list of the second terminal. The navigation application list includes the second navigation application.

The first terminal sends the navigation synchronization information to the second terminal if the first terminal detects that a navigation application matching the first navigation application exists in the navigation application list. The navigation application matching the first navigation application is specifically an application that has permission to implement cross-device navigation data transmission with the first navigation application.

In a possible implementation of the first aspect, after the second terminal receives the navigation synchronization information sent by the first terminal, the method includes:

The second terminal detects whether a navigation application matching the first navigation application exists in the navigation application list.

If the second terminal detects that the navigation application matching the first navigation application exists in the navigation application list, the second terminal uses, as the second navigation application, the navigation application matching the first navigation application, and performs the operation of transmitting the navigation synchronization information to the second navigation application through the second navigation transfer module. The navigation application matching the first navigation application is specifically an application that has permission to implement cross-device navigation data transmission with the second navigation application.

In a possible implementation of the first aspect, that the second terminal updates a navigation task of the second navigation application based on the navigation synchronization information includes:

The second terminal determines a navigation destination based on the navigation synchronization information, and generates task update prompt information based on the navigation destination.

The second terminal updates the navigation task based on the navigation destination if the second terminal receives an update confirmation instruction fed back based on the update prompt information.

According to a second aspect, an embodiment of this application provides a cross-device navigation task synchronization method. The method is applied to a first terminal, and includes:

- obtaining navigation data from a first navigation application through a first navigation transfer module if a preset cross-device transmission condition is met;
- generating, through the first navigation transfer module, navigation synchronization information corresponding to the navigation data; and
- sending the navigation synchronization information to a second terminal, where the navigation synchronization information is used to update a navigation task of a second navigation application in the second terminal.

In this implementation, after the first terminal sends the navigation synchronization information to the second terminal, a process in which the second terminal updates the navigation task based on the navigation synchronization information is specifically: The second terminal transmits the received navigation synchronization information to the second navigation application through the second navigation transfer module, and updates the navigation task of the second navigation application based on the navigation synchronization information.

In a possible implementation of the second aspect, the obtaining navigation data from a first navigation application through a first navigation transfer module if a preset cross-device transmission condition is met includes:

in response to a touch operation with the second terminal, receiving a communication label sent by a second near field communication module of the second terminal, where the communication label carries a navigation task synchronization start identifier; and in response to the communication label, starting the first navigation transfer module, and obtaining the navigation data from the first navigation application through the first navigation transfer module.

In a possible implementation of the second aspect, the communication label is obtained after the second terminal sends a label write request to a label service thread through the second navigation transfer module when the second terminal detects that a label write condition is met, responds to the label write request through the label service thread, adds the start identifier to the communication label, and writes the communication label to the second near field communication module.

In a possible implementation of the second aspect, the obtaining navigation data from a first navigation application through a first navigation transfer module if a preset cross-device transmission condition is met includes:

receiving a navigation transfer notification sent by the second terminal, where after the second terminal is connected to the first terminal, the navigation transfer notification is sent to the first terminal when it is detected that a second navigation transfer module of the second terminal is in an on state; and obtaining the navigation data from the first navigation application through the first navigation transfer module in response to the navigation transfer notification.

In a possible implementation of the second aspect, before the receiving a navigation transfer notification sent by the second terminal, the method further includes:

receiving a wake-up instruction sent by the second terminal through a second near field communication module; and sending a wireless connection request to the second terminal in response to the wake-up instruction, to establish the communication connection to the second terminal.

In a possible implementation of the second aspect, the first terminal is an intelligent vehicle control terminal mounted on a vehicle, and the second terminal is a user terminal carried by a user.

Correspondingly, the obtaining navigation data from a first navigation application through a first navigation transfer module if a preset cross-device transmission condition is met includes:

establishing a near field communication connection to the second terminal if a parking event about the vehicle is detected, where the near field communication connection is used to send the navigation synchronization information to the second terminal;

obtaining a navigation synchronization application list, and obtaining a setting status of the first navigation transfer module if the navigation synchronization application list is not empty; and obtaining the navigation data from the first navigation application through the first navigation transfer module if the first navigation transfer module is in an on state.

In a possible implementation of the second aspect, the establishing a near field communication connection to the second terminal if a parking event about the vehicle is detected includes:

recognizing a connection status of each registered terminal in a preset registered device list through the second navigation transfer module; and if the second terminal is in the registered device list and a connection status of the second terminal is a connectable state, establishing the near field communication connection to the second terminal based on connection information associated with the second terminal in the registered device list; or if the second terminal is not in the registered device list, or the second terminal is in the registered device list and a connection status of the second terminal is an unconnectable state, sending a wake-up instruction to the second terminal through a first near field communication module, where the wake-up instruction is used to enable the second terminal to establish the communication connection to the first terminal.

In this implementation, after receiving the wake-up instruction sent by the first terminal, the second terminal establishes the communication connection to the first terminal in response to the wake-up instruction.

In a possible implementation of the second aspect, before the obtaining navigation data from a first navigation application through a first navigation transfer module if a preset cross-device transmission condition is met, the method further includes:

generating a navigation task through the first navigation application in response to a navigation operation of the user, where the navigation data is generated based on the navigation task;

receiving, through the first navigation transfer module, a service registration instruction transmitted by the first navigation application, where the service registration instruction is used to authorize the first navigation application to have permission to transmit navigation data between devices; and in response to the service registration instruction, adding the first navigation application to the navigation synchronization application list, and setting the first navigation transfer module to the on state, where the on state is used to: when the cross-device transmission condition is met, send, to the second terminal, the navigation synchronization information generated based on the first navigation application.

In a possible implementation of the second aspect, after the sending the navigation synchronization information to a second terminal, the method further includes:

receiving navigation synchronization complete information fed back by the second terminal through the second navigation transfer module; and transmitting, to the first navigation application through the first navigation transfer module in response to the navigation synchronization complete information, an end instruction about the navigation task, to stop the navigation task of the first navigation application.

In a possible implementation of the second aspect, before the sending the navigation synchronization information to a second terminal, the method further includes:

obtaining a navigation application list of the second terminal, where the navigation application list includes the second navigation application; and sending the navigation synchronization information to the second terminal if a navigation application matching the first navigation application exists in the navigation application list, where the navigation application matching the first navigation application is specifically an application that has permission to implement cross-device navigation data transmission with the first navigation application.

According to a third aspect, an embodiment of this application provides a cross-device navigation task synchronization apparatus, including:

a navigation data obtaining unit, configured to obtain navigation data from a first navigation application through a first navigation transfer module if a preset cross-device transmission condition is met;

a navigation synchronization information generating unit, configured to generate, through the first navigation transfer module, navigation synchronization information corresponding to the navigation data; and a navigation synchronization information sending unit, configured to send the navigation synchronization information to a second terminal, where the navigation synchronization information is used to update a navigation task of a second navigation application in the second terminal.

In a possible implementation of the third aspect, the navigation data obtaining unit includes:

a communication label receiving unit, configured to: in response to a touch operation with the second terminal, receive a communication label sent by a second near field communication module of the second terminal, where the communication label carries a navigation task synchronization start identifier; and a navigation transfer module starting unit, configured to: in response to the communication label, start the first navigation transfer module, and obtain the navigation data from the first navigation application through the first navigation transfer module.

In a possible implementation of the third aspect, the communication label is obtained after the second terminal sends a label write request to a label service thread through the second navigation transfer module when the second terminal detects that a label write condition is met, responds to the label write request through the label service thread, adds the start identifier to the communication label, and writes the communication label to the second near field communication module.

In a possible implementation of the third aspect, the navigation data obtaining unit includes:

a navigation transfer notification receiving unit, configured to receive a navigation transfer notification sent by the second terminal, where after the second terminal is connected to the first terminal, the navigation transfer notification is sent to the first terminal when it is detected that a second navigation transfer module of the second terminal is in an on state; and a navigation transfer notification responding unit, configured to obtain the navigation data from the first navigation application through the first navigation transfer module in response to the navigation transfer notification.

In a possible implementation of the third aspect, the navigation task synchronization apparatus further includes:

a wake-up instruction receiving unit, configured to receive a wake-up instruction sent by the second terminal through a second near field communication module; and a wake-up instruction responding unit, configured to send a wireless connection request to the second terminal in response to the wake-up instruction, to establish the communication connection to the second terminal.

In a possible implementation of the third aspect, the first terminal is an intelligent vehicle control terminal mounted on a vehicle, and the second terminal is a user terminal carried by a user.

Correspondingly, the navigation data obtaining unit includes:

a parking door open trigger unit, configured to establish a near field communication connection to the second terminal if a parking event about the vehicle is detected, where the near field communication connection is used to send the navigation synchronization information to the second terminal;

a first status recognizing unit, configured to: obtain a navigation synchronization application list, and obtain a setting status of the first navigation transfer module if the navigation synchronization application list is not empty; and a first start state responding unit, configured to obtain the navigation data from the first navigation application through the first navigation transfer module if the first navigation transfer module is in an on state.

In a possible implementation of the third aspect, the parking door open trigger unit includes:

a connection status detection unit, configured to recognize a connection status of each registered terminal in a preset registered device list through the second navigation transfer module;

a direct connection trigger unit, configured to: if the second terminal is in the registered device list and a connection status of the second terminal is a connectable state, establish the near field communication connection to the second terminal based on connection information associated with the second terminal in the registered device list; and a wake-up instruction sending unit, configured to: if the second terminal is not in the registered device list, or the second terminal is in the registered device list and a connection status of the second terminal is an unconnectable state, send a wake-up instruction to the second terminal through a first near field communication module, where the wake-up instruction is used to enable the second terminal to establish the communication connection to the first terminal.

In a possible implementation of the third aspect, the navigation task synchronization apparatus further includes:

a navigation operation responding unit, configured to generate a navigation task through the first navigation application in response to a navigation operation of the user, where the navigation data is generated based on the navigation task;

a service registration unit, configured to receive, through the first navigation transfer module, a service registration instruction transmitted by the first navigation application, where the service registration instruction is used to authorize the first navigation application to have permission to transmit navigation data between devices; and a service registration responding unit, configured to: in response to the service registration instruction, add the first navigation application to the navigation synchronization application list, and set the first navigation transfer module to the on state, where the on state is used to: when the cross-device transmission condition is met, send, to the second terminal, the navigation synchronization information generated based on the first navigation application.

In a possible implementation of the third aspect, the navigation task synchronization apparatus further includes:

a navigation synchronization complete information receiving unit, configured to receive navigation synchronization complete information fed back by the second terminal through the second navigation transfer module; and a navigation ending unit, configured to transmit, to the first navigation application through the first navigation transfer module in response to the navigation synchronization complete information, an end instruction about the navigation task, to stop the navigation task of the first navigation application.

In a possible implementation of the third aspect, the navigation task synchronization apparatus further includes:

a navigation application list obtaining unit, configured to obtain a navigation application list of the second terminal, where the navigation application list includes the second navigation application; and a navigation application matching unit, configured to send the navigation synchronization information to the second terminal if a navigation application matching the first navigation application exists in the navigation application list, where the navigation application matching the first navigation application is specifically an application that has permission to implement cross-device navigation data transmission with the first navigation application.

According to a fourth aspect, an embodiment of this application provides a cross-device navigation task synchronization method. The method is applied to a second terminal, and includes:

receiving navigation synchronization information sent by a first terminal, where the navigation synchronization information is generated based on navigation data of a first navigation application in the first terminal;

transmitting the navigation synchronization information to a second navigation application through a second navigation transfer module; and updating a navigation task of the second navigation application based on the navigation synchronization information.

In a possible implementation of the fourth aspect, the receiving navigation synchronization information sent by a first terminal includes:

sending a communication label to the first terminal through a second near field communication module in response to a touch operation with the first terminal, so that the first terminal starts a first navigation transfer module and obtains the navigation data from the first navigation application through the first navigation transfer module in response to the communication label, where the communication label carries a navigation task synchronization start identifier; and receiving the navigation synchronization information sent by the first terminal through the first navigation transfer module.

In a possible implementation of the fourth aspect, before the sending a communication label to the first terminal through a second near field communication module in response to a touch operation with the first terminal, the method further includes:

sending a label write request to a label service thread through the second navigation transfer module if a preset label write condition is met; and responding to the label write request through the label service thread, adding the start identifier to the communication label, and writing the communication label to the second near field communication module.

In a possible implementation of the fourth aspect, the second terminal is an intelligent vehicle control terminal mounted on a vehicle.

Correspondingly, before the receiving navigation synchronization information sent by a first terminal, the method further includes:

establishing a communication connection to the first terminal if a door open event about the vehicle is detected;

obtaining a navigation synchronization application list, and obtaining a setting status of the second navigation transfer module if the navigation synchronization application list is not empty; and sending a navigation transfer notification to the first terminal if the second navigation transfer module is in an on state, so that the first terminal sends the navigation synchronization information.

In a possible implementation of the fourth aspect, the establishing a communication connection to the first terminal if a door open event about the vehicle is detected includes:

recognizing a connection status of each registered terminal in a preset registered device list through the second navigation transfer module; and if the first terminal is in the registered device list and a connection status of the first terminal is a connectable state, establishing the communication connection to the first terminal based on connection information associated with the first terminal in the registered device list; or if the first terminal is not in the registered device list, or the first terminal is in the registered device list and a connection status of the first terminal is an unconnectable state, sending a wake-up instruction to the first terminal through a second near field communication module, where the wake-up instruction is used to enable the first terminal to establish the near field communication connection to the second terminal.

In this implementation, after receiving the wake-up instruction sent by the second terminal, the first terminal establishes the near field communication connection to the second terminal in response to the wake-up instruction.

In a possible implementation of the fourth aspect, the second terminal is a user terminal carried by a user, and the first terminal is an intelligent vehicle control terminal mounted on a vehicle.

Correspondingly, the transmitting the navigation synchronization information to a second navigation application through a second navigation transfer module includes:

caching the navigation synchronization information in a cache region through the second navigation transfer module, and detecting a heartbeat signal of a communication connection to the first terminal; and if the heartbeat signal is not received within a preset valid time, recognizing that a near field communication connection to the first terminal is broken, and transmitting the navigation synchronization information to the second navigation application.

In a possible implementation of the fourth aspect, after the receiving navigation synchronization information sent by a first terminal, the method further includes:

detecting whether a navigation application matching the first navigation application exists in a navigation application list, where the navigation application list includes the first navigation application; and if it is detected that the navigation application matching the first navigation application exists in the navigation application list, using, as the second navigation application, the navigation application matching the first navigation application, and performing the operation of transmitting the navigation synchronization information to the second navigation application through the second navigation transfer module, where the navigation application matching the first navigation application is specifically an application that has permission to implement cross-device navigation data transmission with the second navigation application.

In a possible implementation of the fourth aspect, the updating a navigation task of the second navigation application based on the navigation synchronization information includes:

determining a navigation destination based on the navigation synchronization information, and generating task update prompt information based on the navigation destination; and updating the navigation task based on the navigation destination if an update confirmation instruction fed back based on the update prompt information is received.

In a possible implementation of the fourth aspect, after the updating a navigation task of the second navigation application based on the navigation synchronization information, the method further includes:

sending navigation synchronization complete information to the first terminal, so that the first terminal transmits, to the first navigation application through the first navigation transfer module in response to the navigation synchronization complete information, an end instruction about a navigation task, to stop a navigation task of the first navigation application.

According to a fifth aspect, an embodiment of this application provides a cross-device navigation task synchronization apparatus, including:

a navigation synchronization information receiving unit, configured to receive navigation synchronization information sent by a first terminal, where the navigation synchronization information is generated based on navigation data of a first navigation application in the first terminal;

a navigation synchronization information transmitting unit, configured to transmit the navigation synchronization information to a second navigation application through a second navigation transfer module; and a navigation task update unit, configured to update a navigation task of the second navigation application based on the navigation synchronization information.

In a possible implementation of the fifth aspect, the navigation synchronization information receiving unit includes:

a communication label sending unit, configured to send a communication label to the first terminal through a second near field communication module in response to a touch operation with the first terminal, so that the first terminal starts a first navigation transfer module and obtains the navigation data from the first navigation application through the first navigation transfer module in response to the communication label, where the communication label carries a navigation task synchronization start identifier; and a touch operation feedback unit, configured to receive the navigation synchronization information sent by the first terminal through the first navigation transfer module.

In a possible implementation of the fifth aspect, the navigation task synchronization apparatus further includes:

a label write request unit, configured to send a label write request to a label service thread through the second navigation transfer module if a preset label write condition is met; and a communication label write unit, configured to: respond to the label write request through the label service thread, add the start identifier to the communication label, and write the communication label to the second near field communication module.

In a possible implementation of the fifth aspect, the second terminal is an intelligent vehicle control terminal mounted on a vehicle.

Correspondingly, the navigation task synchronization apparatus further includes:

a door open event trigger unit, configured to establish a communication connection to the first terminal if a door open event about the vehicle is detected;

a second status recognizing unit, configured to: obtain a navigation synchronization application list, and obtain a setting status of the second navigation transfer module if the navigation synchronization application list is not empty; and a second start state responding unit, configured to send a navigation transfer notification to the first terminal if the second navigation transfer module is in an on state, so that the first terminal sends the navigation synchronization information.

In a possible implementation of the fifth aspect, the door open event trigger unit includes:

a connection status determining unit, configured to recognize a connection status of each registered terminal in a preset registered device list through the second navigation transfer module;

a direct connection transmitting unit, configured to: if the first terminal is in the registered device list and a connection status of the first terminal is a connectable state, establish the communication connection to the first terminal based on connection information associated with the first terminal in the registered device list; and a wake-up execution unit, configured to: if the first terminal is not in the registered device list, or the first terminal is in the registered device list and a connection status of the first terminal is an unconnectable state, send a wake-up instruction to the first terminal through a second near field communication module, where the wake-up instruction is used to enable the first terminal to establish the near field communication connection to the second terminal.

In a possible implementation of the fifth aspect, the second terminal is a user terminal carried by a user, and the first terminal is an intelligent vehicle control terminal mounted on a vehicle.

Correspondingly, the navigation synchronization information transmitting unit includes:

an information caching unit, configured to: cache the navigation synchronization information in a cache region through the second navigation transfer module, and detect a heartbeat signal of a communication connection to the first terminal; and a heartbeat signal listening unit, configured to: if the heartbeat signal is not received within a preset valid time, recognize that a near field communication connection to the first terminal is broken, and transmit the navigation synchronization information to the second navigation application.

In a possible implementation of the fifth aspect, the navigation task synchronization apparatus further includes:

a matching application detection unit, configured to detect whether a navigation application matching the first navigation application exists in a navigation application list, where the navigation application list includes the first navigation application; and a second navigation application recognizing unit, configured to: if it is detected that the navigation application matching the first navigation application exists in the navigation application list, use, as the second navigation application, the navigation application matching the first navigation application, and perform the operation of transmitting the navigation synchronization information to the second navigation application through the second navigation transfer module, where the navigation application matching the first navigation application is specifically an application that has permission to implement cross-device navigation data transmission with the second navigation application.

In a possible implementation of the fifth aspect, the navigation task update unit includes:

an update prompt information generating unit, configured to: determine a navigation destination based on the navigation synchronization information, and generate task update prompt information based on the navigation destination; and an update confirmation instruction responding unit, configured to update the navigation task based on the navigation destination if an update confirmation instruction fed back based on the update prompt information is received.

In a possible implementation of the fifth aspect, the navigation task synchronization apparatus further includes:

a navigation synchronization complete information sending unit, configured to send navigation synchronization complete information to the first terminal, so that the first terminal transmits, to the first navigation application through the first navigation transfer module in response to the navigation synchronization complete information, an end instruction about a navigation task, to stop a navigation task of the first navigation application.

According to a sixth aspect, an embodiment of this application provides an electronic device, including a memory, a processor, and a computer program that is stored in the memory and that can be run on the processor. When executing the computer program, the processor implements the cross-device navigation task synchronization method according to any one of the implementations of the second aspect.

According to a seventh aspect, an embodiment of this application provides an electronic device, including a memory, a processor, and a computer program that is stored in the memory and that can be run on the processor. When executing the computer program, the processor implements the cross-device navigation task synchronization method according to any one of the implementations of the fourth aspect.

According to an eighth aspect, an embodiment of this application provides a computer-readable storage medium. The computer-readable storage medium stores a computer program. When the computer program is executed by a processor, the cross-device navigation task synchronization method according to any one of the second aspect or the fourth aspect is implemented.

According to a ninth aspect, an embodiment of this application provides a computer program product. When the computer program product is run on an electronic device, the electronic device is enabled to perform the cross-device navigation task synchronization method according to any one of the second aspect or the fourth aspect.

According to a tenth aspect, an embodiment of this application provides a chip system, including a processor. The processor is coupled to a memory. The processor executes a computer program stored in the memory, to implement the cross-device navigation task synchronization method according to any one of the second aspect or the fourth aspect.

According to an eleventh aspect, an embodiment of this application provides a cross-device navigation system, including a first terminal and a second terminal.

The first terminal is configured to obtain navigation data from a first navigation application through a first navigation transfer module if a preset cross-device transmission condition is met.

The first terminal is configured to generate navigation synchronization information of the navigation data through the first navigation transfer module.

The second terminal is configured to: receive the navigation synchronization information sent by the first terminal, and transmit the navigation synchronization information to a second navigation application through a second navigation transfer module.

The second terminal updates a navigation task of the second navigation application based on the navigation synchronization information.

In a possible implementation of the eleventh aspect, that the first terminal is configured to obtain navigation data from a first navigation application through a first navigation transfer module if a preset cross-device transmission condition is met includes:

The second terminal is configured to send a communication label to the first terminal through a second near field communication module in response to a touch operation with the first terminal, where the communication label carries a navigation task synchronization start identifier.

The first terminal is configured to: in response to the communication label, start the first navigation transfer module, and obtain the navigation data from the first navigation application through the first navigation transfer module.

In a possible implementation of the eleventh aspect, the second terminal is further configured to:

the second terminal is configured to send a label write request to a label service thread through the second navigation transfer module if a preset label write condition is met; and the second terminal is configured to: respond to the label write request through the label service thread, add the start identifier to the communication label, and write the communication label to the second near field communication module.

In a possible implementation of the eleventh aspect, the second terminal is an intelligent vehicle control terminal mounted on a vehicle, and the first terminal is a user terminal carried by a user.

Correspondingly, the second terminal is further configured to:

the second terminal is configured to establish a communication connection to the first terminal if a door open event about the vehicle is detected;

the second terminal is configured to: obtain a navigation synchronization application list, and obtain a setting status of the second navigation transfer module if the navigation synchronization application list is not empty; and the second terminal is configured to send a navigation transfer notification to the first terminal if the second navigation transfer module is in an on state, so that the first terminal sends the navigation synchronization information.

In a possible implementation of the eleventh aspect, that the first terminal is configured to obtain navigation data from a first navigation application through a first navigation transfer module if a preset cross-device transmission condition is met includes:

The first terminal is configured to receive the navigation transfer notification sent by the second terminal.

The first terminal is configured to obtain the navigation data from the first navigation application through the first navigation transfer module in response to the navigation transfer notification.

In a possible implementation of the eleventh aspect, that the second terminal is configured to establish a communication connection to the first terminal if a door open event about the vehicle is detected includes:

The second terminal is configured to recognize a connection status of each registered terminal in a preset registered device list through the second navigation transfer module.

The second terminal is configured to: if it is recognized that the first terminal is in the registered device list and a connection status of the first terminal is a connectable state, establish the communication connection to the first terminal based on connection information associated with the first terminal in the registered device list.

The second terminal is configured to: if it is recognized that the first terminal is not in the registered device list, or the first terminal is in the registered device list and a connection status of the first terminal is an unconnectable state, send a wake-up instruction to the first terminal through a second near field communication module.

The first terminal is configured to receive the wake-up instruction sent by the second terminal through the second near field communication module.

The first terminal is configured to send a wireless connection request to the second terminal in response to the wake-up instruction, to establish the communication connection to the second terminal.

In a possible implementation of the eleventh aspect, the second terminal is a user terminal carried by a user, and the first terminal is an intelligent vehicle control terminal mounted on a vehicle.

Correspondingly, that the first terminal is configured to obtain navigation data from a first navigation application through a first navigation transfer module if a preset cross-device transmission condition is met includes:

The first terminal is configured to establish a near field communication connection to the second terminal if the first terminal detects a parking event about the vehicle, where the near field communication connection is used to send the navigation synchronization information to the second terminal.

The first terminal is configured to: obtain a navigation synchronization application list, and obtain a setting status of the first navigation transfer module if the navigation synchronization application list is not empty.

The first terminal is configured to obtain the navigation data from the first navigation application through the first navigation transfer module if it is recognized that the first navigation transfer module is in an on state.

In a possible implementation of the eleventh aspect, that the first terminal is configured to establish a near field communication connection to the second terminal if a parking event about the vehicle is detected includes:

The first terminal is configured to recognize a connection status of each registered terminal in a preset registered device list through the first navigation transfer module.

The first terminal is configured to: if it is recognized that the second terminal is in the registered device list and a connection status of the second terminal is a connectable state, establish the near field communication connection to the second terminal based on connection information associated with the second terminal in the registered device list.

The first terminal is configured to: if it is recognized that the second terminal is not in the registered device list, or the second terminal is in the registered device list and a connection status of the second terminal is an unconnectable state, send a wake-up instruction to the second terminal through a first near field communication module.

The second terminal is configured to send a near field connection request to the first terminal in response to the wake-up instruction, to establish the near field communication connection to the first terminal.

In a possible implementation of the eleventh aspect, that the second terminal is configured to: receive the navigation synchronization information sent by the first terminal, and transmit the navigation synchronization information to a second navigation application through a second navigation transfer module includes:

The second terminal is configured to: cache the navigation synchronization information in a cache region through the second navigation transfer module, and detect a heartbeat signal of the communication connection to the first terminal.

The second terminal is configured to: if the heartbeat signal is not received within a preset valid time, recognize that a near field communication connection to the first terminal is broken, and transmit the navigation synchronization information to the second navigation application.

In a possible implementation of the eleventh aspect, the first terminal is further configured to:

the first terminal is configured to generate a navigation task through the first navigation application in response to a navigation operation of the user, where the navigation data is generated based on the navigation task;

the first terminal is configured to receive, through the first navigation transfer module, a service registration instruction transmitted by the first navigation application, where the service registration instruction is used to authorize the first navigation application to have permission to transmit navigation data between devices; and the first terminal is configured to: in response to the service registration instruction, add the first navigation application to the navigation synchronization application list, and set the first navigation transfer module to the on state, where the on state is used to: when the cross-device transmission condition is met, send, to the second terminal, the navigation synchronization information generated based on the first navigation application.

In a possible implementation of the eleventh aspect, the first terminal and the second terminal are further configured to:

the second terminal is configured to send navigation synchronization complete information to the first terminal through the second navigation transfer module; and the first terminal is configured to transmit, to the first navigation application through the first navigation transfer module in response to the navigation synchronization complete information, an end instruction about the navigation task, to stop the navigation task of the first navigation application.

In a possible implementation of the eleventh aspect, before the second terminal receives the navigation synchronization information sent by the first terminal, the following is further included:

The first terminal is configured to obtain a navigation application list of the second terminal, where the navigation application list includes the second navigation application.

The first terminal is configured to send the navigation synchronization information to the second terminal if it is detected that a navigation application matching the first navigation application exists in the navigation application list. The navigation application matching the first navigation application is specifically an application that has permission to implement cross-device navigation data transmission with the first navigation application.

In a possible implementation of the eleventh aspect, the second terminal is further configured to:

the second terminal is configured to detect whether a navigation application matching the first navigation application exists in a navigation application list; and the second terminal is configured to: if the second terminal detects that the navigation application matching the first navigation application exists in the navigation application list, use, as the second navigation application, the navigation application matching the first navigation application, and perform the operation of transmitting the navigation synchronization information to the second navigation application through the second navigation transfer module, where the navigation application matching the first navigation application is specifically an application that has permission to implement cross-device navigation data transmission with the second navigation application.

In a possible implementation of the eleventh aspect, that the second terminal updates a navigation task of the second navigation application based on the navigation synchronization information includes:

The second terminal is configured to: determine a navigation destination based on the navigation synchronization information, and generate task update prompt information based on the navigation destination.

The second terminal is configured to update the navigation task based on the navigation destination if an update confirmation instruction fed back based on the update prompt information is received.

It may be understood that, for beneficial effect of the second aspect to the eleventh aspect, reference may be made to the related description in the first aspect. Details are not described herein again.

BRIEF DESCRIPTION OF DRAWINGS

FIG. 3(*b*)-1 and FIG. 3(*b*)-2 are a schematic diagram of a cross-device navigation data transmission scenario according to another embodiment of this application;

FIG. 4*a*(1), FIG. 4*a*(2), and FIG. 4*a*(3) are a schematic diagram of initiating a navigation task according to an embodiment of this application;

FIG. 4*b*(1), FIG. 4*b*(2), and FIG. 4*b*(3) are a schematic diagram of initiating a navigation task according to an embodiment of this application;

FIG. 17 is a flowchart of implementation of a cross-device navigation data synchronization method performed by a first terminal according to an embodiment of this application;

FIG. 18 is a flowchart of implementation of a cross-device navigation data synchronization method performed by a second terminal according to an embodiment of this application;

DESCRIPTION OF EMBODIMENTS

Figure 1:
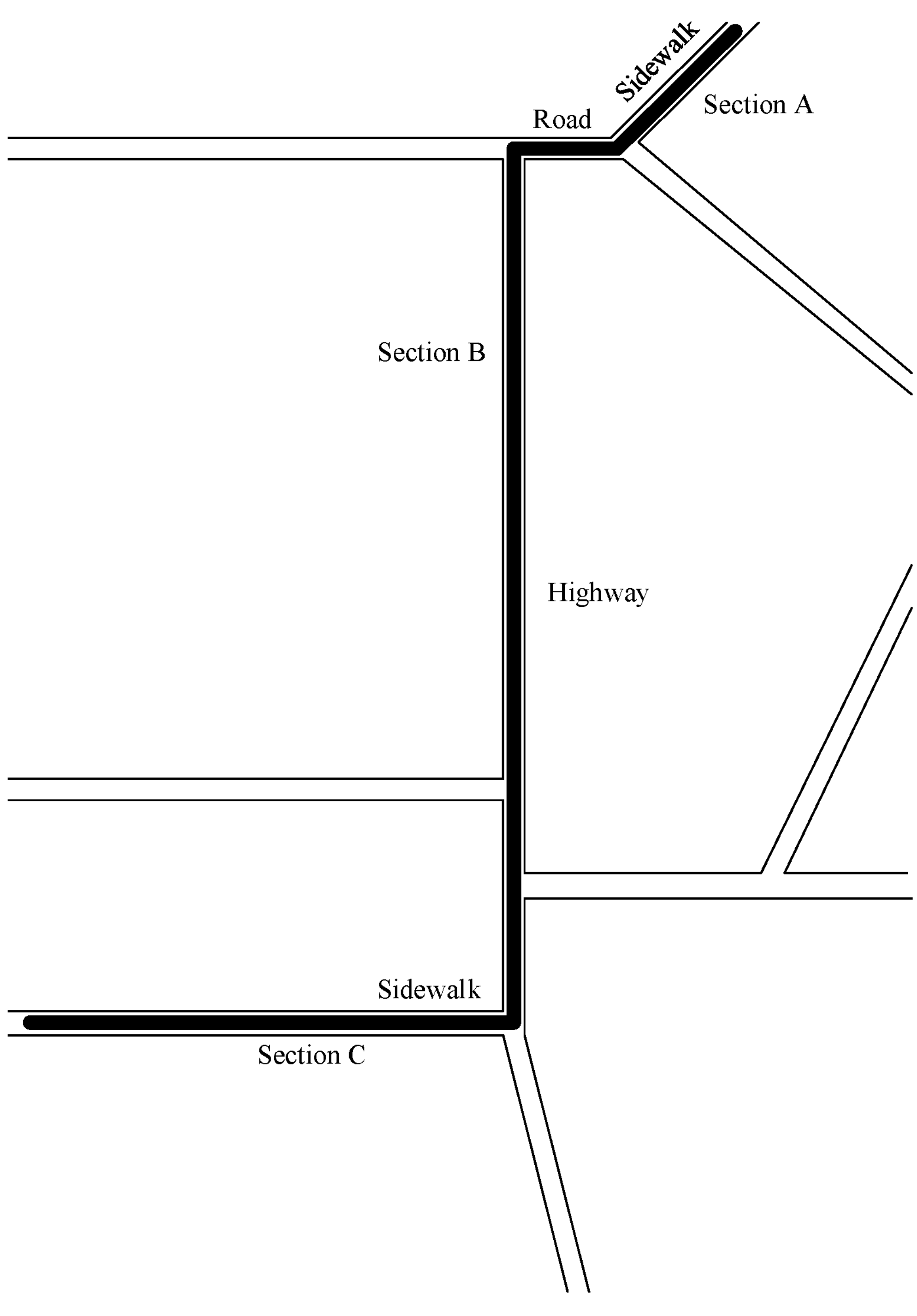
FIG. 1 is a schematic diagram of a navigation route according to an embodiment of this application.

In the following description, for illustration instead of limitation, specific details such as a specific system structure and a technology are provided for thorough understanding of embodiments of this application. However, persons skilled in the art should know that this application may also be implemented in other embodiments without these specific details. In other cases, detailed description of well-known systems, apparatuses, circuits, and methods are omitted, so that this application is described without being obscured by unnecessary details.

It should be understood that the term "include" used in the specification and the appended claims of this application indicates presence of the described feature, entirety, step, operation, element, and/or component, but does not exclude presence or addition of one or more other features, entireties, steps, operations, elements, components, and/or sets thereof.

It should also be understood that the term "and/or" used in the specification and the appended claims of this application indicates any combination and all possible combinations of one or more associated listed items, and includes these combinations.

As used in the specification and the appended claims of this application, the term "if" may be interpreted as "when", "once", "in response to determining", or "in response to detecting" based on the context. Likewise, the phrase "if it is determined that" or "if (a described condition or event) is detected" may be interpreted as a meaning of "once it is determined that", "in response to determining", "once (a described condition or event) is detected", or "in response to detecting (a described condition or event)" based on the context.

In addition, in the description of the specification and the appended claims of this application, the terms "first", "second", "third", and the like are merely intended for a purpose of differentiated description, but shall not be understood as an indication or an implication of relative importance.

Reference to "an embodiment", "some embodiments", or the like described in the specification of this application indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean reference to a same embodiment. Instead, the statements mean "one or more but not all of embodiments", unless otherwise specifically emphasized in another manner. The terms "include", "comprise", "have", and their variants all mean "include but is not limited to", unless otherwise specifically emphasized in another manner.

With continuous development of navigation technologies, application scenarios of a navigation application increase and cover all aspects of life and work of people. However, when application scenarios of the navigation technologies continuously increase, complexity of the scenarios increases accordingly. A same navigation route may include different navigation scenarios such as walking, cycling, driving, and bus. In different scenarios, navigation usually needs to be performed by using navigation applications of different terminals. For example, in a walking navigation scenario, a user may use a navigation application in a smartphone for navigation. However, in a driving navigation scenario, the user may use a navigation application in a vehicle-mounted terminal to complete navigation.

For example, a navigation task is used as an example for description. During traveling, the user needs to go to a tourist attraction, and may enter a corresponding destination into a navigation application in any terminal. The navigation application may generate a corresponding navigation task based on the navigation destination and an initial location, and instruct the user in real time to go to the navigation destination. FIG. 1 is a schematic diagram of a navigation route according to an embodiment of this application. With reference to FIG. 1, a start point of the navigation route is a home, a destination is a tourist attraction, and the navigation route includes a sidewalk, a road, and a highway. On a sidewalk section of the navigation route, that is, a section A and a section C, a user needs to move in a walking manner. On a section of the road and the highway, that is, a section B, the user needs to move in a driving manner. Therefore, in an entire navigation process, the user may first enter a destination, that is, the tourist attraction, into a navigation application in a portable smartphone, and complete walking on the section A. Then, when the user completes walking on the section A and comes to the section B, the user may switch from the walking manner to the driving manner to complete driving on the section B. Therefore, navigation of the section B may be performed for the user by using a navigation application in a vehicle-mounted terminal in the vehicle. In this case, the user needs to enter the destination again in the navigation application in the vehicle-mounted terminal. Finally, when the user completes driving on the section B and comes to the section C, the user needs to switch from the driving manner to the walking manner. In this case, the user needs to enter the destination into the smartphone again.

It can be learned that, when the navigation task includes a plurality of navigation scenarios, if navigation is completed by using different terminals in different navigation scenarios, the user needs to enter a navigation destination on different terminals for a plurality of times in an entire navigation task process. As a result, the user needs to perform a plurality of repeated navigation task setting operations, thereby reducing navigation efficiency.

Embodiment 1

Therefore, to resolve a defect of an existing cross-device navigation task synchronization technology, this application provides a cross-device navigation task synchronization method. The cross-device navigation task synchronization method may be specifically performed by two terminal devices: a first terminal and a second terminal. The terminal device may be an electronic device such as a smartphone, an intelligent vehicle control terminal (vehicle-mounted terminal for short) mounted on a vehicle, a tablet computer, a smartwatch, or a smart band. A navigation application is installed on the terminal device. A navigation task initiated by a user may be executed by using the navigation application.

It should be noted that the first terminal and the second terminal may be the same type of terminals. For example, the first terminal is a smartphone, and the second terminal is also a smartphone. Certainly, alternatively, the first terminal and the second terminal may be different types of terminals. For example, the first terminal is a smartphone, and the second terminal is a vehicle-mounted terminal; or the first terminal may be a vehicle-mounted terminal, and the second terminal is a smartphone. Herein, terminal types of the first terminal and the second terminal are not limited, and appropriate terminal types may be selected according to an actual navigation scenario.

Figure 2A:
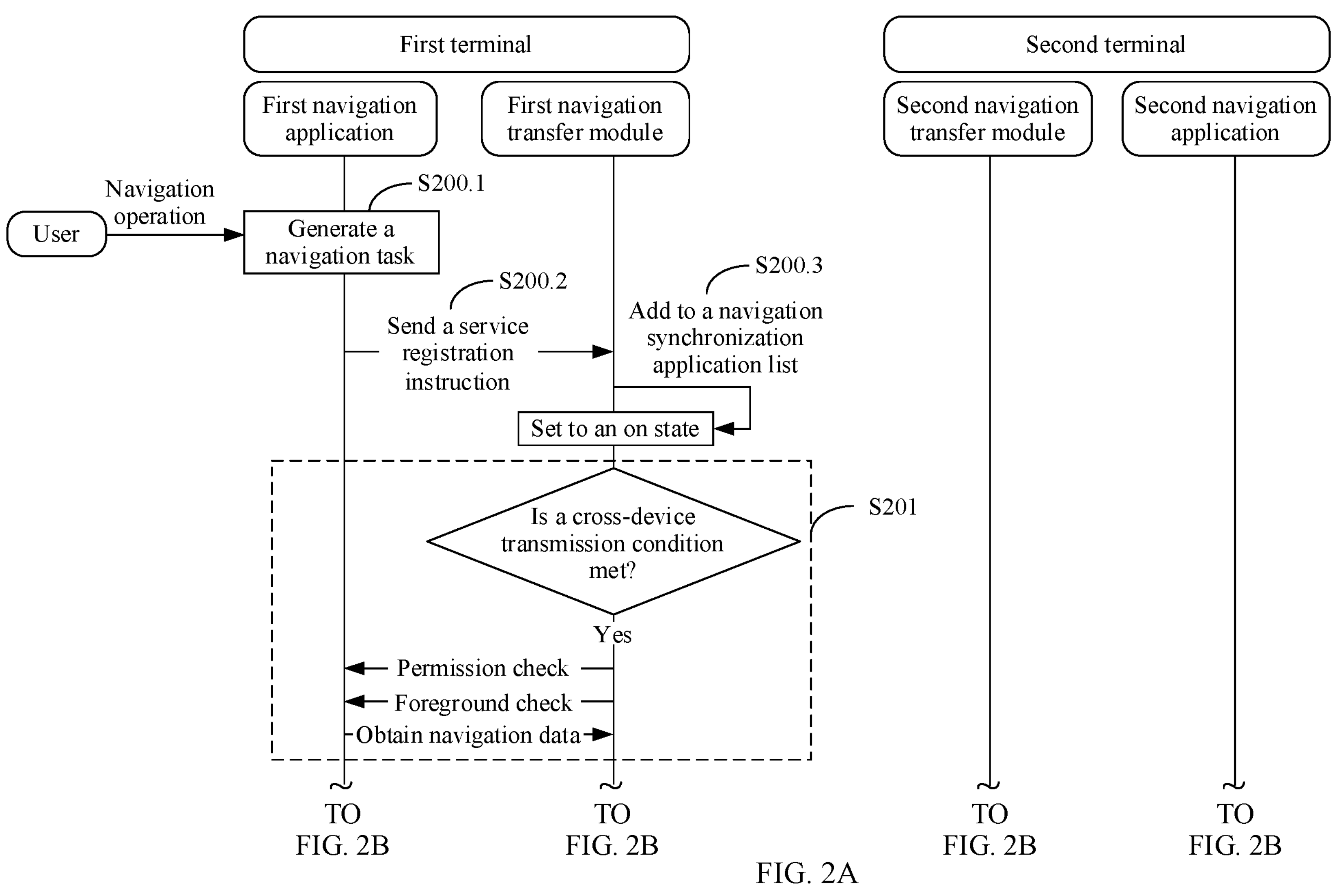
FIG. 2A, FIG. 2B, and FIG. 2C are a flowchart of an interaction in a cross-device navigation task synchronization method according to an embodiment of this application.
Figure 2C:
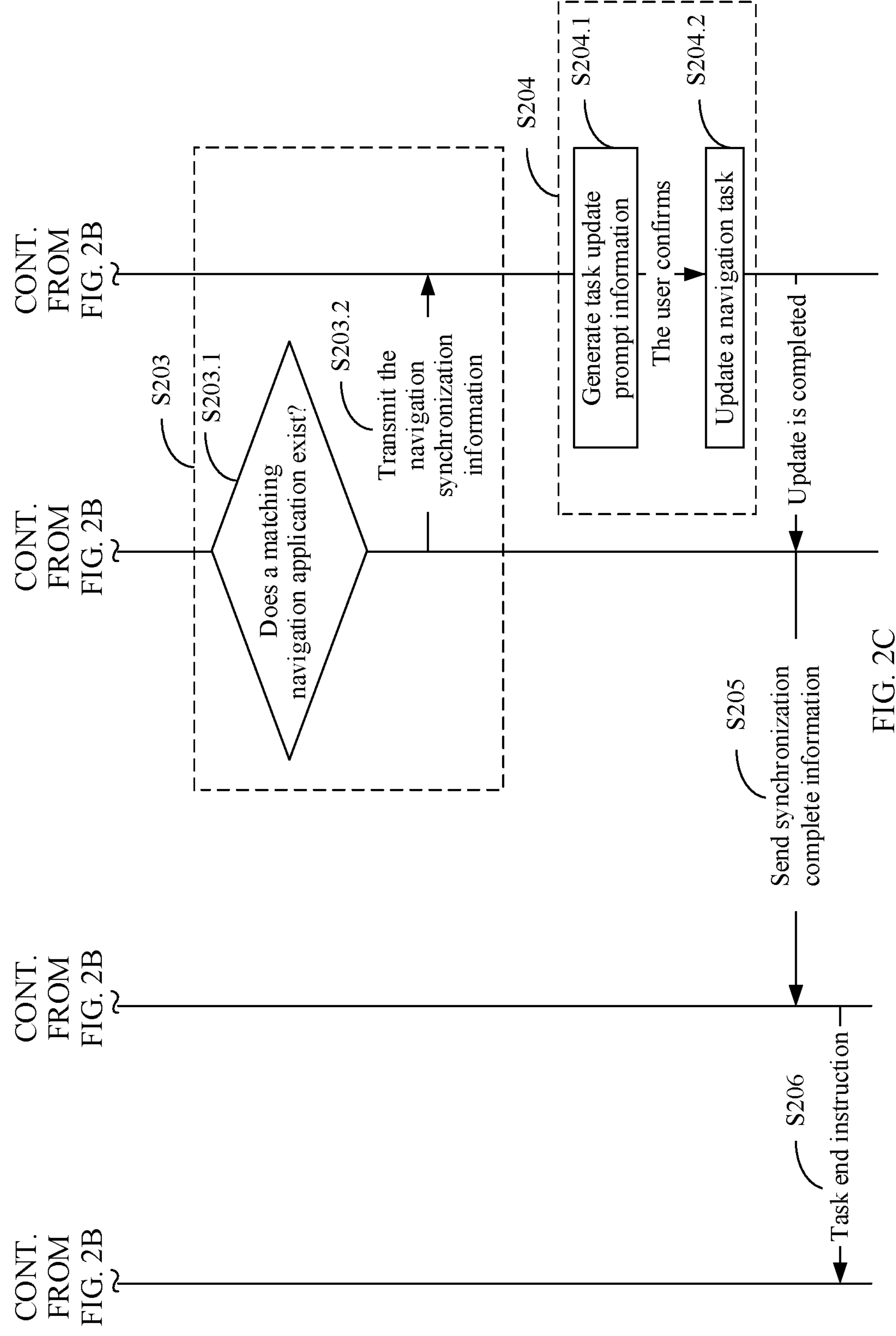
Figures 1, 3A:
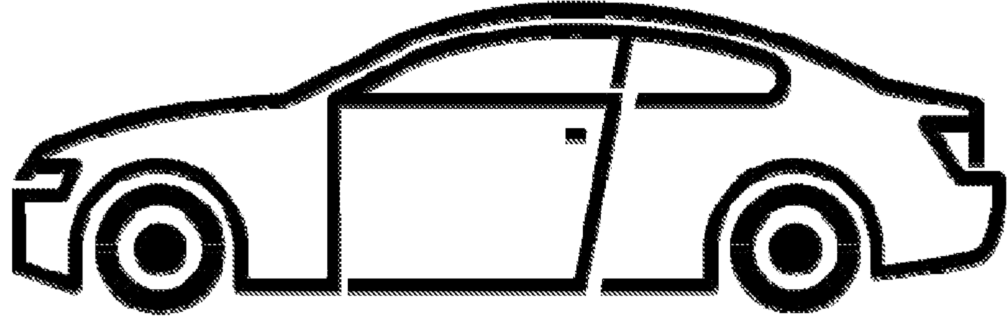
Figures 2, 3A:
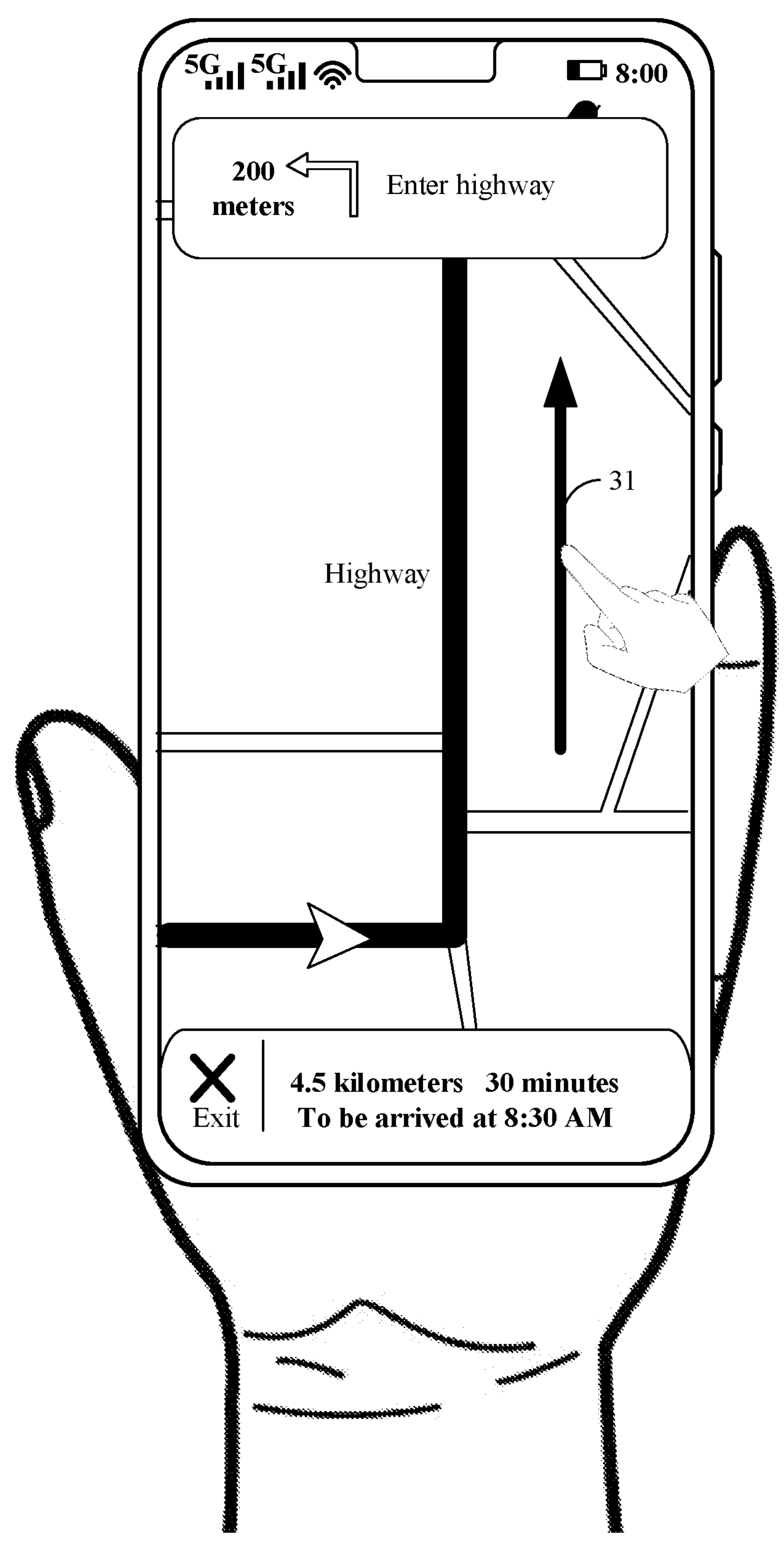
FIG. 3(*a*)-1 and FIG. 3(*a*)-2 are a schematic diagram of a cross-device navigation data transmission scenario according to an embodiment of this application.
Figures 1, 3B:
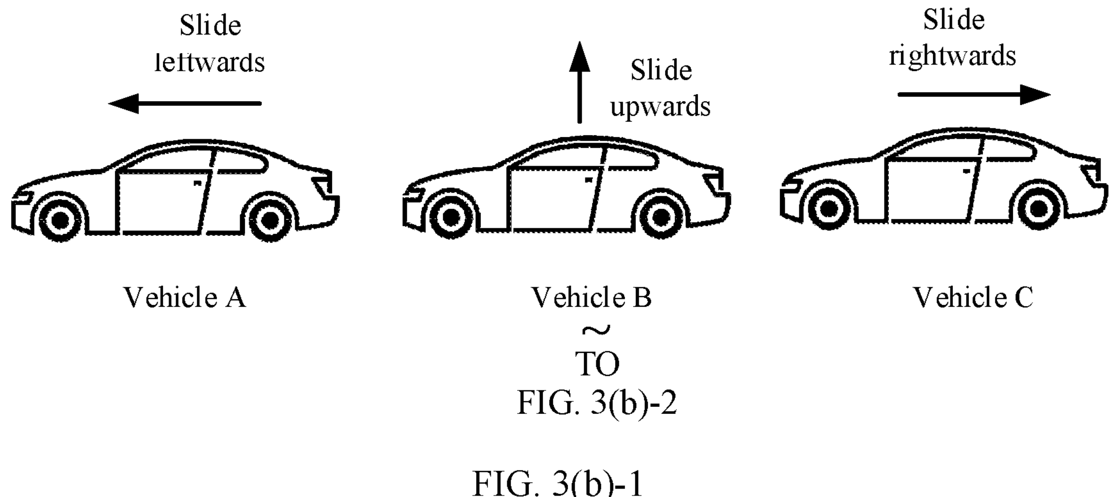
Figures 2, 3B:
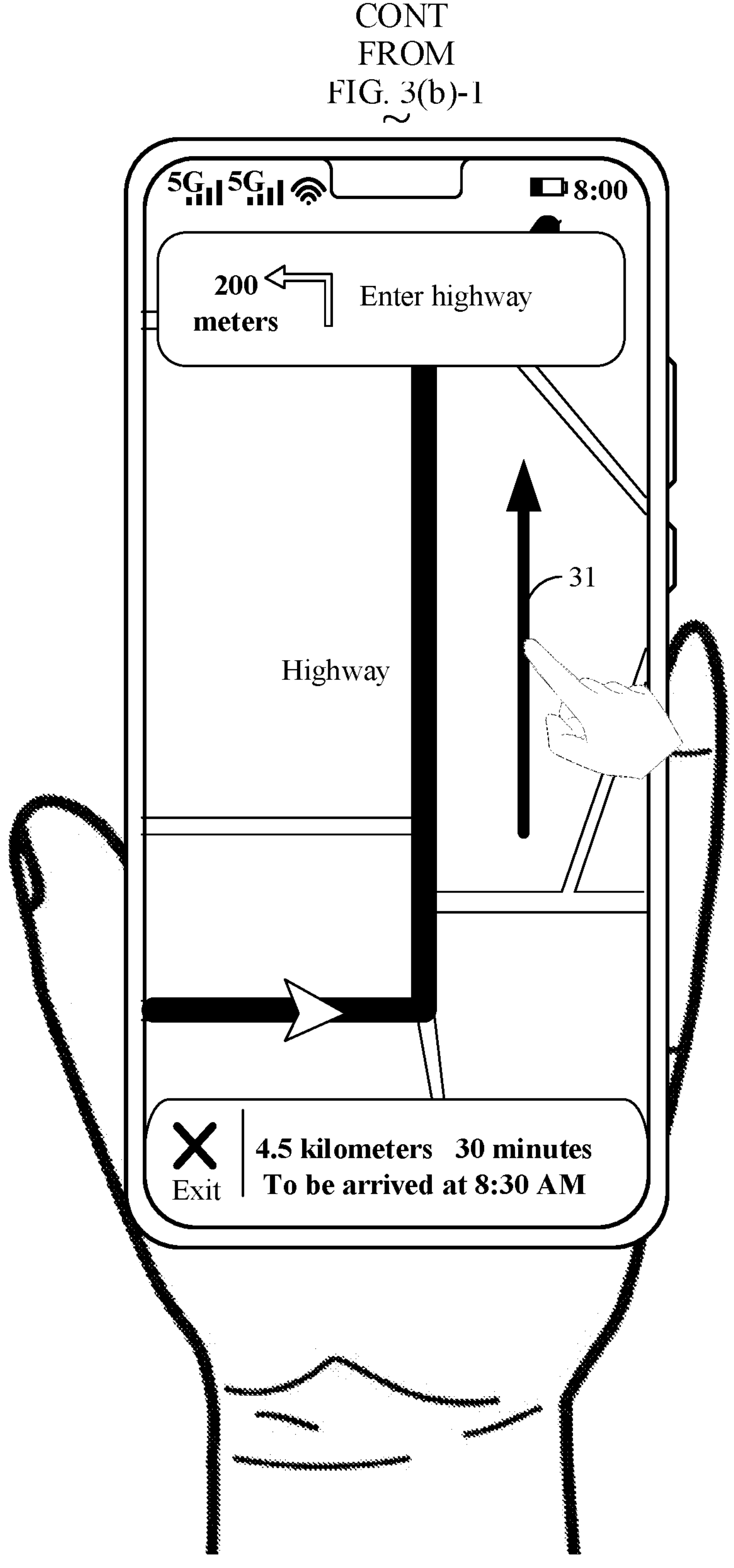

FIG. 2A, FIG. 2B, and FIG. 2C are a flowchart of an interaction in a cross-device navigation task synchronization method according to an embodiment of this application. Details are as follows:

S201: A first terminal obtains navigation data from a first navigation application through a first navigation transfer module if a preset cross-device transmission condition is met.

In this embodiment, the corresponding cross-device transmission condition may be configured for the first terminal. The cross-device transmission condition is used to notify the first terminal that a local navigation task of the first navigation application needs to be synchronized to another terminal (a second terminal in this embodiment). For example, the first terminal may store a cross-device navigation data transmission device list. If the first terminal finds a wireless signal of any registered terminal in the device list, the first terminal recognizes that the cross-device transmission condition is met, and performs the operation of step S201. For another example, a corresponding cross-device transmission trigger gesture may be configured for the first terminal. When detecting that a touch control operation initiated by a user matches the preset trigger gesture, the first terminal may recognize that the cross-device transmission condition is met, and perform the operation of step S201. The cross-device transmission condition may be specifically configured based on an actual use status and a terminal type corresponding to the first terminal. It should be noted that there may be one or more cross-device transmission conditions.

For example, FIG. 3(*a*)-1 and FIG. 3(*a*)-2 are a schematic diagram of a cross-device navigation data transmission scenario according to an embodiment of this application. With reference to FIG. 3(*a*)-1 and FIG. 3(*a*)-2, the user holds a smartphone, and there is a vehicle mounted with a vehicle-mounted terminal within a surrounding range of the smartphone. The foreground of the smartphone starts a navigation application (that is, the first navigation application). In this case, the user may initiate, in an operation interface corresponding to the navigation application, a slide operation in a direction to the vehicle-mounted terminal, that is, a slide track 31. The slide operation is a preset trigger gesture for cross-device navigation data transmission. Therefore, when detecting that the user initiates the long slide operation, the smartphone determines that the preset cross-device transmission condition is met, and performs the operation in step S201.

For another example, a scenario of the first terminal includes a plurality of terminals that can implement cross-device transmission. FIG. 3(*b*)-1 and FIG. 3(*b*)-2 are a schematic diagram of a cross-device navigation data transmission scenario according to an embodiment of this application. As shown in FIG. 3(*b*)-1 and FIG. 3(*b*)-2, in this scenario, the user holds a smartphone, and there are a plurality of vehicles mounted with vehicle-mounted terminals within a surrounding range of the smartphone. In other words, there are a plurality of second terminals. In this case, the second terminal with which the first terminal needs to synchronize the navigation task may be determined in any one of the following three manners. The three manners are respectively as follows:

Manner 1: Different cross-device transmission conditions are configured for different second terminals. For example, the first terminal may configure different trigger gestures for different second terminals. As shown in FIG. 3(*b*)-1, a trigger gesture corresponding to a vehicle-mounted terminal in Vehicle A is sliding leftwards, a trigger gesture corresponding to a vehicle-mounted terminal in Vehicle B is sliding upwards, and a trigger gesture corresponding to a vehicle-mounted terminal in Vehicle C is sliding rightwards. On this basis, the first terminal may obtain a slide operation initiated by the user on the smartphone, and determine, based on the slide operation and a trigger gesture matching the slide operation, the second terminal with which the navigation task needs to be synchronized. For example, in this embodiment, when the user initiates a long slide operation upwards, the first terminal may use the vehicle terminal in Vehicle B as the second terminal with which the navigation task needs to be synchronized.

Manner 2: The second terminal with which the navigation task needs to be synchronized is determined based on relative locations of each second terminal and the first terminal. The first terminal may obtain a relative location relationship between the first terminal and each second terminal based on signal strength of a wireless signal or in a manner such as a distance sensor; and determine, based on the relative location relationship, the second terminal with which the navigation task is synchronized. The relative location relationship may be a distance between the first terminal and each second terminal and orientations of the first terminal and each second terminal. For example, the first terminal may obtain the distance between the first terminal and each second terminal, and select a second terminal closest to the first terminal as the second terminal with which the navigation task is synchronized. For example, a distance between the smartphone and the vehicle-mounted terminal in Vehicle A is 2 m, a distance between the smartphone and the vehicle-mounted terminal in Vehicle B is 1 m, and a distance between the smartphone and the vehicle-mounted terminal in Vehicle C is 1.5 m. In this case, the first terminal may further use the vehicle-mounted terminal in Vehicle B as the second terminal with which the navigation task is synchronized.

Manner 3: The second terminal with which the navigation task needs to be synchronized is determined based on a default priority sequence. The first terminal configures a corresponding synchronization priority for each second terminal in advance. If it is detected at the same time that there are a plurality of second terminals within a range, a second terminal with a highest synchronization priority may be selected, based on corresponding synchronization priorities, as the second terminal with which synchronization needs to be performed. For example, Table 1 shows a synchronization priority correspondence table prestored by the first terminal. As shown in Table 1, a synchronization priority corresponding to the vehicle-mounted terminal in Vehicle A is 1, a synchronization priority corresponding to the vehicle-mounted terminal in Vehicle B is 2, and a synchronization priority corresponding to the vehicle-mounted terminal in Vehicle C is 3. In this case, if the smartphone simultaneously finds the foregoing three vehicle-mounted terminals, in this case, because the vehicle-mounted terminal of Vehicle A has the highest synchronization priority, the vehicle-mounted terminal of Vehicle A is used as the second terminal with which the navigation task is synchronized.

TABLE 1

| Terminal identifier | Synchronization priority |
|---|---|
| Vehicle A | 1 |
| Vehicle B | 2 |
| Vehicle C | 3 |
| . . . | . . . |

In this embodiment, the first navigation transfer module is configured for the first terminal, and at least one first navigation application that can implement the navigation task is installed on the first terminal. The first navigation application is specifically an application run at an application layer of the first terminal. The first navigation application can respond to a navigation task initiated by the user. The first navigation transfer module is specifically configured to implement cross-device navigation task synchronization. A transmission operation includes obtaining the navigation data from the first navigation application in the first terminal.

In this embodiment, the first terminal may obtain, from the first navigation application through the first navigation transfer module, the navigation data about the navigation task. For example, the navigation data includes but is not limited to a navigation destination, a navigation start point, a waypoint, a navigation route rule, a current location, and the like of the navigation task. A key waypoint is specifically between the navigation start point and the navigation destination. The user may set one or more waypoints. A generated navigation route uses the navigation start point as a start point, uses the navigation destination as an end point, and passes through each waypoint. The navigation route rule is specifically used to determine a user preference when the navigation route is generated, for example, different preferences such as “highway first”, “minimum congested sections”, or “lowest costs”, so that the navigation application generates the corresponding navigation route based on the user preference and a real-time road condition.

In a possible implementation, the first navigation transfer module may be a background program run at the application layer of the first terminal. In this case, the first navigation transfer module may obtain, from the application layer, permission for obtaining the navigation data from the first navigation application; and when it is detected that the cross-device transmission condition is met, may obtain the corresponding navigation data from the first navigation application based on the permission.

In a possible implementation, the first navigation transfer module may be alternatively run at an application framework layer of the first terminal, may provide a corresponding application programming interface (API) for navigation task synchronization for the first navigation application, and obtain the corresponding navigation data from the first navigation application through the API interface.

In this embodiment, before step S201, the first navigation application of the first terminal has responded to the navigation task initiated by the user. In other words, the first terminal is a terminal that is executing the navigation task.

Still with reference to FIG. 2A, FIG. 2B, and FIG. 2C, further, in another embodiment of this application, because the first terminal needs to first respond, through the first navigation application before step S201, to the navigation task initiated by the user, on this basis, before the first terminal obtains the navigation data from the first navigation application through the first navigation transfer module if the cross-device transmission condition is met, the method further includes operations of step S200.1 to step S200.3. Specific description is as follows:

S200.1: The first terminal generates the navigation task through the first navigation application in response to a navigation operation of the user. The navigation data is generated based on the navigation task.

In this embodiment, the first terminal may run the first navigation application in the foreground. The user may initiate the navigation operation in the operation interface generated by the first navigation application, for example, enter a corresponding navigation destination, to generate a corresponding navigation task. In a process of executing the navigation task, the first navigation application may generate the navigation data corresponding to the navigation task. The navigation operation initiated by the user may be a touch control operation. For example, FIG. 4*a*(1), FIG. 4*a*(2), and FIG. 4*a*(3) are a schematic diagram of initiating a navigation task according to an embodiment of this application. With reference to FIG. 4*a*(1), the first terminal is specifically a smartphone. A navigation application, that is, an application 41, is installed on the smartphone. The user may start the application 41 by tapping an icon corresponding to the application 41, and generate a corresponding navigation operation interface shown in FIG. 4*a*(2). The first terminal may receive a navigation destination, for example, “New World Plaza”, entered by the user in a region 42 (specifically, a destination). If the application 41 obtains positioning permission of the first terminal in advance, the application 41 may obtain current location information of the first terminal by using a positioning module configured for the first terminal, and automatically fill the current location information in a start location, that is, a region 43. Certainly, the user may further adjust the start location according to an actual case, that is, enter a corresponding start location by tapping the region 43. In a region 44, a navigation scenario in which navigation needs to be performed may be selected, for example, a driving scenario, a bus scenario, or a walking scenario. For example, the driving scenario is selected in FIG. 4*a*(2). After all content of a navigation task is set, the corresponding navigation task may be generated by tapping a control 45 (that is, start navigation), and the first navigation application in the first terminal starts to navigate for the user, as shown in FIG. 4*a*(3).

In a possible implementation, the navigation operation initiated by the user may be alternatively a voice navigation operation. For example, FIG. 4*b*(1), FIG. 4*b*(2), and FIG. 4*b*(3) are a schematic diagram of initiating a navigation task according to an embodiment of this application. With reference to FIG. 4*b*(1), the first terminal is specifically a smartphone, and the navigation operation interface of the smartphone includes a voice navigation control 46. If the smartphone detects that the user taps the control 46, the smartphone enters a voice navigation trigger mode shown in FIG. 4*b*(2). In this state, the smartphone listens to a voice instruction sent by the user. For example, if the user says “I want to go to a tourist attraction A”, the smartphone recognizes that navigation to the tourist attraction A needs to be performed for the user, and generates a navigation route corresponding to navigation from a current location to the tourist attraction A, as shown in FIG. 4*b*(3).

Figure 4C:
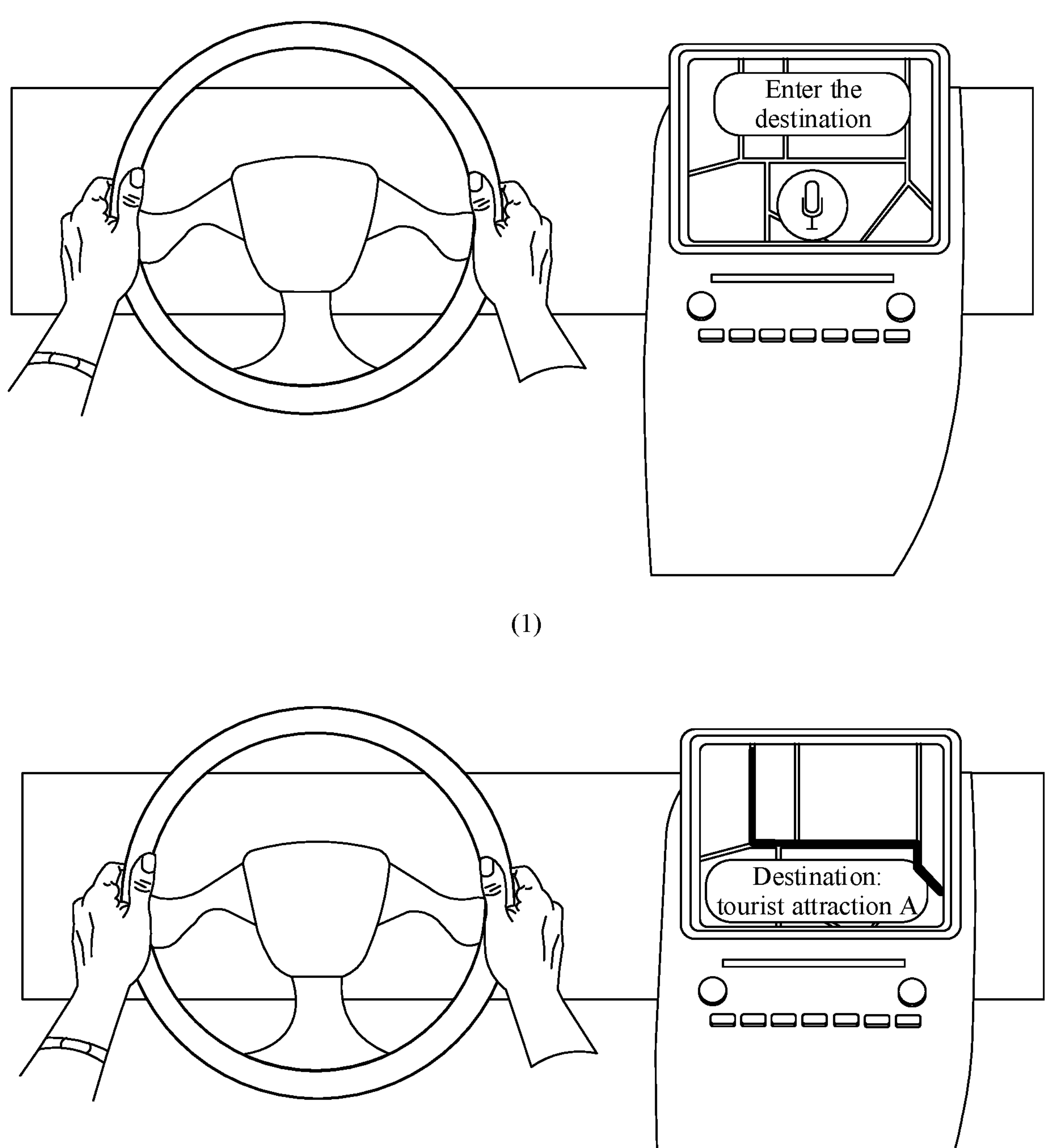
FIG. 4*c* is a schematic diagram of initiating a navigation task according to an embodiment of this application.
Figure 5A:
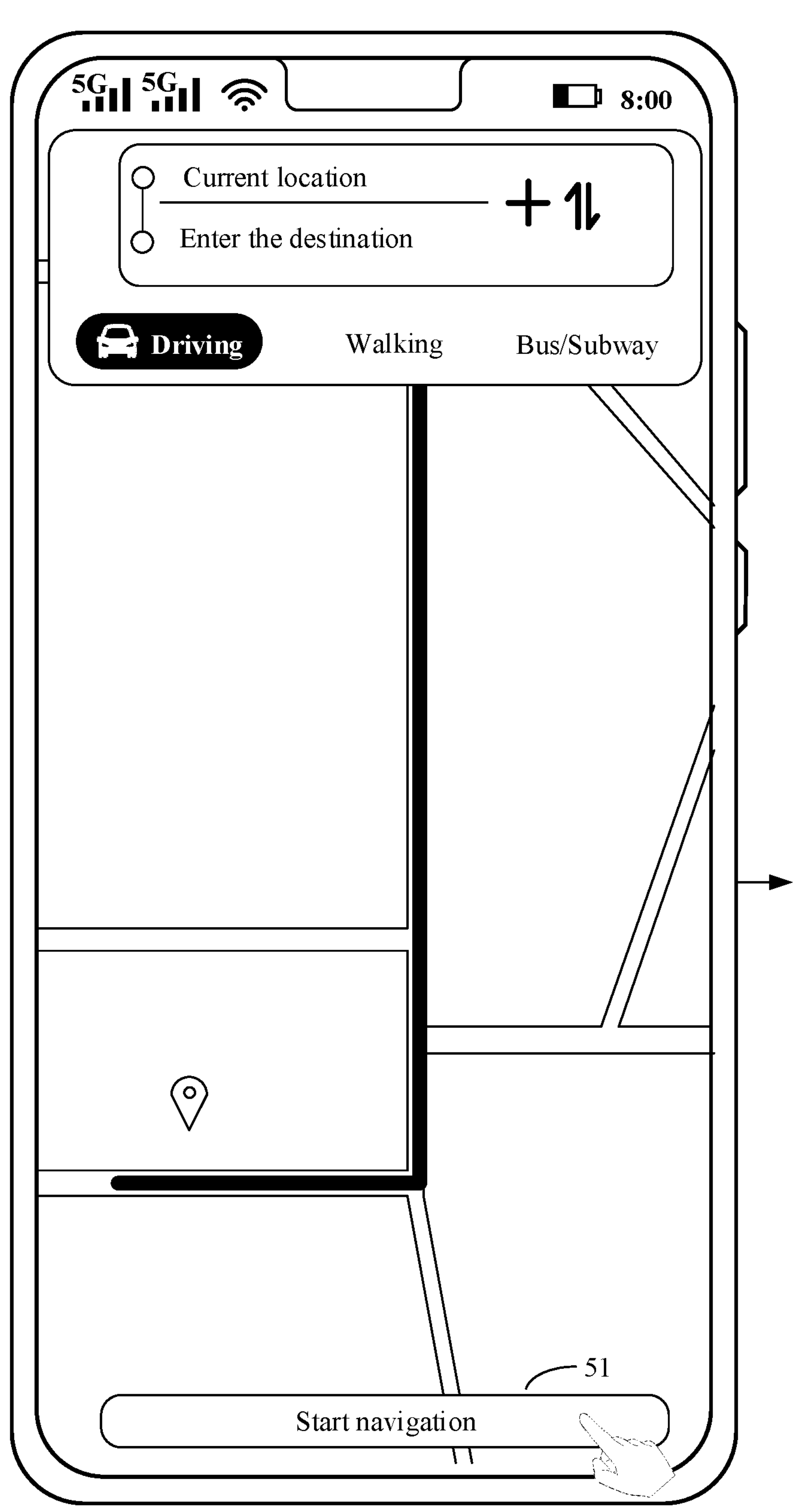
FIG. 5(*a*), FIG. 5(*b*), FIG. 5(*c*), and FIG. 5(*d*) are a schematic diagram of setting a status switch of a first navigation transfer module according to an embodiment of this application.
Figure 5B:
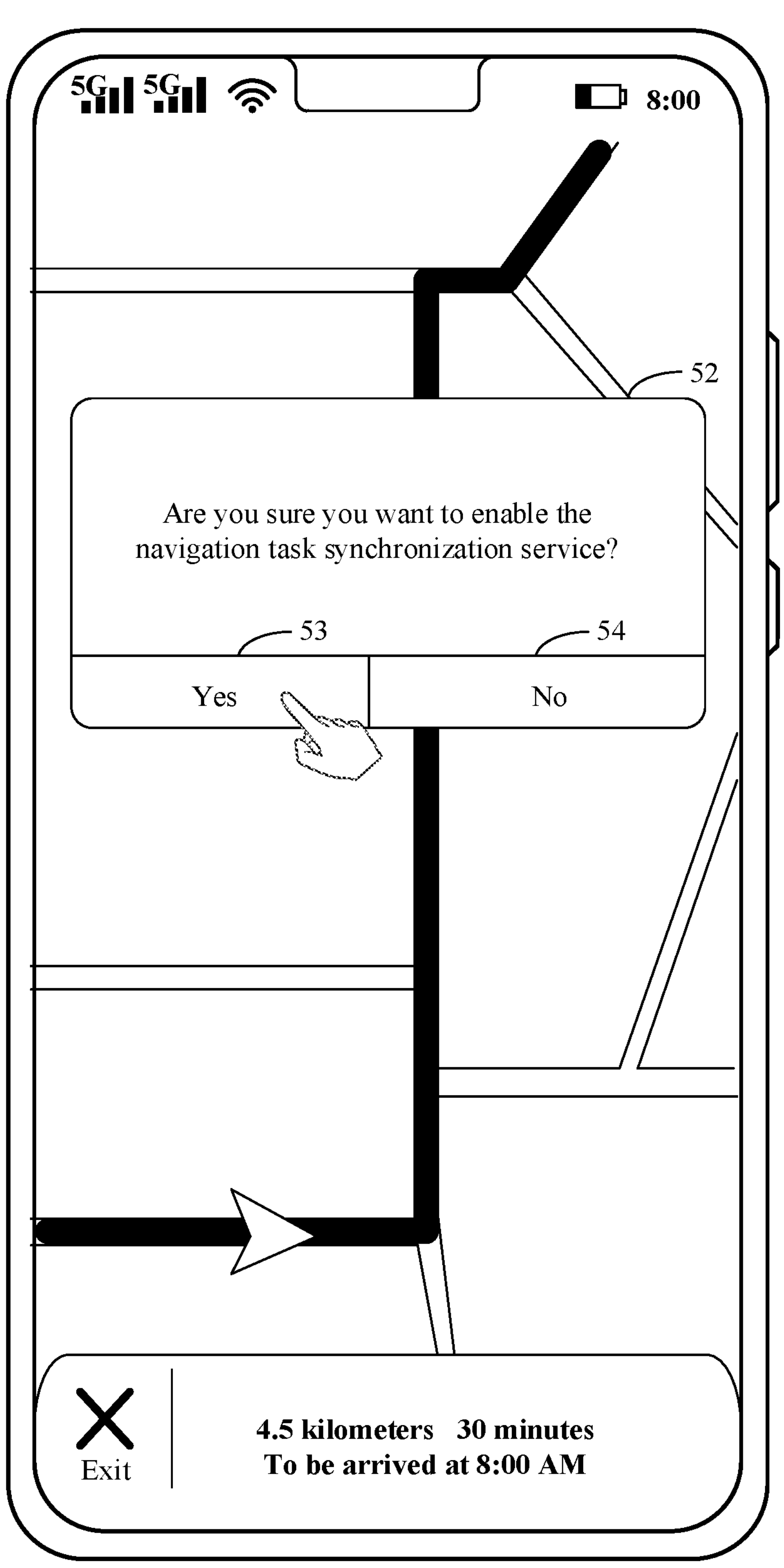
Figure 5C:
Figure 5D:
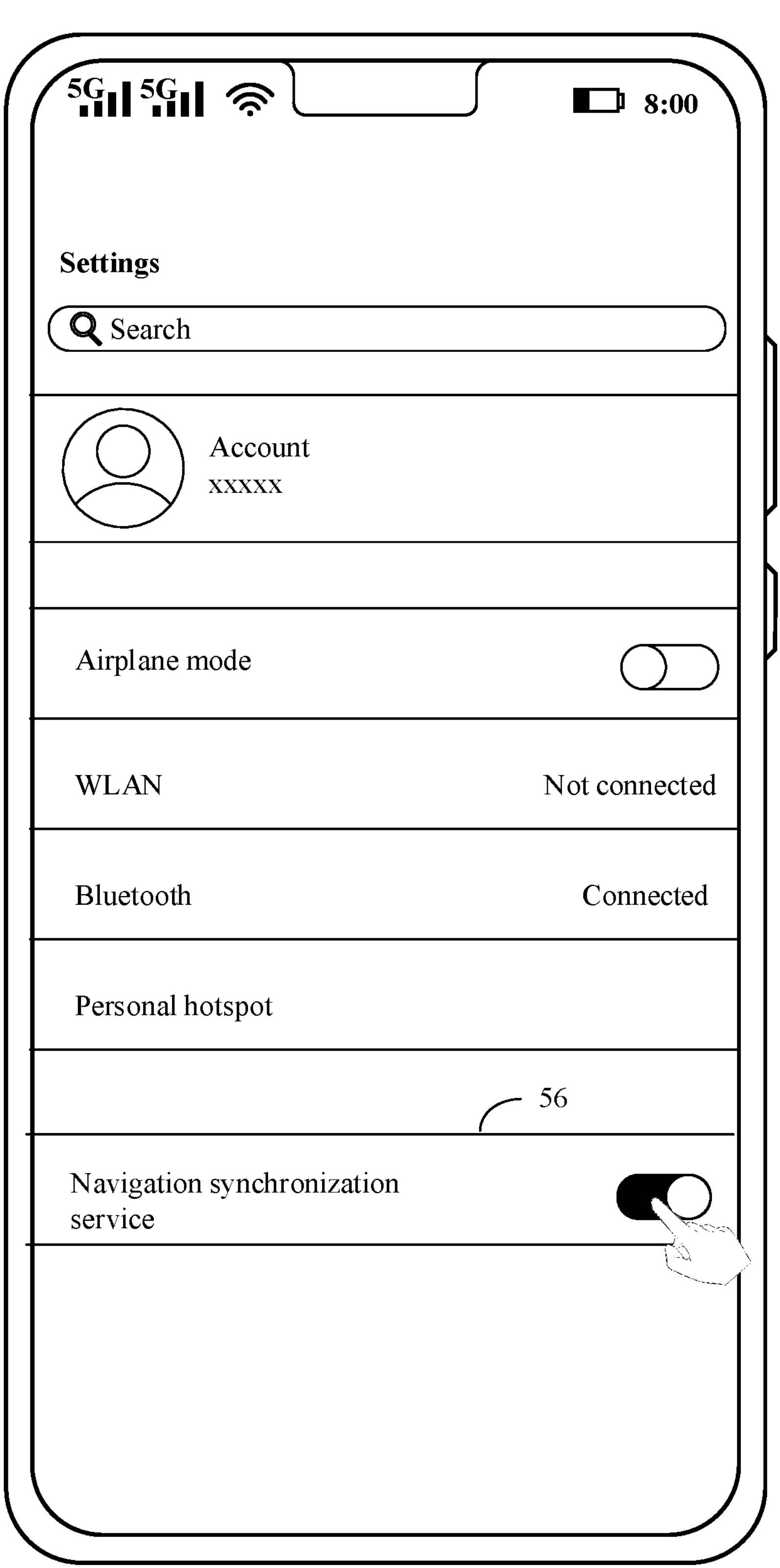

For example, FIG. 4*c* is a schematic diagram of initiating a navigation task according to another embodiment of this application. With reference to (1) in FIG. 4*c*, the first terminal is specifically a vehicle-mounted terminal. As shown in (1) in FIG. 4*c*, after being started, the vehicle-mounted terminal may automatically enter a navigation interface. A corresponding voice activation command may be configured for the vehicle-mounted terminal. If the vehicle-mounted terminal detects that the user says the corresponding voice activation command, for example, "Hi, my car", the vehicle-mounted terminal enters a voice navigation trigger mode. In this state, the vehicle-mounted terminal listens to a voice instruction sent by the user. For example, as shown in (2) in FIG. 4*c*, if the user says "I want to go to a tourist attraction A", the vehicle-mounted terminal generates a navigation route to the tourist attraction A.

In a possible implementation, a default scenario corresponding to the navigation scenario may be determined based on a terminal type. For example, if the terminal type is a vehicle-mounted terminal type, a corresponding navigation scenario in the navigation application may be selected as the driving scenario by default. If the terminal type is a portable terminal type, a corresponding navigation scenario in the navigation application may be selected as the walking scenario by default, or may be selected as the bus scenario by default. A specific correspondence between a default scenario and a terminal type may be set according to an actual case.

S200.2: The first terminal receives, through the first navigation transfer module, a service registration instruction transmitted by the first navigation application. The service registration instruction is used to authorize the first navigation application to have permission to transmit navigation data between devices.

In this embodiment, in order that the first navigation transfer module can obtain corresponding navigation data from the first navigation application when navigation task synchronization needs to be subsequently performed, the first navigation application sends the service registration instruction to the first navigation transfer module. If the first navigation transfer module is a background application run at the application layer of the first terminal, the first navigation application may send the service registration instruction to the first navigation transfer module through a virtual communication interface between programs at the application layer. If the first navigation transfer module is a navigation manager run at the application framework layer of the first terminal, the service registration instruction sent by the first navigation application may be received through the API interface between the first navigation transfer module and the first navigation application.

S200.3: In response to the service registration instruction, the first terminal adds the first navigation application to a navigation synchronization application list, and sets the first navigation transfer module to an on state. The on state is used to: when the cross-device transmission condition is met, send, to the second terminal, navigation synchronization information generated based on the first navigation application.

In this embodiment, the first navigation transfer module of the first terminal may store the navigation synchronization application list. The navigation synchronization application list may record each application that sends a service registration instruction, for example, the first navigation application.

In a possible implementation, a plurality of navigation applications may be installed on the first terminal, for example, Amap, Baidu Maps, and Google Maps. If the user starts the plurality of navigation applications in a process of using the first terminal, each navigation application sends a service registration instruction to the first navigation transfer module. Therefore, the plurality of navigation applications are recorded in the navigation synchronization application list stored in the first navigation transfer module. For example, Table 2 is a schematic diagram of a navigation synchronization application list according to an embodiment of this application. With reference to Table 2, after starting and executing a corresponding navigation task, any navigation application in the first terminal sends a service registration instruction to the first navigation transfer module. The first navigation transfer module may associate a time of each received service registration instruction with a corresponding application identifier, and store the association in the navigation synchronization application list. The first terminal may determine a started navigation application and the registration time of each navigation application based on the navigation synchronization application list. If a navigation application executes a plurality of navigation tasks in a start process of the first terminal, the navigation application may send a plurality of service registration instructions to the first navigation transfer module. For example, based on the first entry and the fourth entry in Table 2, the navigation application Baidu Maps sends service registration instructions to the first navigation transfer module at two time points of 14:00 and 17:11. In this case, the first navigation transfer module may obtain corresponding navigation data from a first navigation application with a latest registration time, for example, the Baidu Maps with the registration time of 17:11 in Table 2. Optionally, the first navigation transfer module obtains the corresponding navigation data from the first navigation application currently run in the foreground.

TABLE 2

| | Registered application | Registration time |
|---|---|---|
| 1 | Baidu Maps | 14:00 |
| 2 | Google Maps | 15:14 |
| 3 | Amap | 17:02 |
| 4 | Baidu Maps | 17:11 |
| . . . | . . . | . . . |

In this embodiment, each first navigation application that sends a service registration instruction to the first navigation transfer module forms a navigation application ecosystem of the first terminal. In this embodiment, the first terminal is specifically a terminal that initiates a navigation synchronization task. In another scenario, the first terminal may also be a terminal that responds to a navigation synchronization task initiated by another terminal. In this case, the first terminal may select, from the navigation application ecosystem, a first navigation application that has sent a service registration instruction, to synchronize a navigation task to a peer end.

In this embodiment, after receiving the service registration instruction of the first navigation application, the first navigation transfer module may set a task synchronization switch of the first navigation transfer module to an on state. Therefore, when it is subsequently detected that the corresponding cross-device transmission condition is met, a navigation task synchronization procedure can be automatically triggered. In other words, operations of step S201 to step S203 are performed.

In a possible implementation, a status switch of the first navigation transfer module may be further manually configured by the user.

For example, FIG. 5(*a*), FIG. 5(*b*), FIG. 5(*c*), and FIG. 5(*d*) are a schematic diagram of setting a status switch of a first navigation transfer module according to an embodiment of this application. With reference to FIG. 5(*a*), the first terminal responds to a navigation operation initiated by the user. For example, the user taps a navigation control 51 in the first navigation application to generate a navigation task corresponding to the navigation operation. In this case, the first terminal may generate a prompt box 52 to prompt the user whether to enable a navigation task synchronization service. As shown in FIG. 5(*b*), the prompt box 52 includes an agree control 53 and a reject control 54. If the first terminal detects that the user taps the confirm control 53, it is recognized that the user confirms to enable the navigation task synchronization service, and the first navigation transfer module is set to the on state.

In another implementation, a navigation task synchronization switch of the first navigation transfer module of the first terminal may be manually configured in a settings interface of the terminal. For example, FIG. 5(*c*) shows a home screen of the first terminal. The home screen includes a settings icon 55. After detecting that the user taps the settings icon 54, the first terminal may generate a corresponding settings interface shown in FIG. 5(*d*). In the settings interface, the user may set a plurality of items of the first terminal, for example, enable a Bluetooth module of the first terminal, select a peripheral device connected to a Bluetooth module, or configure a wireless network. The settings include a setting for the navigation task synchronization switch, that is, a control 56. The first terminal may respond to a tap operation initiated by the user, to change a status of the first navigation transfer module. As shown in FIG. 5(*d*), the first navigation transfer module is in the on state. If the tap operation performed by the user on the control 56 is detected, the first navigation transfer module may be changed from the on state to an off state.

In this embodiment of this application, before performing navigation task synchronization, when initiating a navigation operation on the first navigation application, the first terminal automatically sends the corresponding service registration instruction to the first navigation transfer module. The first navigation transfer module may add the first navigation application to the corresponding navigation synchronization application list, and automatically set the first navigation transfer module to the on state. In this way, the user does not need to manually set the status of the first navigation transfer module, thereby improving setting efficiency.

Further, in the another embodiment of this application, when the first terminal detects that the preset cross-device transmission condition is met, it indicates that navigation task synchronization needs to be performed. In this case, to improve a success rate of navigation task synchronization, the first electronic device may determine whether the first navigation application meets the navigation task synchronization condition. The following two aspects are included:

Condition 1: Does the first navigation application have navigation task synchronization permission?

Condition 2: Is the first navigation application currently run in the foreground of the first terminal?

Different types of navigation applications may be installed on the first terminal. Because not all navigation applications support the navigation task synchronization service, in this case, the first navigation transfer module may record an application trustlist that supports navigation task synchronization, or an application blocklist that does not support navigation task synchronization. The first terminal determines whether the first navigation application that currently initiates the navigation task is in the application trustlist or in the corresponding application blocklist, to determine whether the first navigation application has the navigation task synchronization permission. If the first navigation application is in the application trustlist (or is not in the application blocklist), it is recognized that the first navigation application has the navigation task permission.

For the condition 2, because the first terminal can implement synchronization operations of different applications, to determine whether a navigation task currently needs to be synchronized, when it is detected that the cross-device transmission condition is met, it may be detected whether the first navigation application is an application run in the foreground. In this case, it may be determined that the first terminal is executing the navigation task initiated by the user, and views in real time the navigation information output by the first navigation application. On this basis, navigation task synchronization may be performed, to synchronize the navigation task performed in the first navigation application to a navigation application of the another terminal, that is, a second navigation application of the second terminal.

In this embodiment, after detecting that the cross-device transmission condition is met, the first terminal may perform precondition determining on the first navigation application, to ensure the success rate of navigation task synchronization and avoid an unnecessary synchronization operation.

S202: The first terminal generates the navigation synchronization information of the navigation data through the first navigation transfer module.

In this embodiment, after obtaining the navigation data from the first navigation application through the first navigation transfer module, the first terminal may generate the corresponding navigation synchronization information based on the navigation data.

In a possible implementation, the first navigation transfer module may directly encapsulate the obtained navigation data, and then generate the corresponding navigation synchronization information. In other words, the first navigation transfer module does not perform processing on data content of the navigation data, but adds a header or a tail of a corresponding data packet, to generate and obtain the corresponding navigation synchronization information.

In a possible implementation, the first navigation transfer module may preprocess the navigation data. The preprocessing includes but is not limited to data cleaning, data standardization processing, and/or data format conversion. In a process of cross-device navigation task synchronization, the first navigation application installed on the first terminal and the second navigation application installed on the second terminal may be not a same navigation application. To implement cross-device and cross-application navigation data transmission to further complete navigation task synchronization, the first navigation transfer module may preprocess the navigation data, so that the generated navigation synchronization information can be read by the second navigation application in the second terminal. The manner of preprocessing the navigation data to generate the corresponding navigation synchronization information may be as follows:

Manner 1: Data standardization processing. The first navigation transfer module may convert the navigation data into data in a standard format that can be compatible with different types of navigation applications. The first navigation transfer module stores a corresponding standard format template. The standard format template includes a plurality of information items. For example, Table 3 is a schematic diagram of a format of a standard format template according to an embodiment of this application. As shown in Table 3, corresponding fields are configured for different information items in the standard format template. The first navigation transfer module may extract a parameter value corresponding to each information item from the navigation data and fill the parameter value in a corresponding field, to generate the corresponding data in the standard format, that is, the navigation synchronization information. The peer end can obtain corresponding data from a corresponding field, thereby implementing cross-device and cross-application navigation data synchronization. A header may limit a data length corresponding to the data in the standard format. Because a quantity of waypoints is a variable, more waypoints correspond to the longer data length of the data in the standard format. Therefore, the data length of the data in the standard format may be defined by using the header, so that specific customized content can be carried when standardization of the data format is ensured.

TABLE 3

| Header | Start location | Destination | Navigation rule | Waypoint 1 | . . . |
|---|---|---|---|---|---|
| 1 byte | 2 bytes | 2 bytes | 2 bytes | 2 bytes | . . . |

Manner 2: Data format conversion. The first navigation transfer module may perform format conversion on the navigation data obtained from the first navigation application, and convert the navigation data into a data format adapted to the second navigation application, that is, the navigation synchronization information. In this case, the first terminal may send a navigation application detection request to the second terminal. The second terminal may add an application identifier of the second navigation application to response information in response to the navigation application detection request. The first terminal parses the response information to obtain the application identifier of the second navigation application, determines the data format matching the second navigation application, and converts the navigation data into the data format, to generate the corresponding navigation synchronization information.

Still with reference to FIG. 2A, FIG. 2B, and FIG. 2C, further, in another embodiment of this application, before the first terminal sends the navigation synchronization information to the second terminal, steps S202.1 and S202.2 may be further included. Specific description is as follows:

S202.1: The first terminal obtains a navigation application list of the second terminal. The navigation application list includes the second navigation application.

In this embodiment, the first terminal may send an application list obtaining request to the second terminal. The application list obtaining request is specifically used to determine a navigation application installed on the second terminal. In response to the application list obtaining request, the second terminal may add an application identifier of each locally installed navigation application to the navigation application list, and feed back the navigation application list to the first terminal. Because the second navigation application with which navigation task synchronization needs to be performed is also installed on the second terminal, the navigation application list also includes the second navigation application.

S202.2: The first terminal sends the navigation synchronization information to the second terminal if the first terminal detects that a navigation application matching the first navigation application exists in the navigation application list. The navigation application matching the first navigation application is specifically an application that has permission to implement cross-device navigation data transmission with the first navigation application.

In this embodiment, after obtaining the navigation application list, the first terminal may determine whether an application that can implement a cross-device navigation task is installed on the second terminal, that is, an application that has a permission to implement cross-device navigation data transmission with the first navigation application. If the application that can implement the cross-device navigation task is installed on the second terminal, the first terminal may send the navigation synchronization information to the second terminal. Otherwise, if no application that can implement the cross-device navigation task is installed on the second terminal, in this case, even if the first terminal sends the navigation synchronization information to the second terminal, the second terminal cannot perform navigation task synchronization based on the navigation synchronization information. In this case, the first terminal does not send the navigation synchronization information to the second terminal.

In a possible implementation, if no navigation application matching the first navigation application exists in the navigation application list, the first terminal may send an application installation instruction to the second terminal, to prompt the second terminal to install a navigation application of an application that has permission to implement cross-device navigation data transmission with the first navigation application.

Figure 6A:
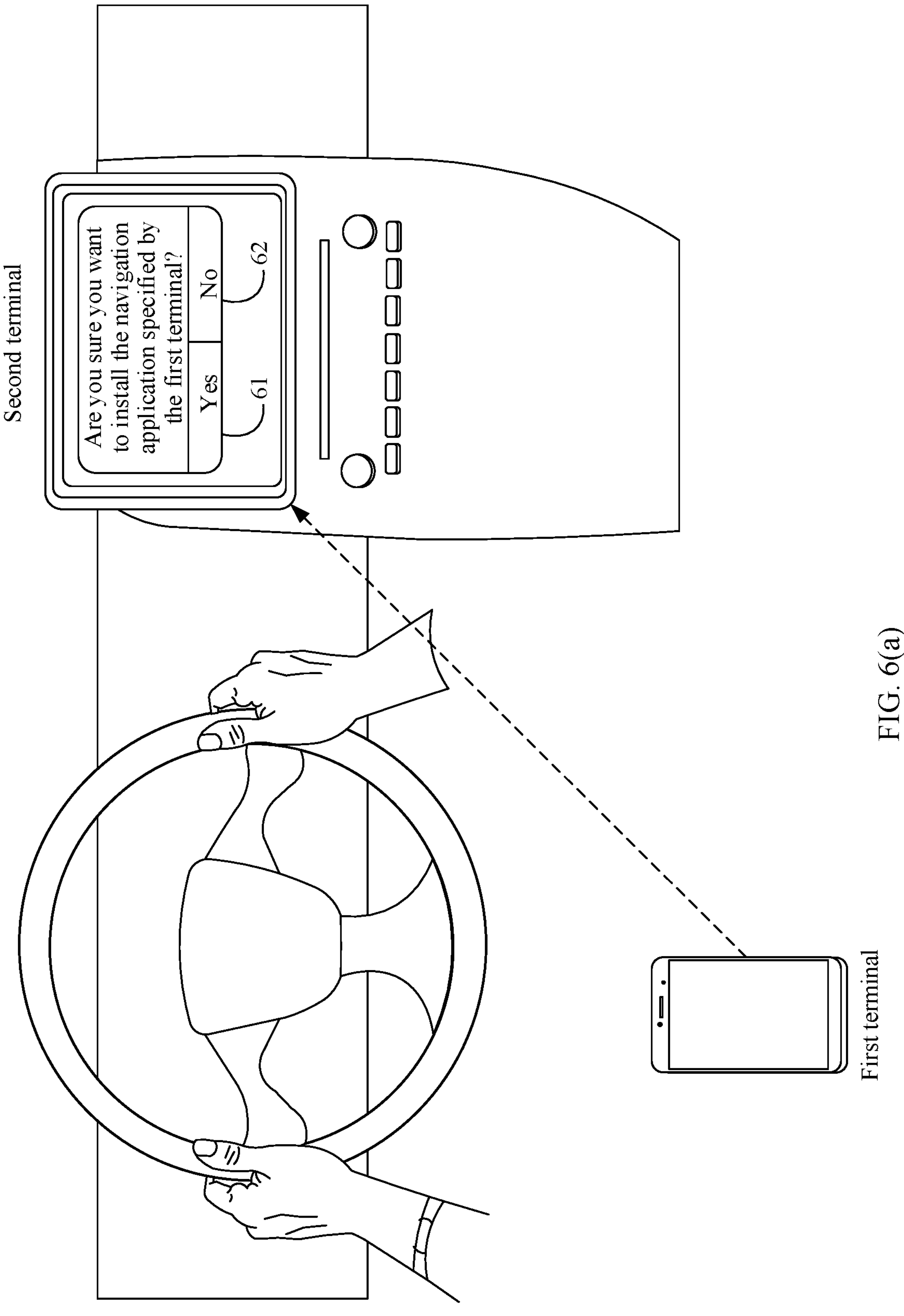
FIG. 6(*a*) and FIG. 6(*b*) are a schematic diagram of an application installation prompt of a second terminal according to an embodiment of this application.
Figure 6B:
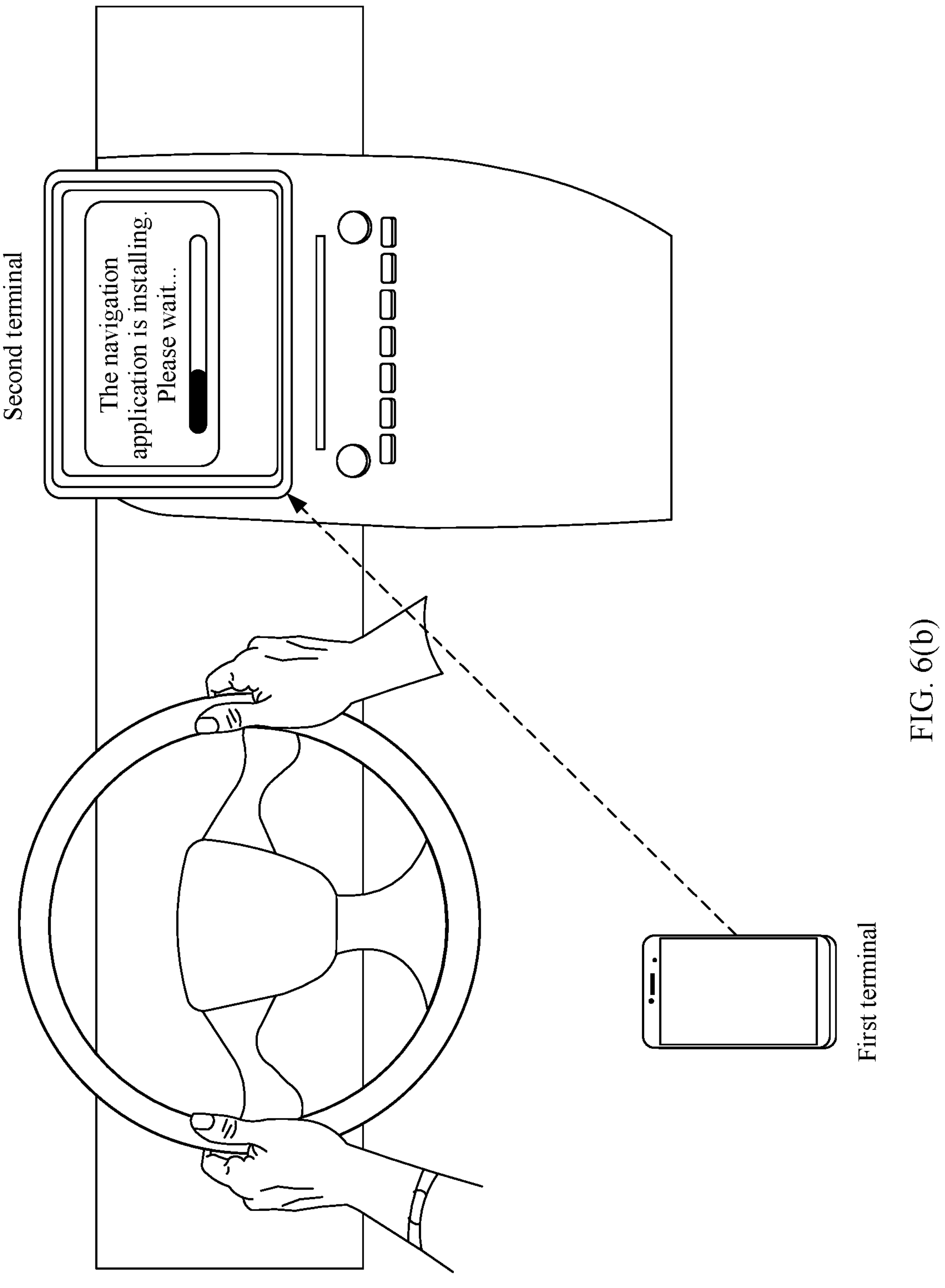

For example, FIG. 6(*a*) and FIG. 6(*b*) are a schematic diagram of an application installation prompt of a second terminal according to an embodiment of this application. With reference to FIG. 6(*a*), the second terminal may be specifically a vehicle-mounted terminal. After the first terminal sends the application installation instruction to the second terminal, the second terminal may generate application installation prompt information, to query whether the user agrees to install the navigation application matching the first navigation application. The application installation prompt information includes an agree control 61 and a reject control 62. If it is detected that the user taps the agree control 61, as shown in FIG. 6(*b*), an installation procedure of the navigation application that can implement navigation task synchronization is performed, and a corresponding installation progress and a corresponding installation phase are displayed. After completing installing the matching navigation application, the second terminal may newly send a navigation application list to the first terminal. In this case, the first terminal may recognize that the navigation application list includes the navigation application matching the first navigation application, and send the navigation synchronization information to the second terminal.

In this embodiment of this application, before sending the navigation synchronization information to the second terminal, the first terminal first determines whether the second terminal has the navigation application that can respond to navigation task synchronization; and sends the navigation synchronization information to the second terminal if the corresponding navigation application is installed on the second terminal, to improve the success rate of navigation task synchronization and avoid an unnecessary synchronization operation.

Still with reference to FIG. 2A, FIG. 2B, and FIG. 2C, in step S203, the second terminal receives the navigation synchronization information sent by the first terminal, and transmits the navigation synchronization information to the second navigation application through a second navigation transfer module.

In this embodiment, the first terminal establishes a communication connection to the second terminal. The communication connection may be a wireless connection, for example, a Bluetooth connection, a near field communication (NFC) connection, or a wireless fidelity (Wi-Fi) connection. Based on the communication connection between the first terminal and the second terminal, the second terminal can receive the navigation synchronization information sent by the first terminal. The first terminal may invoke a wireless communication interface through the first navigation transfer module, that is, a communication protocol corresponding to the wireless communication interface, to send the navigation synchronization information to the second terminal. Correspondingly, the second terminal may also invoke the corresponding wireless communication interface through the second navigation transfer module to receive the navigation synchronization information.

Still with reference to FIG. 2A, FIG. 2B, and FIG. 2C, in another embodiment of this application, after receiving the navigation synchronization information sent by the first terminal, the second terminal may locally determine whether there is the navigation application that can respond to navigation task synchronization. After the second terminal receives the navigation synchronization information sent by the first terminal, the following steps may be further included.

S203.1: The second terminal detects whether the navigation application matching the first navigation application exists in the navigation application list.

S203.2: If the second terminal detects that the navigation application matching the first navigation application exists in the navigation application list, the second terminal uses, as the second navigation application, the navigation application matching the first navigation application, and performs the operation of transmitting the navigation synchronization information to the second navigation application through the second navigation transfer module. The navigation application matching the first navigation application is specifically an application that has permission to implement cross-device navigation data transmission with the second navigation application.

In this embodiment, the first terminal can determine whether the navigation application that can implement navigation task synchronization is installed on the second terminal. In addition, the second terminal can also check feasibility of task synchronization for the local navigation application, that is, determine whether the navigation synchronization information sent by the first terminal is compatible with the second navigation application installed on the second terminal. In this case, the second terminal may determine, based on the navigation synchronization information sent by the first terminal, an application type of the first navigation application installed on the first terminal, and determine whether the navigation application matching the first navigation application exists in the locally installed navigation applications. If the navigation application matching the first navigation application is installed on the second terminal, that is, the navigation application matching the first terminal exists in the navigation application list of the second terminal, the second terminal may use the matching navigation application as the navigation application for navigation task synchronization. Therefore, the second navigation transfer module may send the received navigation synchronization information to the second navigation application.

In this embodiment of this application, after the second terminal receives the navigation synchronization information, the second terminal may determine whether the second terminal locally has the navigation application that can respond to navigation task synchronization; and if the corresponding navigation application is installed on the second terminal, send the navigation synchronization information to the corresponding navigation application, to improve the success rate of navigation task synchronization and avoid an unnecessary synchronization operation.

In a possible implementation, before transmitting the navigation synchronization information to the second navigation application, the second navigation transfer module may further preprocess the navigation synchronization information, so that preprocessed information can be compatible with the second navigation application. The preprocessing includes but is not limited to data cleaning, data standardization processing, and/or data format conversion. A specific preprocessing manner is similar to a manner in which the first terminal preprocesses the navigation data. For specific description, refer to the related description of step S202. Details are not described herein again.

In a possible implementation, if the plurality of navigation applications are installed on the second terminal, and the plurality of navigation applications all match the first navigation application of the first terminal, in this case, the second terminal may determine, based on a start time of each local navigation application, the navigation application for navigation task synchronization, that is, the second navigation application. For example, the second navigation transfer module may select a recently started navigation application as the second navigation application for navigation task synchronization. Optionally, the second navigation transfer module may determine, based on a start time, the navigation application for navigation task synchronization; and may further determine, based on a quantity of times of using each navigation application installed on the second terminal, a navigation application commonly used by the user, and use the commonly used navigation application as the second navigation application.

Still with reference to FIG. 2A, FIG. 2B, and FIG. 2C, in step S204, the second terminal updates a navigation task of the second navigation application based on the navigation synchronization information.

In this embodiment, after the second navigation transfer module of the second terminal sends the navigation synchronization information to the second navigation application, the second navigation application sets the navigation task corresponding to the first navigation application in the first terminal, to implement navigation task synchronization between the first navigation application and the second navigation task. Updating the navigation task of the second navigation application includes two cases:

Case 1: The second navigation application does not execute the task navigation task. In this case, the second terminal may create a corresponding navigation task based on the navigation synchronization information.

Case 2: Before synchronization, the second navigation application is executing another navigation task. In this case, the second terminal may change the navigation task of the second navigation application based on the navigation synchronization information, so that the navigation task of the second navigation application is consistent with the navigation task executed by the first navigation application in the first terminal.

Figure 7A:
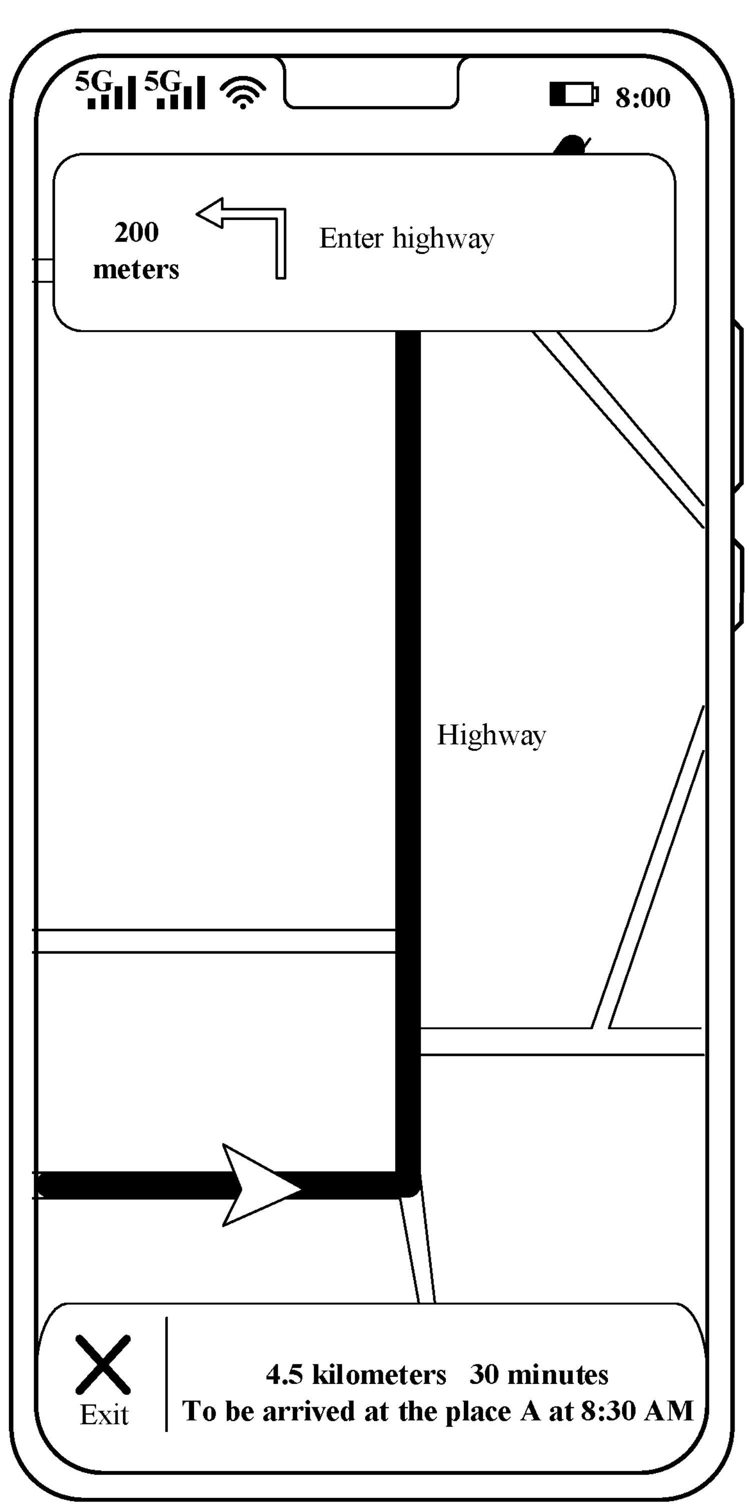
FIG. 7(*a*) and FIG. 7(*b*) are a schematic diagram of changing a navigation task according to an embodiment of this application.
Figure 7B:
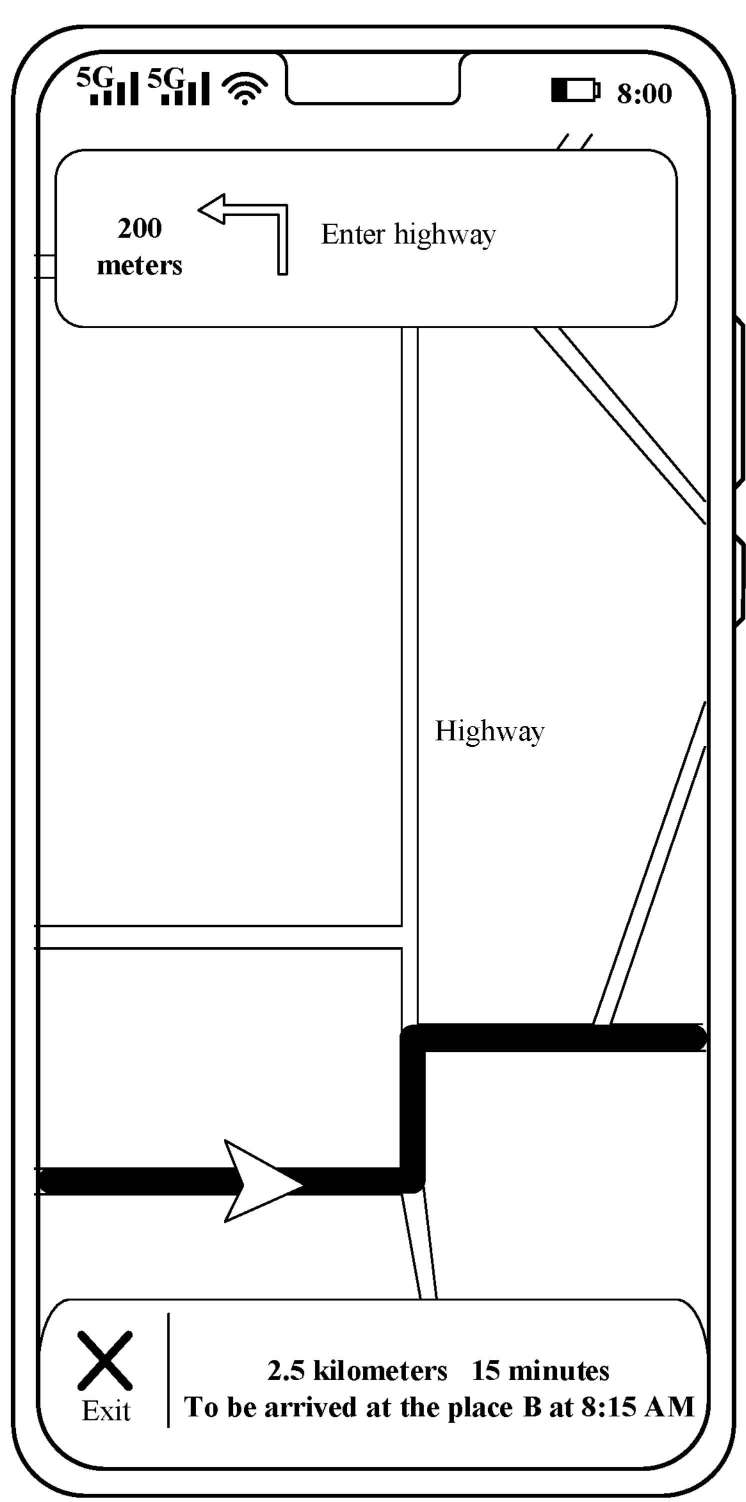

For example, FIG. 7(*a*) and FIG. 7(*b*) are a schematic diagram of changing a navigation task according to an embodiment of this application. With reference to FIG. 7(*a*), before performing navigation task synchronization, the second terminal is executing a navigation task of navigation to a place A. In this case, the first terminal synchronizes a navigation task (a navigation task of navigation to a place B) with the second terminal, and sends corresponding navigation synchronization information to the second terminal. In this case, as shown in FIG. 7(*b*), the second terminal may update the navigation task of the second navigation application based on the navigation synchronization information, to change a destination from the place A to the place B.

Still with reference to FIG. 2A, FIG. 2B, and FIG. 2C, further, in a possible implementation, before navigation task synchronization is performed on the second navigation application, the user may be asked whether to agree to the synchronization operation. On this basis, step S204 may specifically include the following steps:

S204.1: The second terminal determines a navigation destination based on the navigation synchronization information, and generates task update prompt information based on the navigation destination.

S204.2: The second terminal updates the navigation task based on the navigation destination if the second terminal receives an update confirmation instruction fed back based on the update prompt information.

In this embodiment, before updating the navigation task of the second navigation application, the second terminal may generate the corresponding task update prompt information, to determine whether the user agrees to the update operation for the navigation task. If the user agrees to the update operation for the navigation task, the user may initiate a corresponding agree operation on the second terminal. The second terminal may generate the corresponding update confirmation instruction based on the agree operation. After the second navigation application receives the update confirmation instruction, the navigation task can be updated based on the navigation destination in the navigation synchronization information.

Figure 8A:
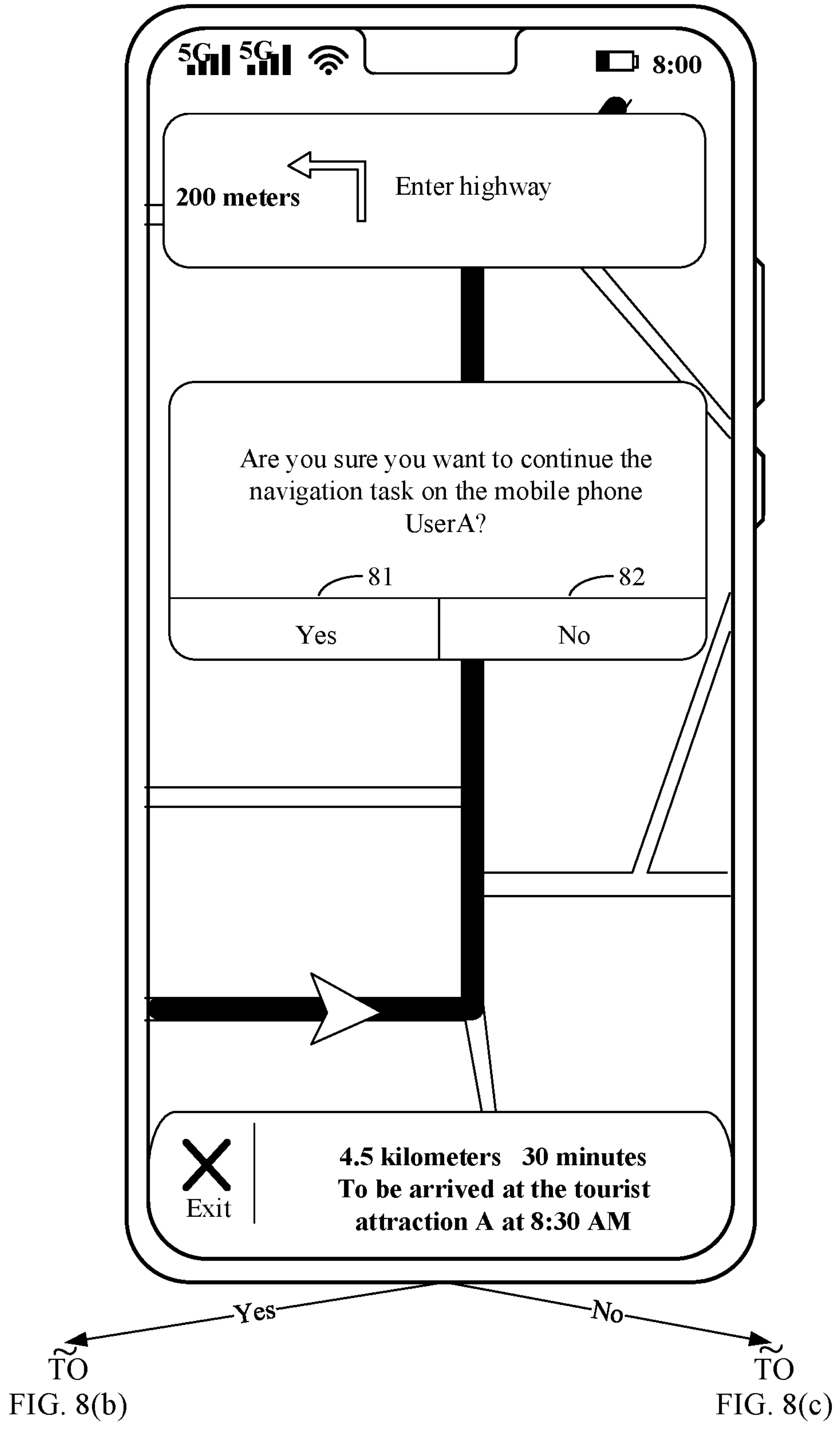
FIG. 8(*a*), FIG. 8(*b*), and FIG. 8(*c*) are a schematic diagram of updating a navigation task according to an embodiment of this application.
Figure 8B:
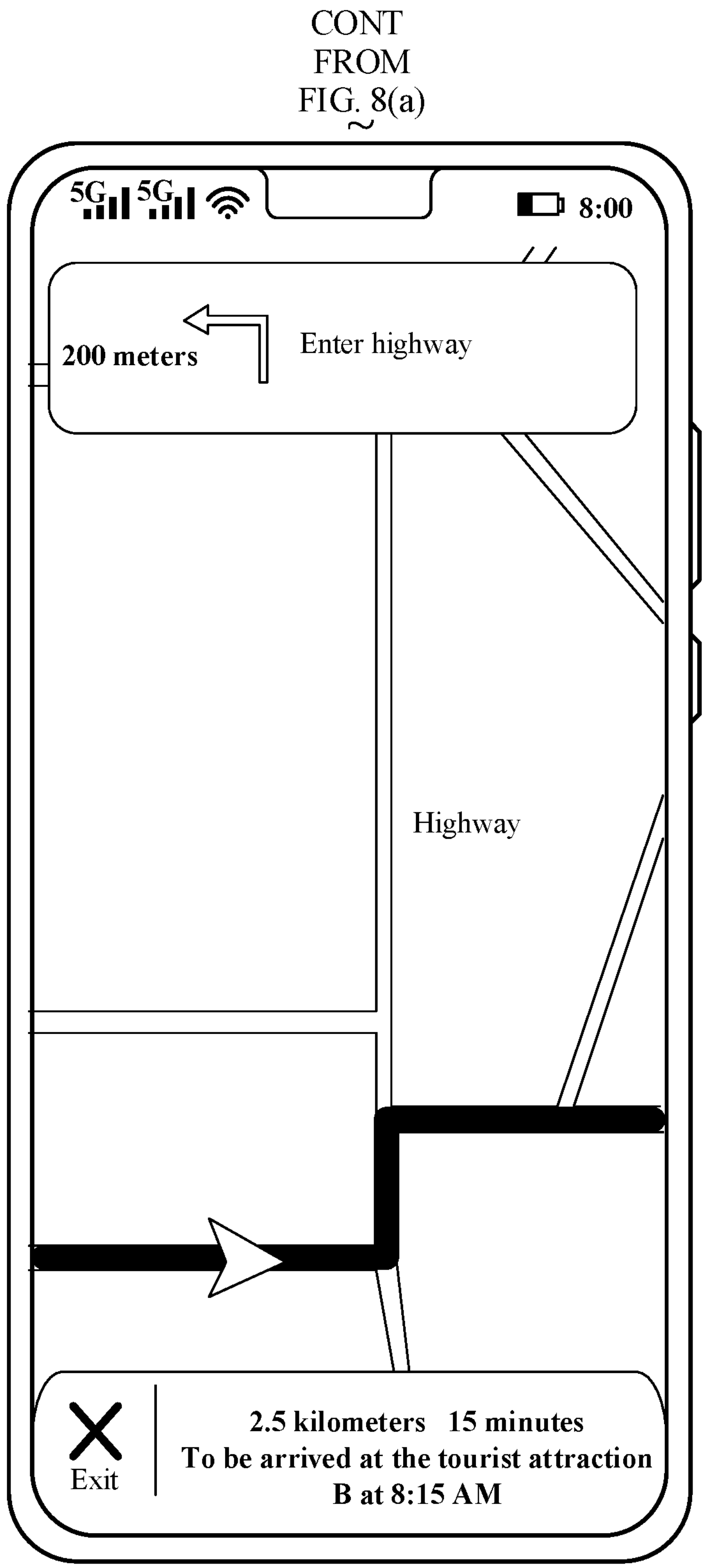
Figure 8C:
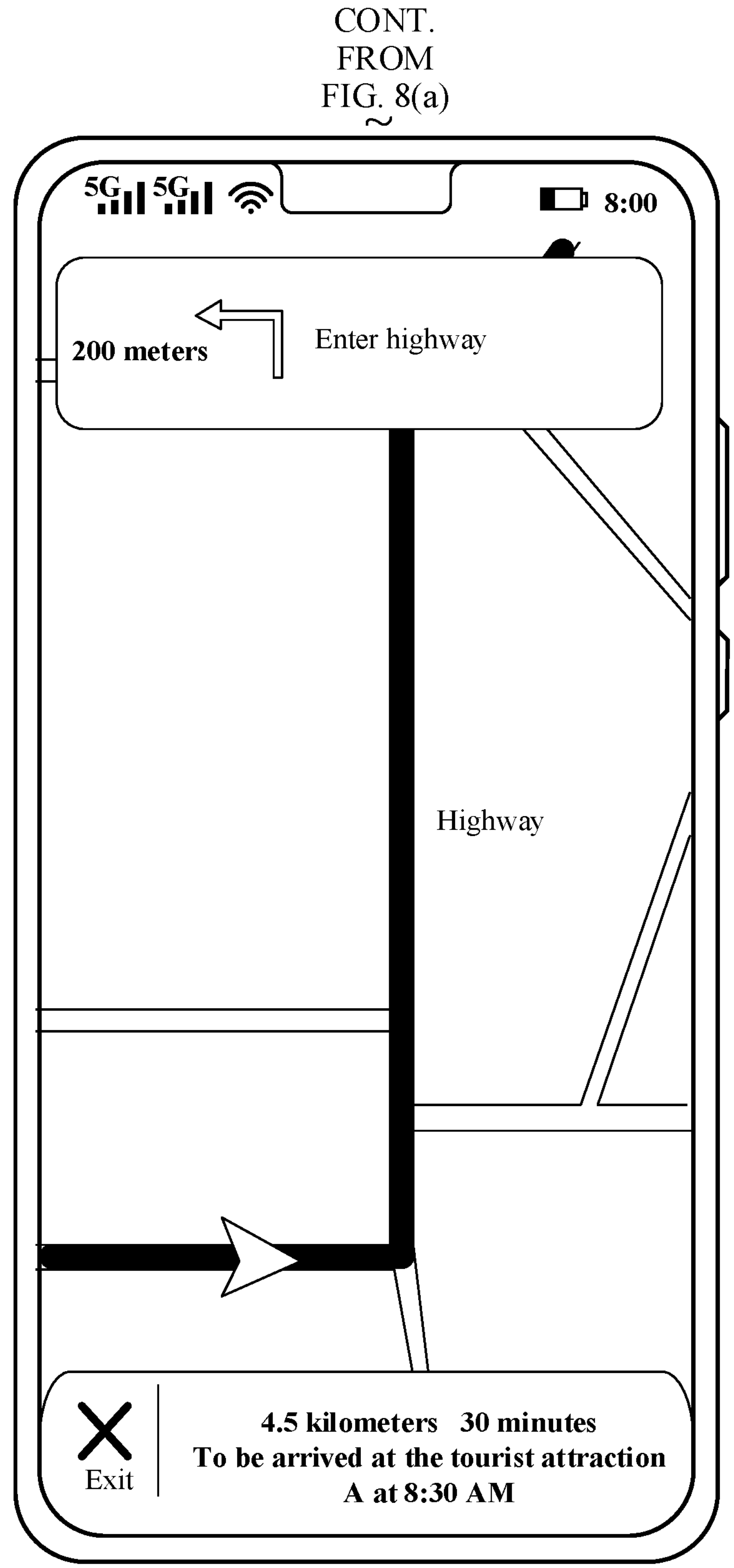
Figure 9A:
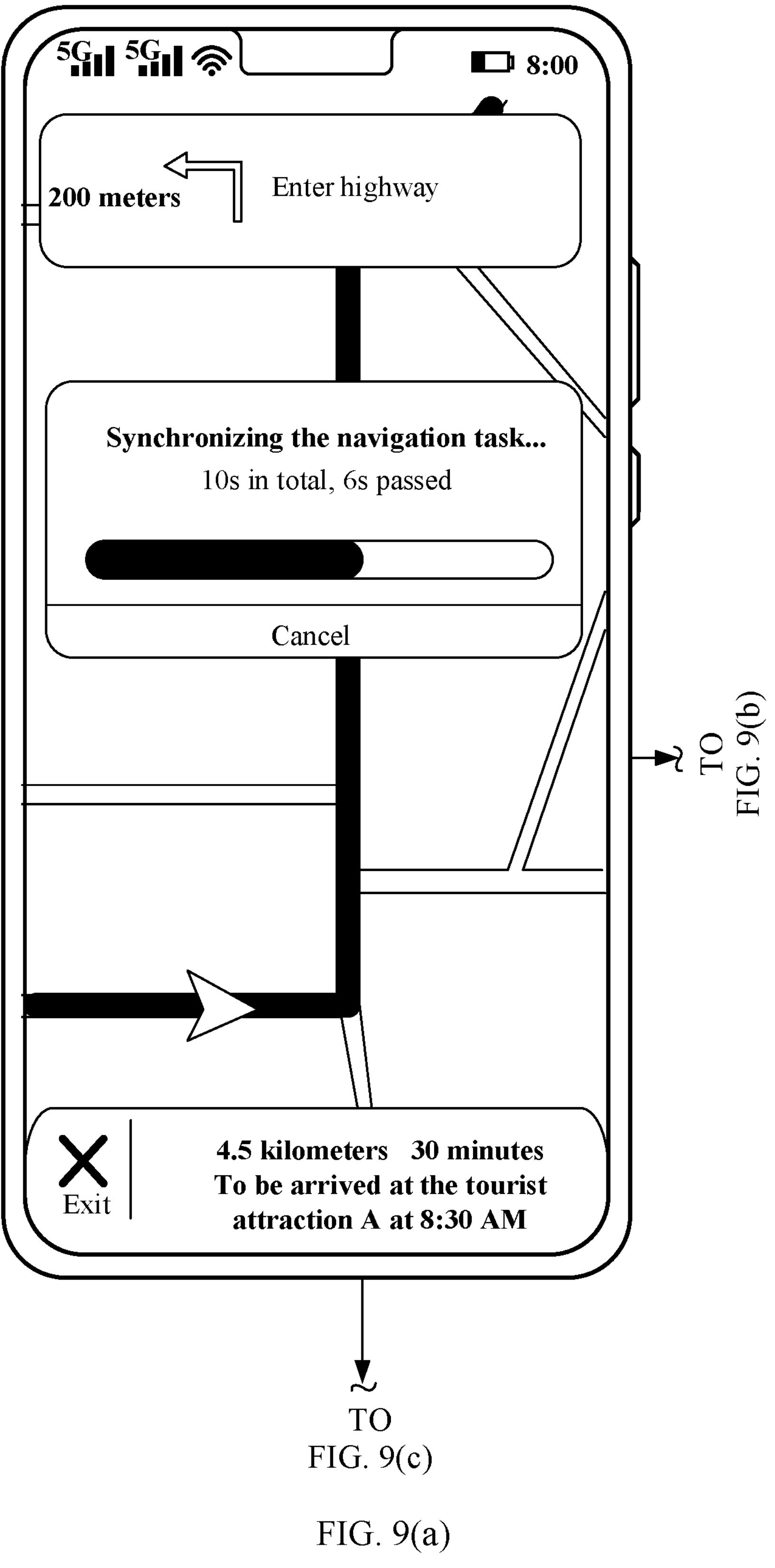
FIG. 9(*a*), FIG. 9(*b*), FIG. 9(*c*), and FIG. 9(*d*) are a schematic diagram of ending a navigation task according to an embodiment of this application.
Figure 9B:
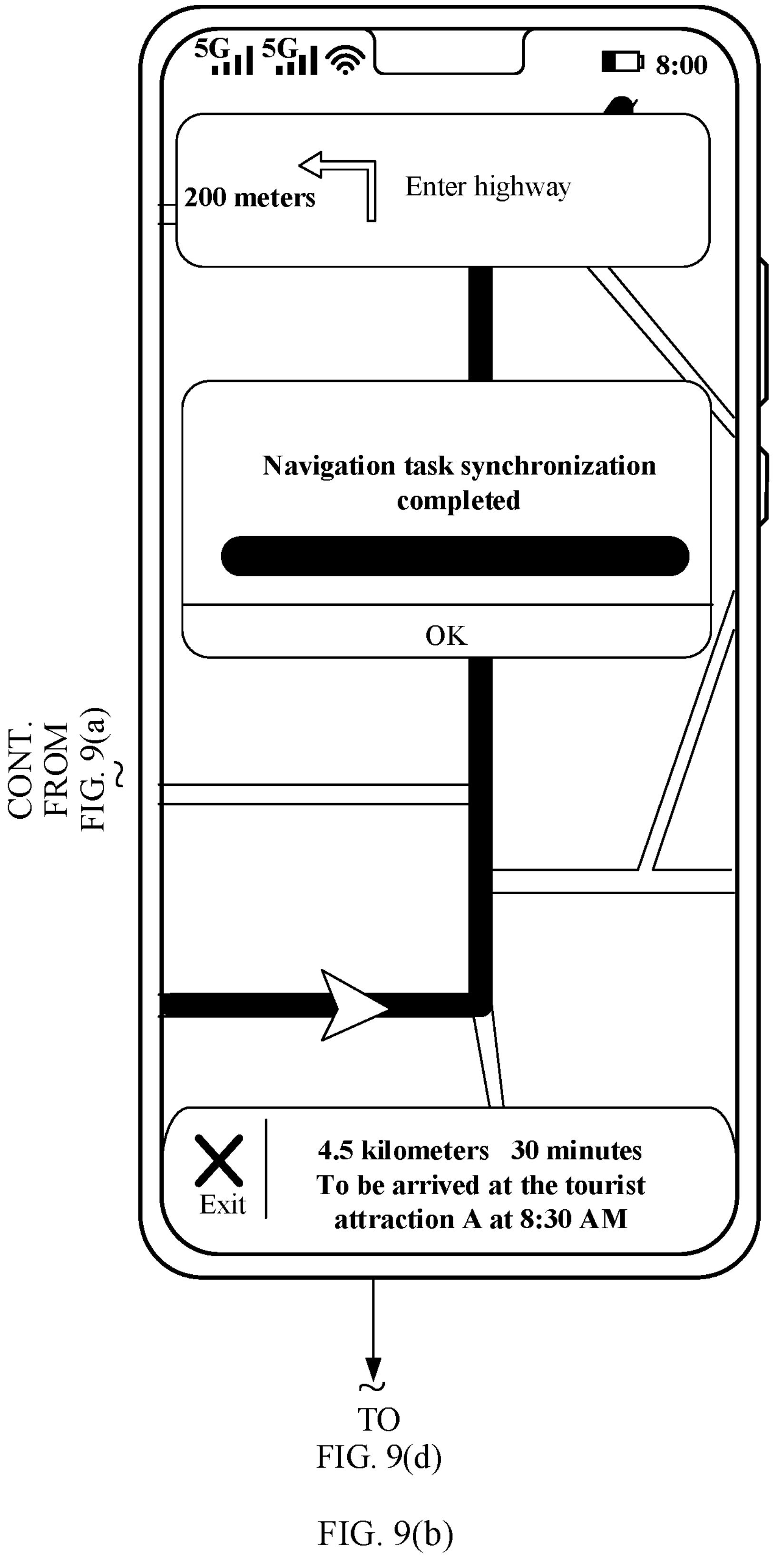
Figure 9C:
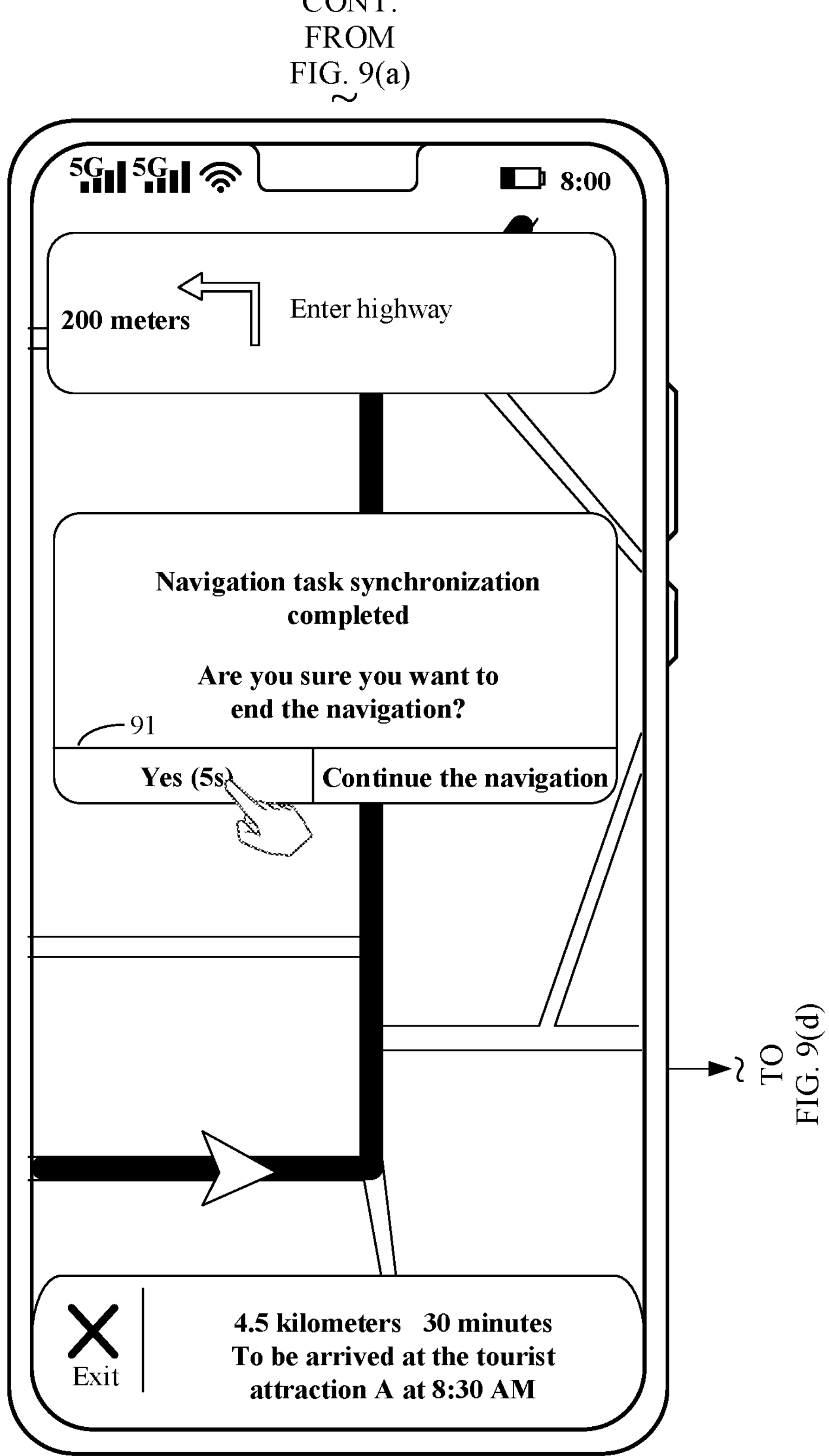
Figure 9D:
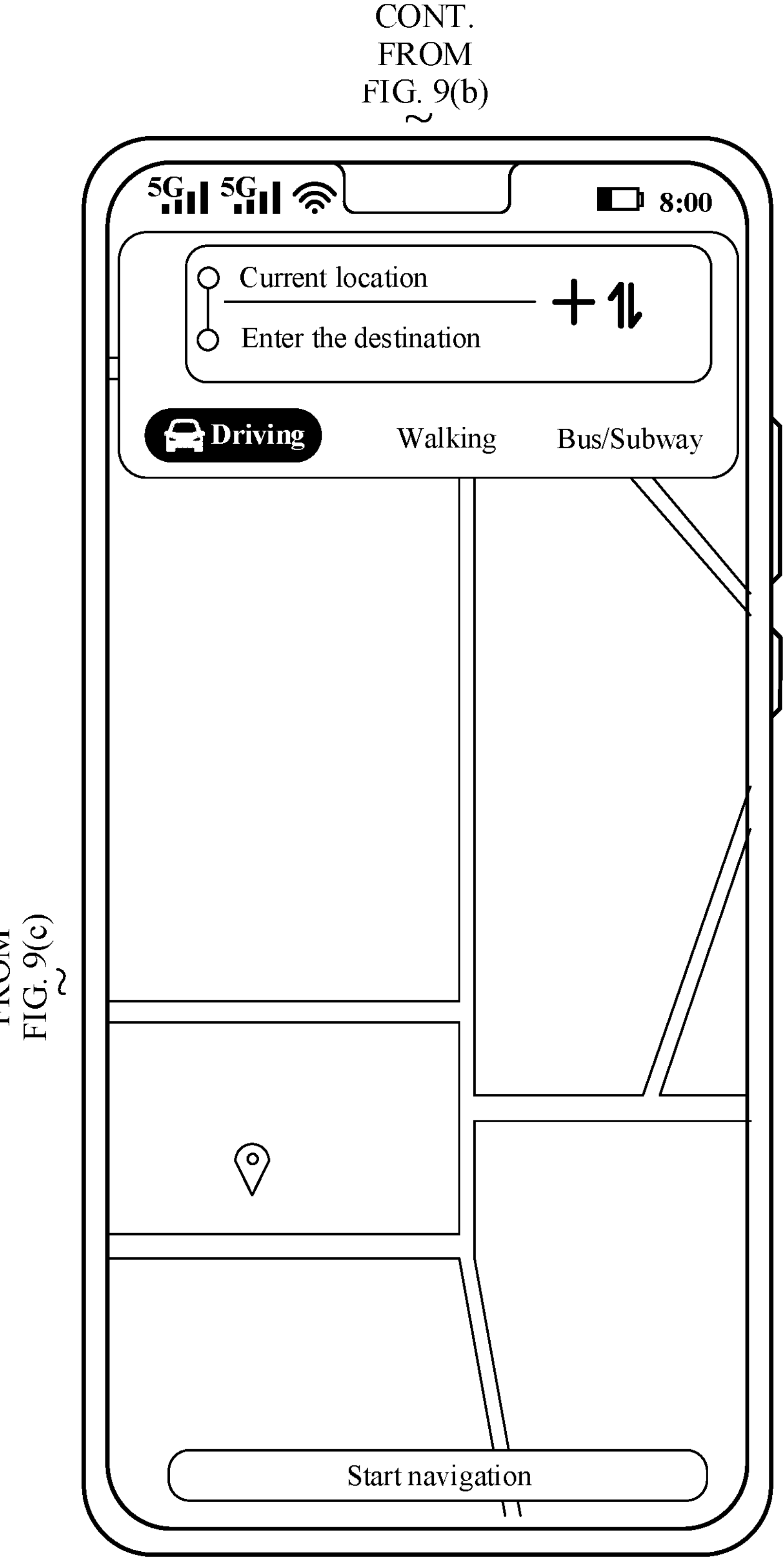

For example, FIG. 8(*a*), FIG. 8(*b*), and FIG. 8(*c*) are a schematic diagram of updating a navigation task according to an embodiment of this application. After receiving the navigation synchronization information, the second navigation application of the second terminal may parse the navigation synchronization information, determine the navigation destination designated in the navigation synchronization information, and generate the corresponding task update prompt information based on the navigation destination. For example, if the navigation destination is a tourist attraction B, the task update prompt information is generated. Content of the prompt information may be displayed as "Are you sure you want to continue the navigation task on the mobile phone UserA?" Herein, as shown in FIG. 8(*a*), UserA is a mobile phone identifier of a smartphone, to help the user determine a specific device that synchronizes the navigation task with the second terminal. The prompt information may also be displayed as "Are you sure you want to continue the navigation task to the tourist attraction B", to help the user determine a specific destination of a navigation task for update this time. The task prompt information includes a confirm control 81 and a cancel control 82. If detecting that the user taps the confirm control 81 in the second navigation application, the second terminal may update the navigation task based on the navigation destination. As shown in FIG. 8(*b*), after the user taps the confirm control 81, a navigation destination of the second navigation application may be changed to the tourist attraction B. If the user taps the cancel control 82, the original navigation destination is kept. As shown in FIG. 8(*c*), the navigation destination of the second navigation application is kept as the tourist attraction A.

In this embodiment of this application, the corresponding task update prompt information is generated, to notify the user whether to agree to update the navigation task, thereby avoiding an incorrect synchronization case and improving accuracy of navigation task synchronization.

Still with reference to FIG. 2A, FIG. 2B, and FIG. 2C, further, in another embodiment of this application, after updating the navigation task of the second navigation application based on the navigation synchronization information, the second terminal may notify the first terminal that navigation task synchronization is completed. In other words, after step S204, the following steps may be included:

S205: The second terminal sends navigation synchronization complete information to the first terminal through the second navigation transfer module.

S206: The first terminal transmits, to the first navigation application through the first navigation transfer module in response to the navigation synchronization complete information, an end instruction about the navigation task, to stop the navigation task of the first navigation application.

In this embodiment, after completing updating the navigation task, the second terminal may send the navigation synchronization complete information to the first terminal through the second navigation transfer module. After receiving the navigation synchronization complete information sent by the second terminal, the first terminal may determine that the second terminal has completed navigation task synchronization, that is, the navigation task is continued on the second terminal for execution from the first terminal. In this case, the first terminal may end the locally executed navigation task. Therefore, the first navigation transfer module may send an end instruction to the first navigation application. After receiving the end instruction, the first navigation application may stop the navigation task that is being executed in the first navigation application of the first terminal. In this way, the navigation task is transferred.

For example, FIG. 9(*a*), FIG. 9(*b*), FIG. 9(*c*), and FIG. 9(*d*) are a schematic diagram of ending a navigation task according to an embodiment of this application. With reference to FIG. 9(*a*), after sending the navigation synchronization information to the second terminal through the first navigation transfer module, the first terminal may locally display prompt information: "synchronizing", and display a corresponding synchronization progress based on a time consumed for synchronization in a general case and current wait duration. As shown in FIG. 9(*b*), if the first terminal receives the navigation synchronization complete information sent by the second terminal, the first terminal may generate prompt information: "synchronization completed", to prompt the user that the second terminal has completed navigation task synchronization. In this case, the first terminal may directly end the navigation task, for example, exit the first navigation application and return to the home screen of the first terminal, or return to an initial interface of the application shown in FIG. 9(*d*). Optionally, as shown in FIG. 9(*c*), after the first terminal receives the navigation synchronization complete information, the generated prompt information may include an end confirm control 91 for querying the user whether to end the navigation task of the first navigation application. If the first terminal detects that the user taps the end confirm control 91, the first terminal may end the navigation task of the first navigation application in the first terminal, and return to the initial interface of the application shown in FIG. 9(*d*). Certainly, the end confirm control 91 may further display corresponding effective wait duration. If the first terminal has not received within the effective wait duration tapping on the end confirm control 91 by the user, the first terminal may also end the currently executing navigation task of the first navigation application in the first terminal.

Figure 10A:
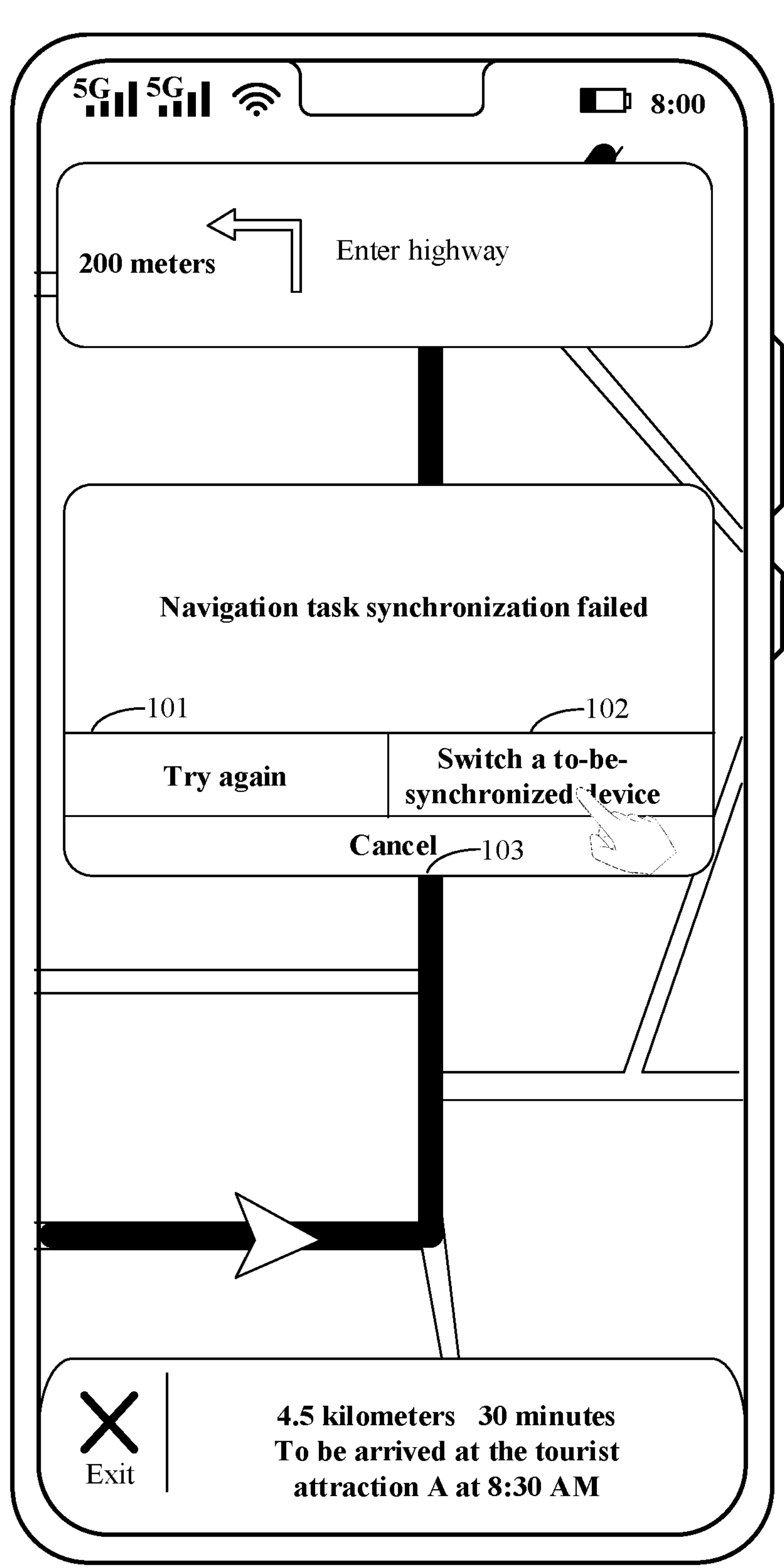
FIG. 10(*a*) and FIG. 10(*b*) are a schematic diagram of a synchronization failure response according to an embodiment of this application.
Figure 10B:
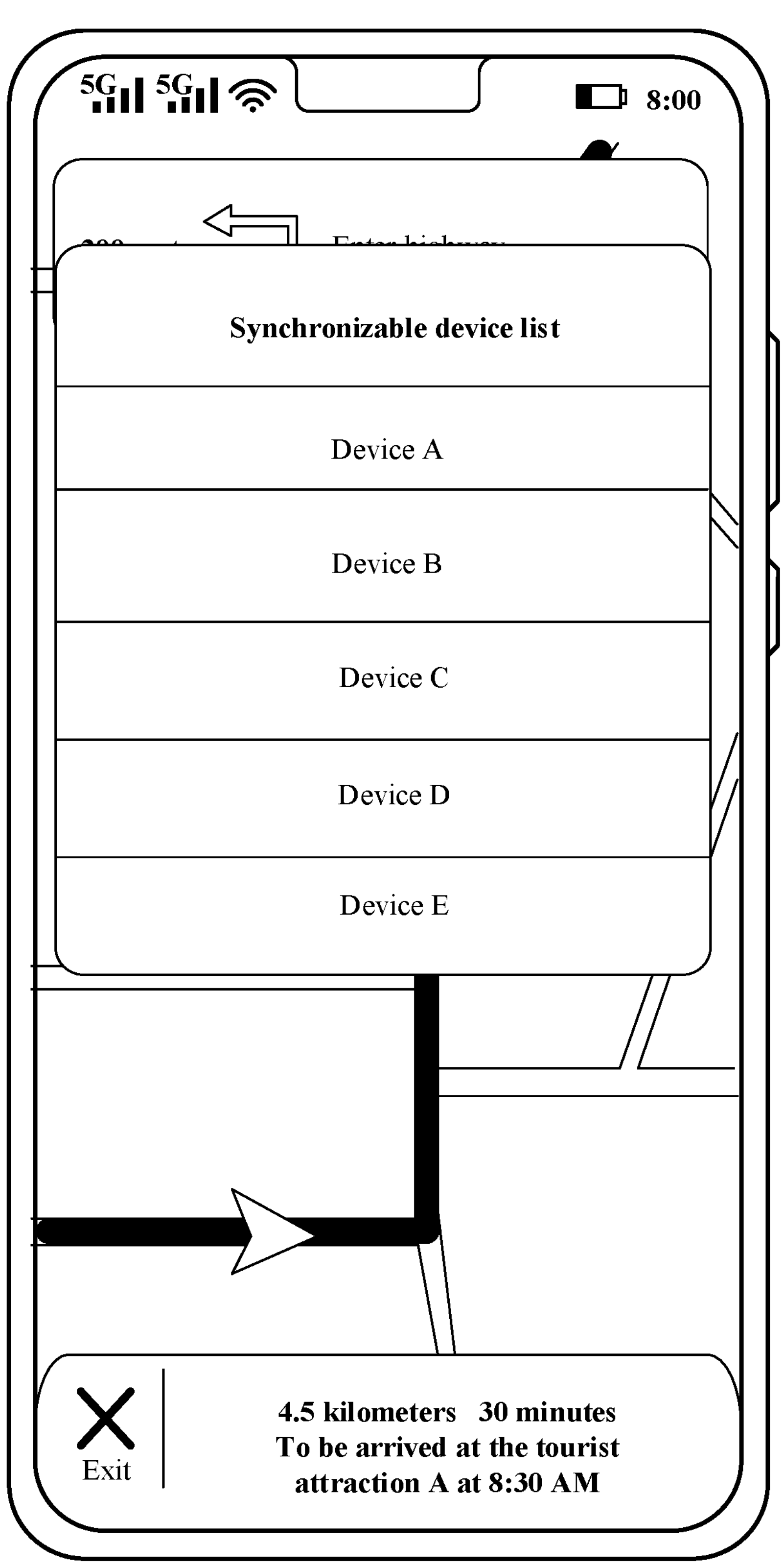

In a possible implementation, maximum wait duration may be configured for the first terminal. If the first terminal sends the navigation synchronization information to the second terminal and has not received, within the maximum wait duration, the navigation synchronization complete information fed back by the second terminal, the first terminal recognizes that the navigation task synchronization to the second terminal fails. In this case, the first terminal may display prompt information indicating that the synchronization fails. For example, FIG. 10(*a*) and FIG. 10(*b*) are a schematic diagram of a synchronization failure response according to an embodiment of this application. With reference to FIG. 10(*a*), if the first terminal has not received the navigation synchronization complete information within the maximum wait duration, the first terminal may display corresponding synchronization failure prompt information in the first navigation application. The prompt information may include a "Try again" control 101, a "Switch the synchronization device" control 102, and a "Cancel" control 103. If the first terminal detects that the user taps the control 101, the first terminal resends the navigation synchronization information to the second terminal, so that the second terminal performs navigation task synchronization again based on the navigation synchronization information. If the first terminal detects that the user taps the control 102, terminal identifiers of other terminals with which synchronization can be performed may be generated, as shown in FIG. 10(*b*). The user may newly select, from the displayed other terminals, a terminal with which navigation task synchronization needs to be performed, and send the navigation synchronization information to the terminal, to implement navigation task synchronization. If the first terminal detects that the user taps the control 103, it indicates to exit the navigation synchronization operation and return to an original interface of the navigation task.

It can be learned from the foregoing that, in the cross-device navigation task synchronization method provided in this embodiment of this application, when the first terminal detects that the cross-device transmission condition is met, the first terminal may automatically obtain the navigation data of the started navigation task from the first navigation application through the local first navigation transfer module of the first terminal, generate, through the first navigation transfer module, the navigation synchronization information corresponding to the navigation data, and send the navigation synchronization information to the second terminal, thereby implementing cross-device navigation data transmission. After receiving the navigation synchronization information, the second terminal may generate and transmit the navigation synchronization information to the second navigation application through the local second navigation transfer module, and then the second terminal may update the navigation task of the second navigation application based on the navigation synchronization information, thereby implementing cross-device navigation task synchronization. In comparison with an existing navigation technology, cross-device navigation task synchronization can be implemented in this application. In a scenario in which cross-device navigation needs to be performed, the user does not need to set a task of a navigation application of a terminal for a plurality of times. Instead, navigation data can be automatically transferred through a navigation transfer module, to update the navigation task of the navigation application, thereby greatly improving navigation task setting efficiency and reducing repeated operations of the user. In addition, after obtaining the navigation data from the first navigation application, the first navigation transfer module in the first terminal does not directly send the navigation data to the second navigation transfer module of the second terminal, but converts the navigation data into the corresponding navigation synchronization information. The navigation synchronization information can be transmitted between navigation transfer modules of different terminals. Then, the navigation synchronization information is transmitted to the second navigation application through the second navigation transfer module. The navigation synchronization information is not directly transmitted between the navigation applications of the two terminals. Therefore, a same navigation application does not need to be installed on the first terminal and the second terminal. In this way, cross-device and cross-application navigation data transfer can be implemented, thereby further improving an application scope of navigation task synchronization.

Embodiment 2

In comparison with Embodiment 1, a cross-device transmission condition in Embodiment 2 is a touch operation transmission condition. To be specific, Embodiment 2 specifically describes a specific implementation procedure when navigation task synchronization is triggered between two terminals through a touch operation. In this embodiment, a first terminal may be a terminal that initiates a touch operation (that is, a terminal that actively approaches another terminal). For example, a user holds the first terminal to initiate the touch operation to the second terminal. Alternatively, a first terminal may be a terminal that passively responds to a touch operation. For example, a user controls a second terminal to initiate the touch operation to the first terminal. For example, the following example is used for description: The first terminal is a smartphone, and the second terminal is an intelligent vehicle control terminal (referred to as a vehicle-mounted terminal for short) mounted on a vehicle.

Figure 11A:
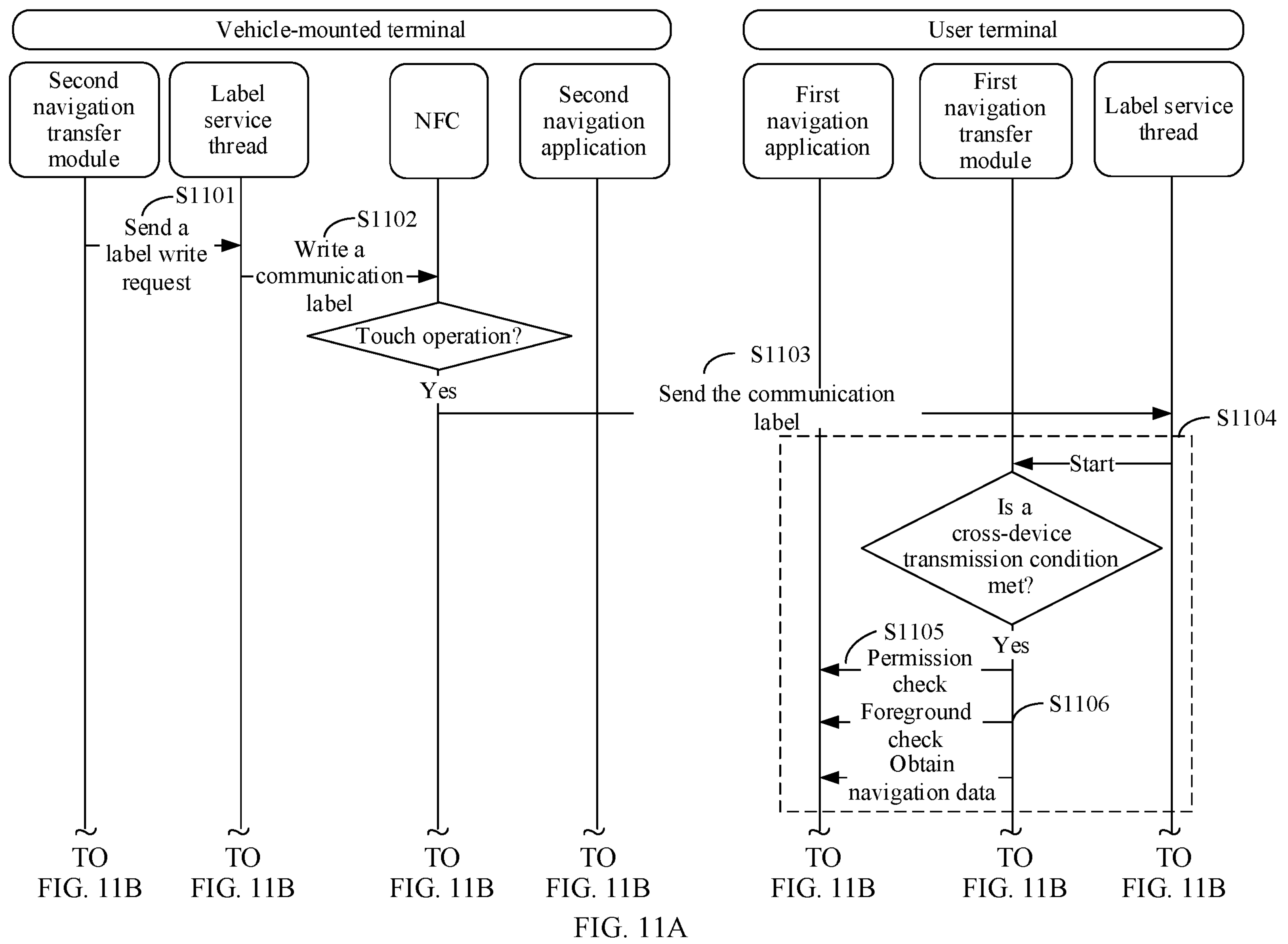
FIG. 11A and FIG. 11B are a schematic diagram of an interaction in a cross-device navigation task synchronization method according to an embodiment of this application.
Figure 11B:
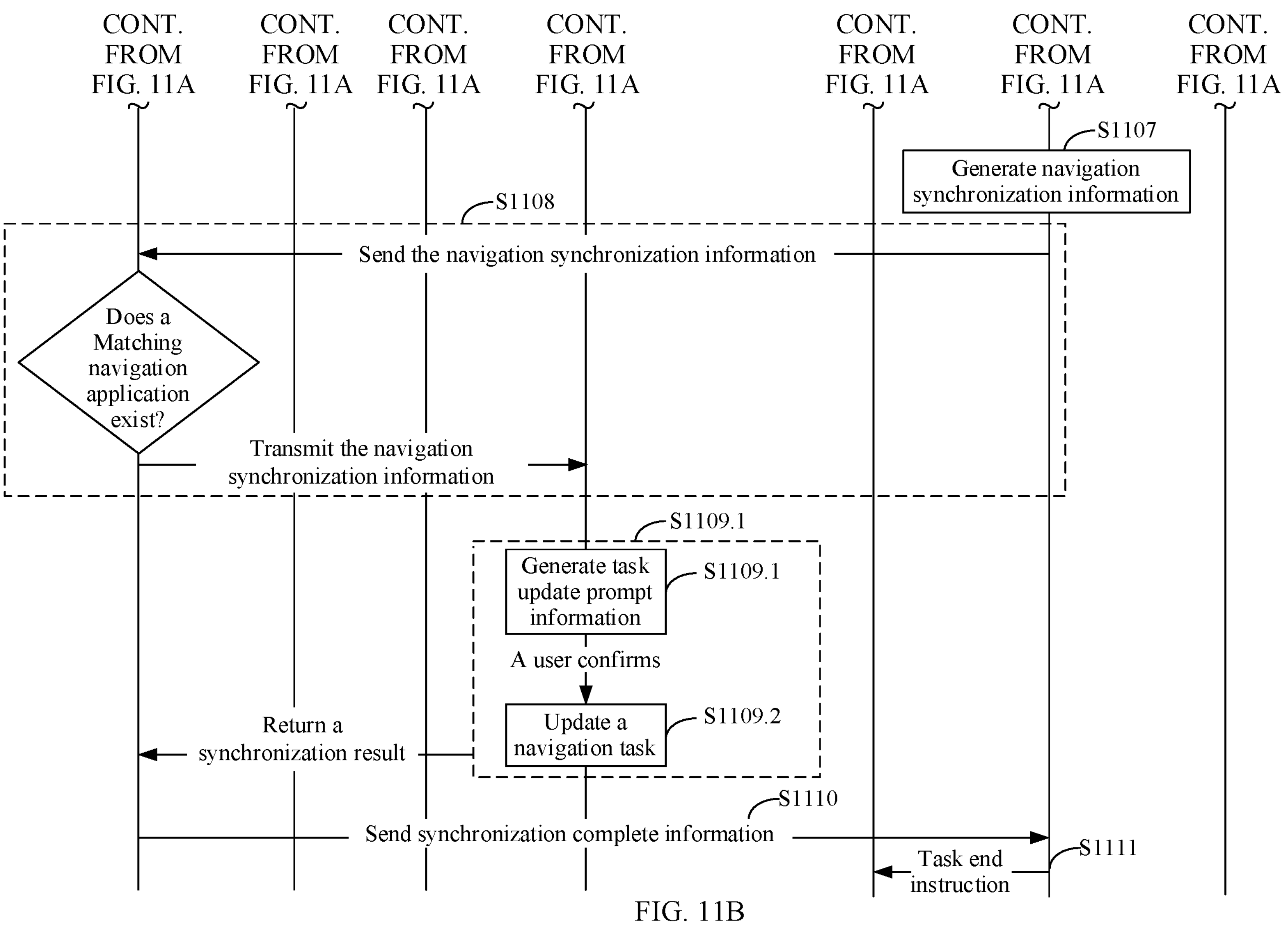

In this embodiment, the user holds the smartphone, and controls the smartphone to perform a touch operation on the vehicle-mounted terminal. The smartphone and the vehicle-mounted terminal are configured with NFC modules. The two terminals can establish a near field communication connection through the NFC modules, to implement data exchange. For example, FIG. 11A and FIG. 11B are a schematic diagram of an interaction in a cross-device navigation task synchronization method according to an embodiment of this application. The synchronization method is applied to a touch trigger scenario. A specific interaction process is as follows:

S1103: The vehicle-mounted terminal sends a communication label to the smartphone through the near field communication module of the vehicle-mounted terminal in response to the touch operation with the smartphone.

In this embodiment, the user may control the smartphone to initiate the touch operation to the vehicle-mounted terminal. In this case, a distance between the NFC module of the vehicle-mounted terminal and the NFC module of the smartphone is less than a preset distance threshold. Therefore, a near field communication connection may be established between the vehicle-mounted terminal and the smartphone through the NFC modules. In this case, the vehicle-mounted terminal may send the prewritten communication label to the smartphone through the established near field communication connection.

Figure 12:
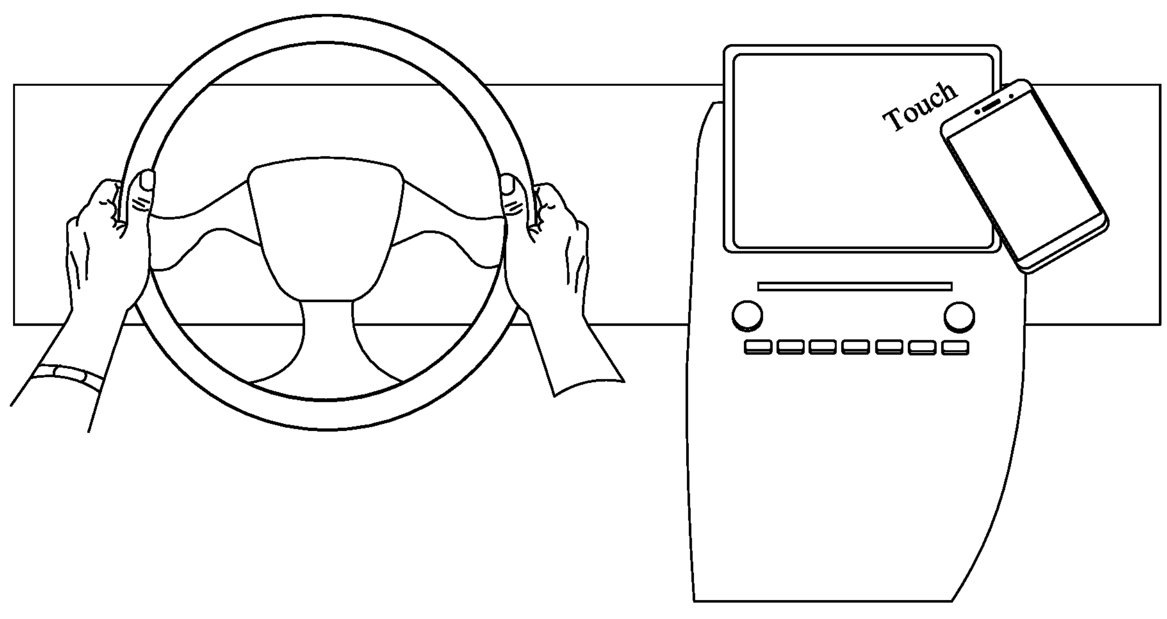
FIG. 12 is a schematic diagram of a touch scenario of a vehicle-mounted terminal and a smartphone according to an embodiment of this application.
Figure 13A:
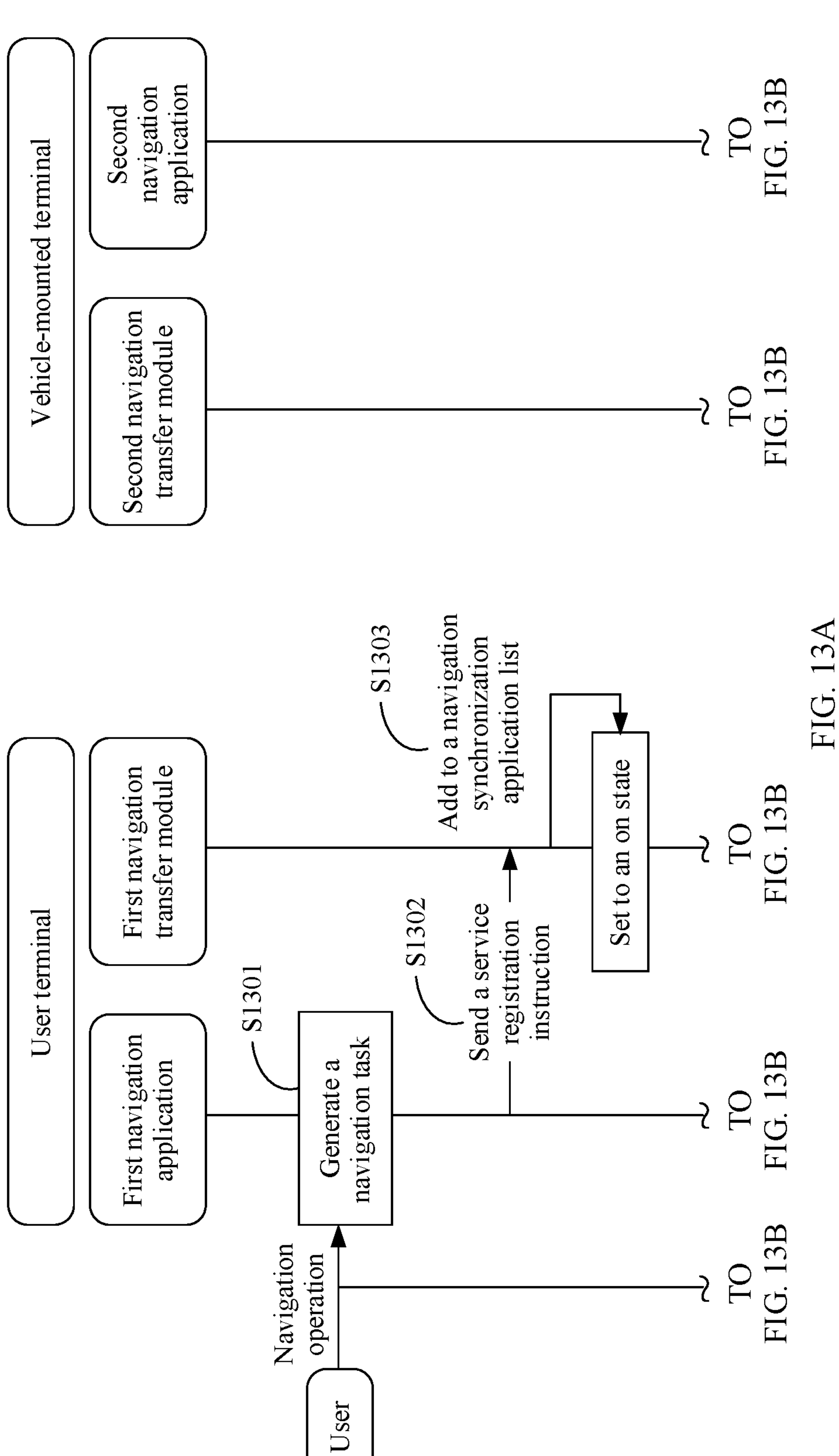
FIG. 13A, FIG. 13B, FIG. 13C, FIG. 13D, and FIG. 13E are a schematic diagram of an interaction in a navigation task synchronization method according to an embodiment of this application.
Figure 13B:
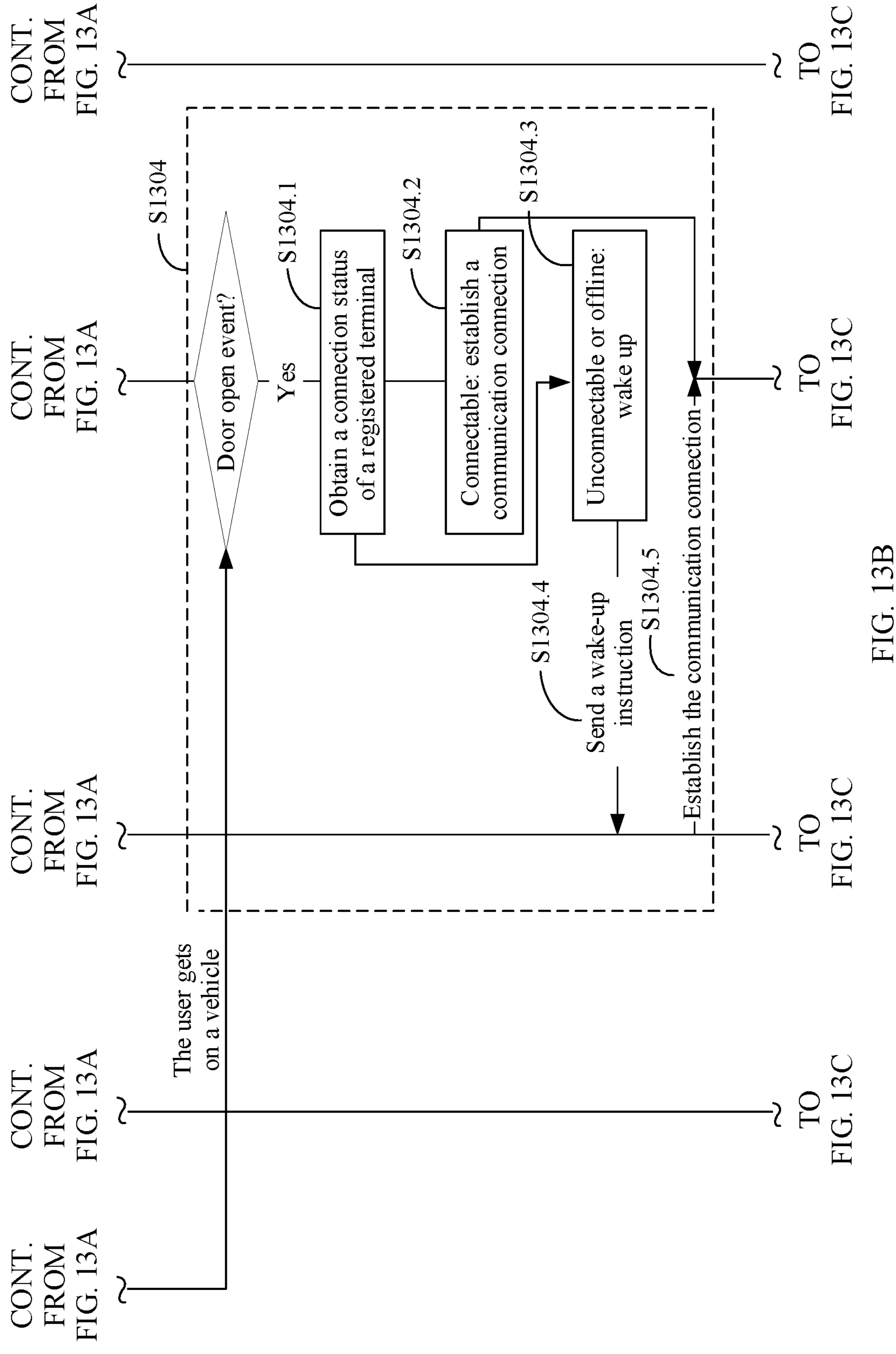
Figure 13C:
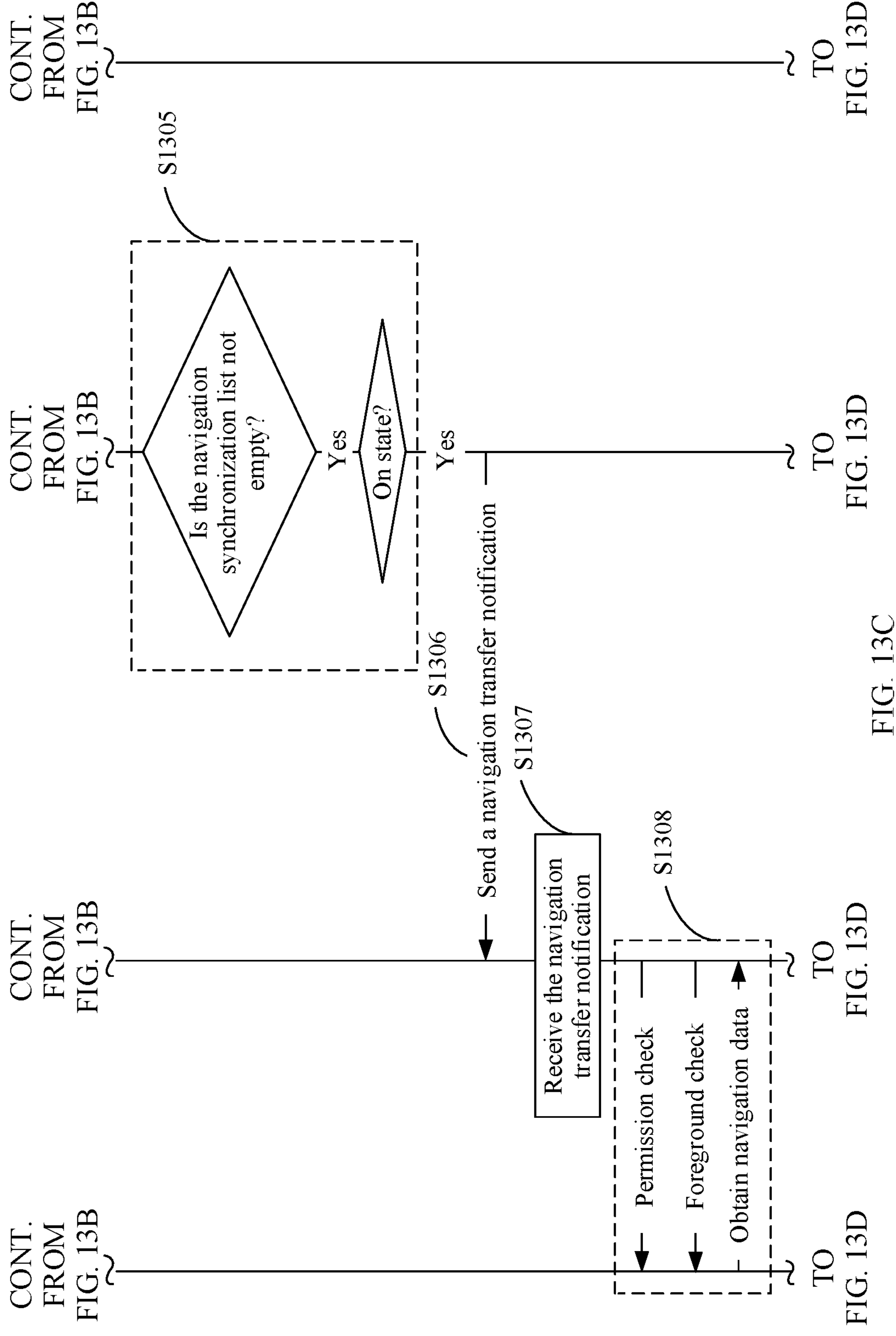
Figure 13D:
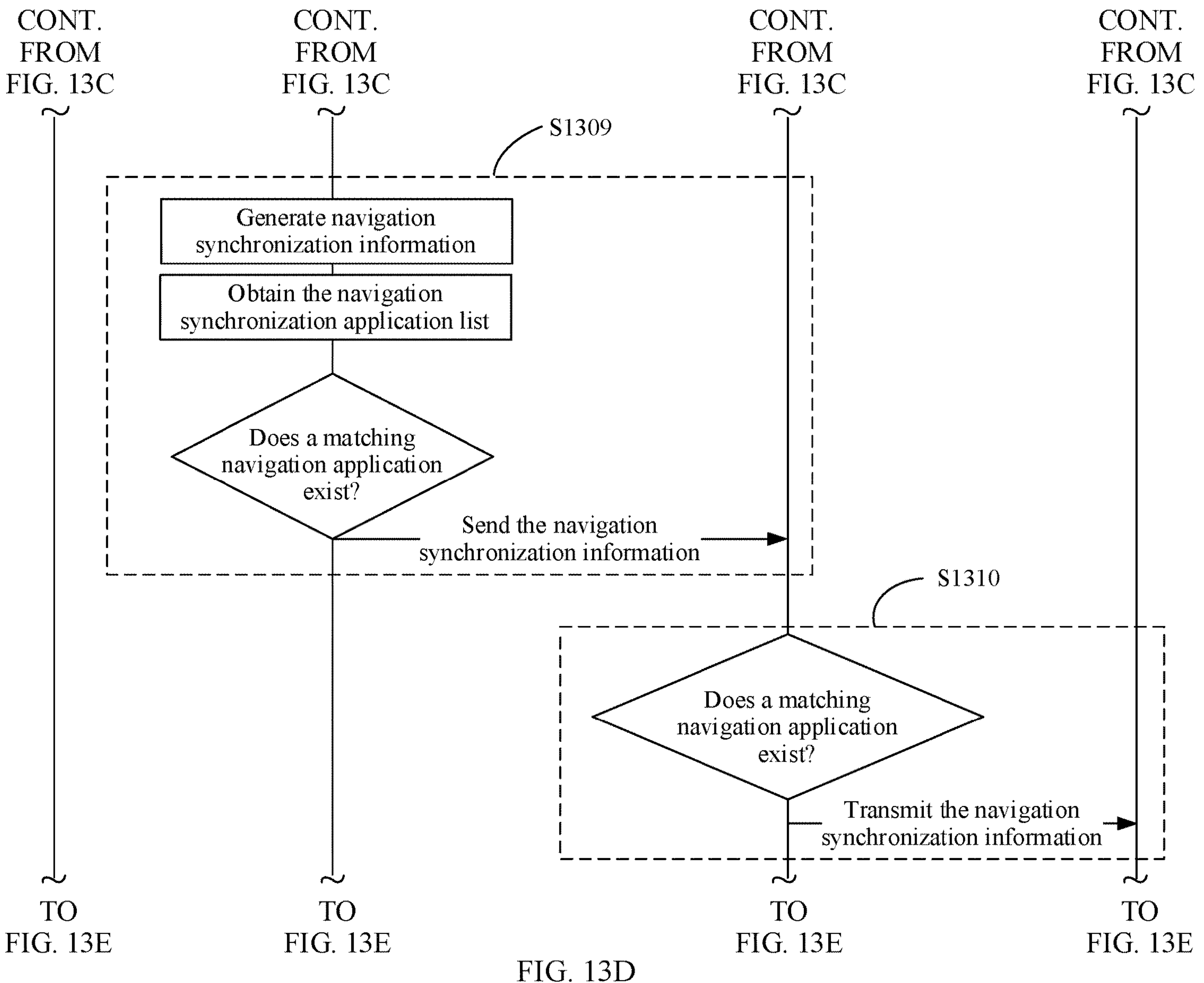
Figure 13E:
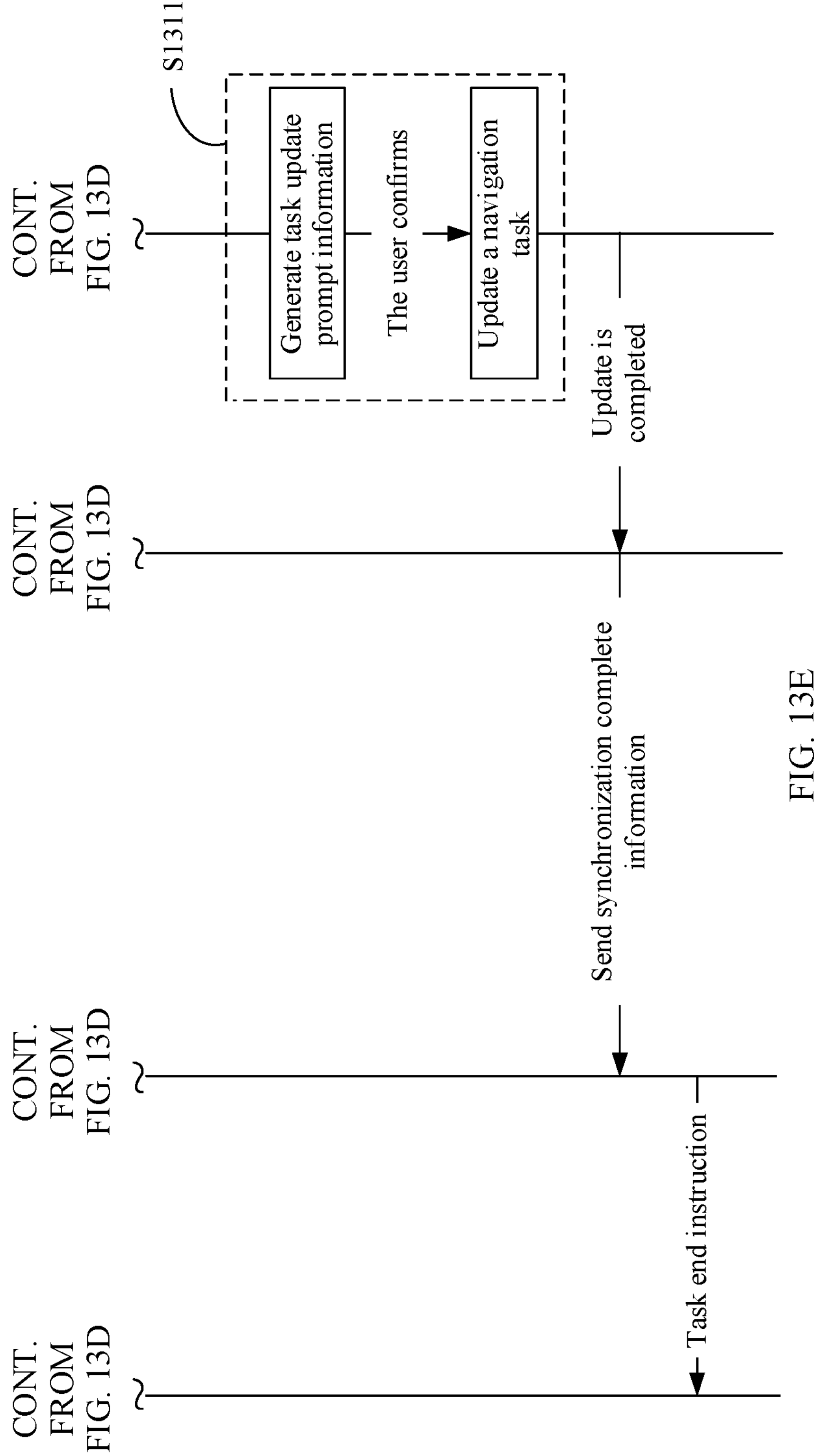

For example, FIG. 12 is a schematic diagram of a touch scenario of a vehicle-mounted terminal and a smartphone according to an embodiment of this application. With reference to FIG. 12, the user holds the smartphone, and the smartphone touches the vehicle-mounted terminal, to activate the NFC modules of the two terminals and establish the near field communication connection between the two terminals through the NFC modules, thereby transmitting the communication label and subsequent navigation synchronization information.

In this embodiment, to start a synchronization procedure of a navigation task, the communication label sent by the vehicle-mounted terminal may carry a navigation task synchronization start identifier. After receiving the communication label including the start identifier, the smartphone may determine that a cross-device transmission condition is met, and start the synchronization procedure of the navigation task.

In this embodiment, in addition to the navigation task synchronization start identifier, the communication label may further include a terminal identifier of the vehicle-mounted terminal, a module identifier of the NFC module, and the like. Certainly, the vehicle-mounted terminal may further add an application identifier of a locally installed navigation application to the communication label. Information specifically included in the communication label may be adjusted according to an actual case. Content of the communication label is not limited herein.

Further, in another embodiment of this application, before the vehicle-mounted terminal responds to the touch operation initiated by the smartphone, the vehicle-mounted terminal may prewrite the communication label to the near field communication module of the vehicle-mounted terminal. In other words, before step S1103, steps S1101 and S1102 may be included. Specific description is as follows:

S1101: The vehicle-mounted terminal sends a label write request to a label service thread through a second navigation transfer module if a preset label write condition is met.

S1102: The vehicle-mounted terminal responds to the label write request through the label service thread, adds the start identifier to the communication label, and writes the communication label to the near field communication module of the vehicle-mounted terminal.

In this embodiment, the vehicle-mounted terminal may first send the label write request to a label service through the second navigation transfer module configured in the vehicle-mounted terminal when the preset label write condition is met, to write the corresponding communication label to the near field communication module of the vehicle-mounted terminal. The label write condition may be specifically that the vehicle-mounted terminal is started. For example, when the vehicle is started, the vehicle-mounted terminal mounted on the vehicle is simultaneously started. In this case, the vehicle-mounted terminal recognizes that the preset label write condition is met, and performs the operation of step S1101.

In this embodiment, the label service thread is run in the vehicle-mounted terminal. The label service thread is specifically used to write the communication label to the near field communication module of the vehicle-mounted terminal. Therefore, when the second navigation transfer module sends the label write request to the label service thread, it indicates that the vehicle-mounted terminal starts a navigation task synchronization service. On this basis, the label service write thread may generate the start identifier and add the start identifier to the communication label, and write the communication label with the added start identifier to the near field communication module of the vehicle-mounted terminal.

In this embodiment of this application, when the label write condition is met, the label service thread writes, to the near field communication module of the vehicle-mounted terminal, the communication label carrying navigation task synchronization. Therefore, when the communication label is sent to the peer end, the navigation task synchronization procedure can be automatically started, thereby reducing operations of the user and improving synchronization efficiency.

S1104: In response to the communication label, the smartphone starts a first navigation transfer module, and obtains navigation data from a first navigation application through the first navigation transfer module.

In this embodiment, after receiving the communication label sent by the vehicle-mounted terminal, the smartphone may parse the communication label. If the smartphone detects that the communication label carries the navigation synchronization start identifier, the smartphone may start and configure the first navigation transfer module in the smartphone, and obtain the navigation data from the first navigation application through the first navigation transfer module.

Optionally, before the first navigation transfer module obtains the navigation data from the first navigation application, precondition determining may be performed. The following two steps of determining may be specifically included:

S1105: Determine whether the first navigation application has navigation task synchronization permission.

S1106: Determine whether the first navigation application is currently run in the foreground of the smartphone.

If both determining operations are yes, the first navigation transfer module may obtain the navigation data from the first navigation application. For a specific process and manner of determining, refer to the related description of step S201 in Embodiment 1. Details are not described herein again.

S1107: The smartphone generates the navigation synchronization information of the navigation data through the first navigation transfer module.

Because an implementation of step S1107 is completely the same as that of step S202 in Embodiment 1, for specific description, reference may be made to the related description of step S202. Details are not described herein again.

S1108: The vehicle-mounted terminal receives the navigation synchronization information sent by the smartphone, and transmits the navigation synchronization information to a second navigation application through the second navigation transfer module.

Because an implementation of step S1108 is completely the same as that of step S203 in Embodiment 1, for specific description, reference may be made to the related description of step S203. Details are not described herein again. In other words, in step S1108, the vehicle-mounted terminal may also determine whether a navigation application matching the first navigation application is locally installed on the vehicle-mounted terminal, and recognizes the matching navigation application as the second navigation application if the matching navigation application exists.

S1109: The vehicle-mounted terminal updates a navigation task of the second navigation application based on the navigation synchronization information.

Optionally, step S1109 may further include:

S1109.1: The vehicle-mounted terminal determines a navigation destination based on the navigation synchronization information, and generates task update prompt information based on the navigation destination.

S1109.2: The vehicle-mounted terminal updates the navigation task based on the navigation destination if the vehicle-mounted terminal receives an update confirmation instruction fed back based on the update prompt information.

An implementation of step S1109 is completely the same as that of step S204 in Embodiment 1. An implementation of step S1109.1 is completely the same as that of step S204.1 in Embodiment 1. An implementation of step S1109.2 is completely the same as that of step S204.2 in Embodiment 1. For specific description, refer to the related description of steps S204, S204.1, and S204.2. Details are not described herein again.

Optionally, after step S1109, the following may be further included:

S1110: The vehicle-mounted terminal sends navigation synchronization complete information to the smartphone through the second navigation transfer module.

S1111: The smartphone transmits, to the first navigation application through the first navigation transfer module in response to the navigation synchronization complete information, an end instruction about the navigation task, to stop the navigation task of the first navigation application.

An implementation of step S1110 is completely the same as that of step S205 in Embodiment 1. An implementation of step S1111 is completely the same as that of step S206 in Embodiment 1. For specific description, refer to the related description of steps S205 and S206. Details are not described herein again.

In this embodiment of this application, when no wireless connection has been established between the first terminal and the second terminal, the communication connection between the first terminal and the second terminal may be quickly established through the touch operation. The navigation task synchronization start identifier is added to the communication label. The communication label is sent to the first terminal through the near field communication connection, to quickly start the navigation task synchronization procedure, thereby improving navigation task synchronization efficiency.

Embodiment 3

In comparison with Embodiment 1, an application scenario of this embodiment is specifically that when a vehicle is started, a navigation task of a user terminal carried by a user is synchronized to an intelligent vehicle control terminal mounted on the vehicle. On this basis, a first terminal is specifically the user terminal carried by the user, and a second terminal is the vehicle-mounted terminal. FIG. 13A, FIG. 13B, FIG. 13C, FIG. 13D, and FIG. 13E are a schematic diagram of an interaction in a navigation task synchronization method according to an embodiment of this application. Specific description is as follows:

S1301: The user terminal generates a navigation task through a first navigation application in response to a navigation operation of the user. Navigation data is generated based on the navigation task.

S1302: The user terminal receives, through a first navigation transfer module, a service registration instruction transmitted by the first navigation application. The service registration instruction is used to authorize the first navigation application to have permission to transmit navigation data between devices.

S1303: In response to the service registration instruction, the user terminal adds the first navigation application to a navigation synchronization application list, and sets the first navigation transfer module to an on state. The on state is used to: when a cross-device transmission condition is met, send, to the vehicle-mounted terminal, navigation synchronization information generated based on the first navigation application.

An implementation of step S1301 is completely the same as that of step S200.1 in Embodiment 1. An implementation of step S1302 is completely the same as that of step S200.2 in Embodiment 1. An implementation of step S1303 is completely the same as that of step S200.3 in Embodiment 1. For specific description, refer to the related description of steps S200.1 to S200.3. Details are not described herein again.

In comparison with Embodiment 1, before the user terminal obtains the navigation data from the first navigation application through the first navigation transfer module if the preset cross-device transmission condition is met, this embodiment further includes:

S1304: The vehicle-mounted terminal establishes a communication connection to the user terminal if a start event about the vehicle is detected.

In this embodiment, an application scenario is that after the user gets on the vehicle, switching from a walking scenario to a driving scenario is started. In this case, a navigation task of the user terminal needs to be synchronized to the vehicle-mounted terminal of the vehicle. Therefore, a trigger event is specifically detecting that the vehicle is started. The start event includes a vehicle door open event, a vehicle ignition event, a vehicle power button press event, or the like, and may be used to determine a start time of the vehicle. When the start event about the vehicle is detected, the vehicle-mounted terminal may recognize that a navigation scenario of the user changes. Therefore, the vehicle-mounted terminal may establish the communication connection to the user terminal carried by the user. The communication connection may be a communication connection established through near field communication modules. The near field communication module may be a module that can implement near field wireless communication, such as a Bluetooth communication module, a Bluetooth low-energy communication module, or a Wi-Fi module.

In this embodiment, an operation of recognizing the trigger event is completed by the vehicle-mounted terminal. The reason is as follows: In a scenario in which the user terminal synchronizes the navigation task to the vehicle-mounted terminal, it is relatively difficult to recognize whether the user has started the vehicle. However, when the start event of the vehicle is detected by using the vehicle-mounted terminal, the vehicle-mounted terminal can simply and accurately determine that the navigation scenario of the user is switched to the driving scenario, thereby improving accuracy of navigation task synchronization and reducing recognition difficulty.

In this embodiment, the wireless communication connection is specifically established between the user terminal and the vehicle-mounted terminal. If the wireless communication connection has been established between the user terminal and the vehicle-mounted terminal, the user terminal and the vehicle-mounted terminal have recorded connection information of the user terminal and the vehicle-mounted terminal. The connection information includes but is not limited to a device identifier, a connection key, a wireless network identifier, and the like. In this case, the vehicle-mounted terminal and the user terminal may establish the communication connection between the vehicle-mounted terminal and the user terminal based on the recorded connection information.

For example, a Bluetooth communication connection is established between the user terminal and the vehicle-mounted terminal, the user terminal records Bluetooth connection information of the vehicle-mounted terminal, and the vehicle-mounted terminal also adds the user terminal to an authorized device list. Similarly, the vehicle-mounted terminal also stores Bluetooth connection information of the user terminal, and the user terminal also adds the vehicle-mounted terminal to a local authorized device list of the vehicle-mounted terminal. If the vehicle-mounted terminal finds and detects the door open event of the vehicle, the vehicle-mounted terminal may find whether a Bluetooth signal of the user terminal is detected. If the Bluetooth signal of the user terminal is found, the vehicle-mounted terminal sends a Bluetooth connection request to the user terminal based on the Bluetooth connection information of the user terminal. Because the vehicle-mounted terminal is recorded in the authorized device list of the user terminal, the user terminal agrees to the Bluetooth connection request, and establishes the Bluetooth communication connection to the vehicle-mounted terminal.

Further, in another embodiment of this application, a manner of establishing the communication connection between the user terminal and the vehicle-mounted terminal may be specifically implemented by using the following steps:

S1304.1: The vehicle-mounted terminal recognizes a connection status of each registered terminal in a preset registered device list through a second navigation transfer module.

In this embodiment, after detecting the door open event of the vehicle, the vehicle-mounted terminal may search for a radio signal in a current scenario through a wireless communication module. Therefore, the vehicle-mounted terminal can determine the connection status of each connected registered terminal in the prestored registered device list based on the found radio signal, and feed back the collection result to the second navigation transfer module of the vehicle-mounted terminal. The second navigation transfer module may perform a corresponding operation based on the connection status corresponding to each registered terminal. If a wireless signal of a registered terminal is found in the current scenario, it may be recognized that the registered terminal is in a connectable state, that is, the device is in an online state. On the contrary, if a wireless signal of a registered terminal is found in the current scenario, it may be recognized that the registered terminal is in an unconnectable state, that is, the device is in an offline state.

S1304.2: If the vehicle-mounted terminal recognizes that the user terminal is in the registered device list and a connection status of the user terminal is a connectable state, the vehicle-mounted terminal establishes the communication connection to the user terminal based on connection information associated with the user terminal in the registered device list.

In this embodiment, if the user terminal is in the online state, that is, the user terminal and the vehicle-mounted terminal are in the connectable state, in this case, the vehicle-mounted terminal may send, to the user terminal, the connection information associated with the user terminal. The connection information is recorded in a local memory by the vehicle-mounted terminal in a historical connection process between the user terminal and the vehicle-mounted terminal. Therefore, after receiving the connection information, the user terminal may recognize that a request for establishing the current wireless connection is valid. Therefore, the user terminal responds to the connection request, and establishes the communication connection to the vehicle-mounted terminal.

S1304.3: If the vehicle-mounted terminal recognizes that the user terminal is not in the registered device list, or the user terminal is in the registered device list and a connection status of the user terminal is an unconnectable state, the vehicle-mounted terminal sends a wake-up instruction to the user terminal through the near field communication module of the vehicle-mounted terminal.

In this embodiment, if the user terminal is in the offline state, there are two possibilities. A first possibility is that the user terminal is in a screen-off state or a standby state, and a wireless communication module in the user terminal is not woken up. Another possibility is that the user terminal establishes a wireless communication connection to another terminal, and therefore the corresponding connection status is the unconnectable state. In this case, the vehicle-mounted terminal may wake up a mobile phone through a soft bus, that is, send the wake-up instruction to the user terminal through the near field communication module of the vehicle-mounted terminal, to adjust the connection status of the user terminal.

S1304.4: The user terminal receives the wake-up instruction sent by the vehicle-mounted terminal through the near field communication module of the vehicle-mounted terminal.

S1304.5: The user terminal sends a wireless connection request to the vehicle-mounted terminal in response to the wake-up instruction, to establish the communication connection to the vehicle-mounted terminal.

In this embodiment, the user terminal receives the wake-up instruction through the local near field communication module (that is, the near field communication module of the user terminal), and then adjusts a connection status of the local near field communication module to a connectable state. In this case, the user terminal may establish the communication connection to the vehicle-mounted terminal. Therefore, the user terminal may send the wireless connection request to the vehicle-mounted terminal through the near field communication module of the user terminal. After receiving the wireless connection request, the vehicle-mounted terminal may update device information of the user terminal in the locally stored registered device list, and may establish the communication connection to the user terminal.

In this embodiment of this application, the vehicle-mounted terminal first determines, based on the connection status of each registered device in the registered device list, whether the user terminal is currently in the connectable state. If the user terminal is in the connectable state, the vehicle-mounted terminal directly connects to the user terminal. If the user terminal is in the unconnectable state, the vehicle-mounted terminal sends the wake-up instruction, to change the connection status of the user terminal, so that the vehicle-mounted terminal and the user terminal can be reconnected, thereby improving a success rate of a wireless connection.

S1305: The vehicle-mounted terminal obtains the navigation synchronization application list, and obtains a setting status of the second navigation transfer module if the navigation synchronization application list is not empty.

In this embodiment, after establishing the communication connection to the user terminal, the vehicle-mounted terminal may recognize whether a navigation application supporting navigation task synchronization is installed on the vehicle-mounted terminal. The navigation application supporting navigation task synchronization is recorded in the navigation synchronization application list. Therefore, after establishing the communication connection to the user terminal, the vehicle-mounted terminal may recognize whether the navigation application list is empty. If the navigation application list is not empty, it indicates that the vehicle-mounted terminal supports the navigation task synchronization operation. In this case, the vehicle-mounted terminal may obtain the setting status corresponding to the second navigation transfer module.

In this embodiment, the navigation application installed on the vehicle-mounted terminal needs to support the navigation task synchronization operation. In addition, the user also needs to enable the navigation task synchronization service. In this case, the vehicle-mounted terminal needs to recognize the setting state corresponding to the second navigation transfer module. If the setting state of the second navigation transfer module is the on state, the vehicle-mounted terminal recognizes that the user has enabled the navigation task synchronization service, and performs the operation of step S1306. On the contrary, if the vehicle-mounted terminal recognizes that the second navigation transfer module is in the off state, it indicates that the user does not enable the navigation task synchronization service. In this case, the vehicle-mounted terminal ends the navigation task synchronization operation.

S1306: The vehicle-mounted terminal sends a navigation transfer notification to the user terminal if the second navigation transfer module is in the on state, so that the user terminal sends the navigation synchronization information.

Figure 14A:
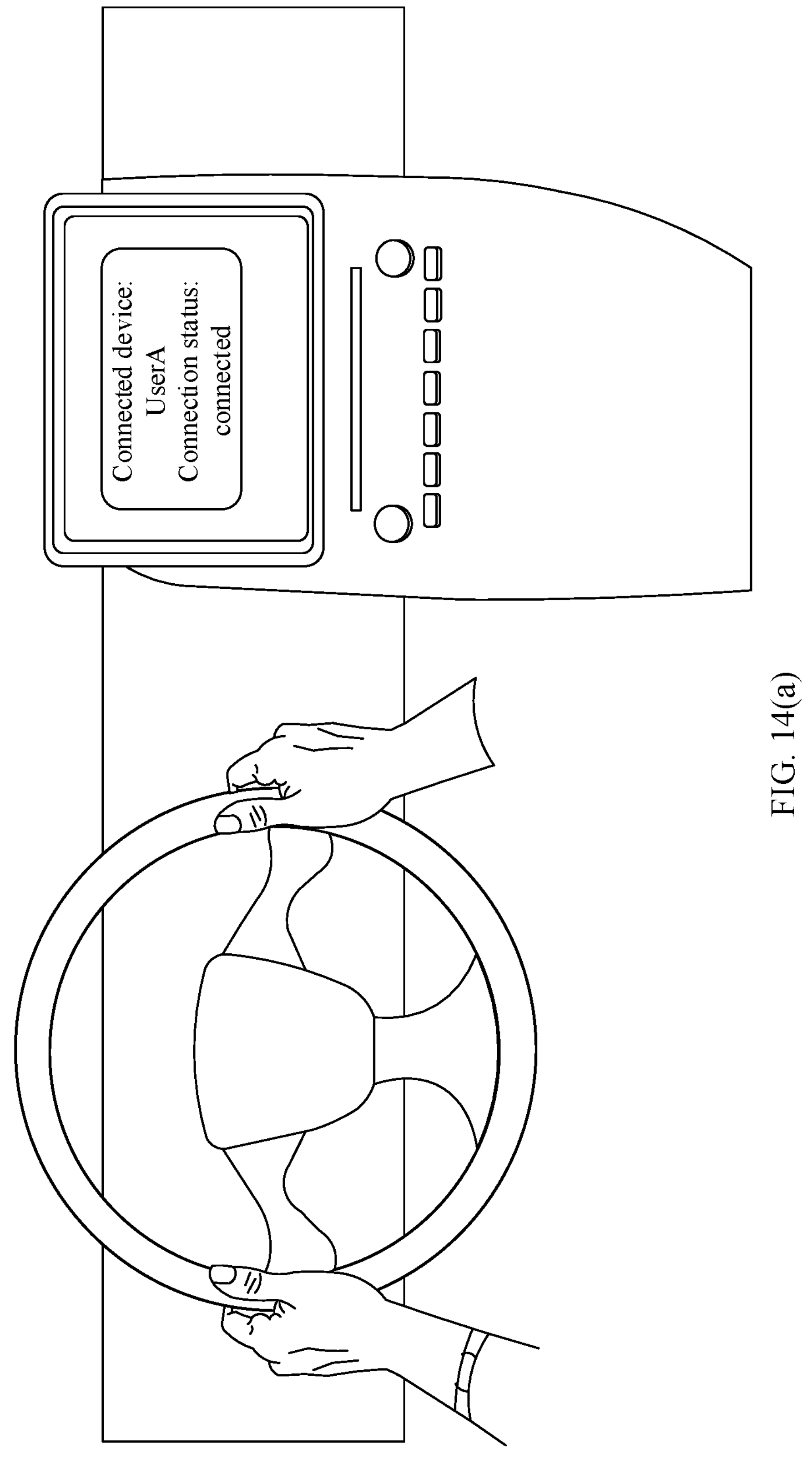
FIG. 14(*a*) and FIG. 14(*b*) are a schematic diagram of an interface of a vehicle-mounted terminal according to an embodiment of this application.
Figure 14B:
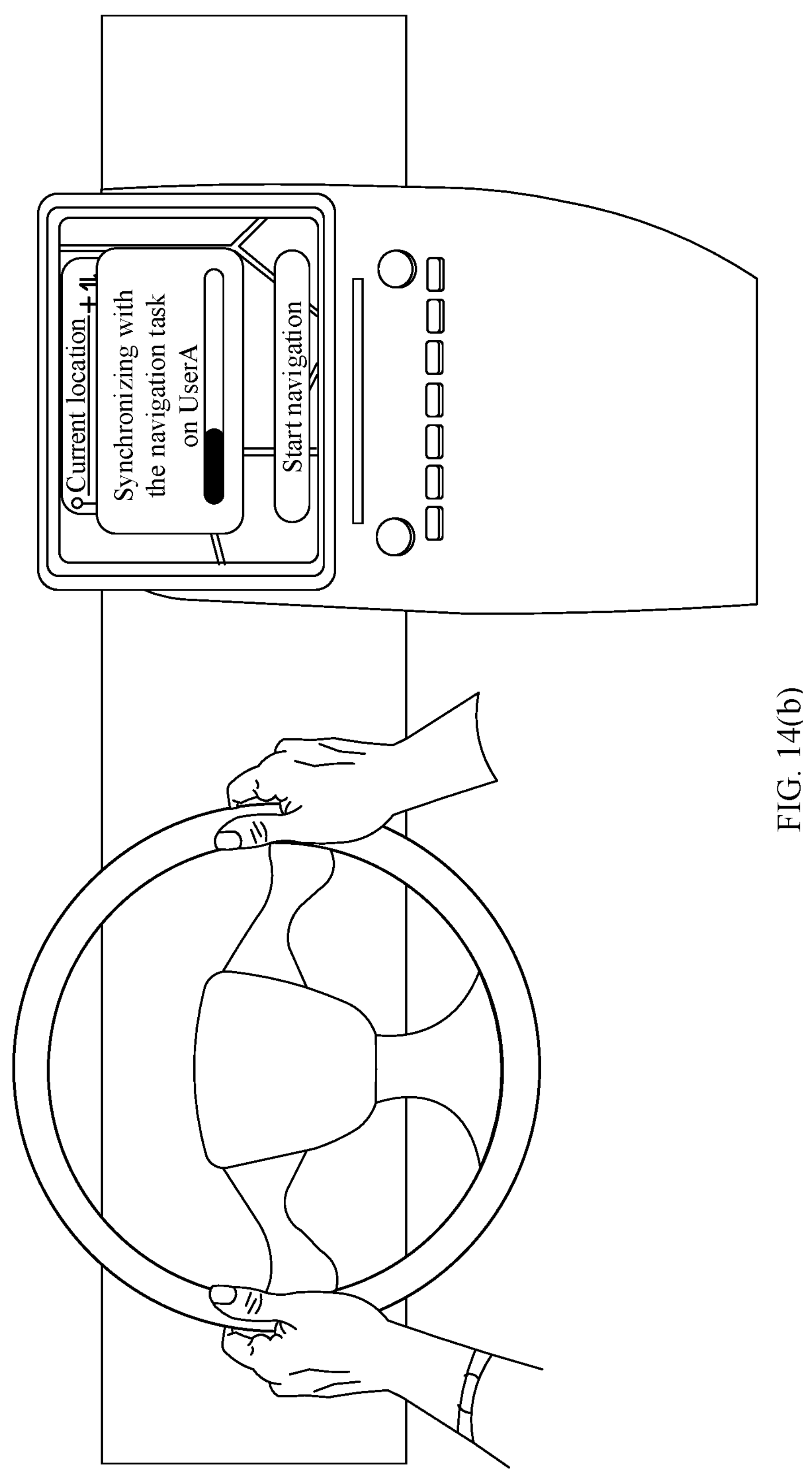

In this embodiment, when detecting that the second navigation transfer module is in the on state, the vehicle-mounted terminal may send the navigation transfer notification to the user terminal, to start a navigation task synchronization procedure. For example, FIG. 14(*a*) and FIG. 14(*b*) are a schematic diagram of an interface of a vehicle-mounted terminal according to an embodiment of this application. After the vehicle-mounted terminal is started, if the vehicle-mounted terminal recognizes that the user terminal is in the connectable state, the vehicle-mounted terminal may directly establish the communication connection to the user terminal, and display a current connection status in the interface. As shown in FIG. 14(*a*), the interface displays a terminal identifier of the user terminal that is being connected to the vehicle-mounted terminal, for example, "UserA", and the current connection status, for example, "connected". In this case, if the application supporting navigation task synchronization is installed on the vehicle-mounted terminal, and the navigation task synchronization service is enabled, a second navigation application that is installed locally on the vehicle-mounted terminal and that supports navigation task synchronization may be started. As shown in FIG. 14(*b*), a current synchronization progress is displayed, for example, prompt information "Synchronizing with the navigation task on UserA".

In a possible implementation, if a same user account is logged in on the user terminal and the vehicle-mounted terminal, the communication connection established between the user terminal and the vehicle-mounted terminal is specifically a server-based communication connection. In other words, the user terminal and the vehicle-mounted terminal may exchange data based on a server.

Figure 15:
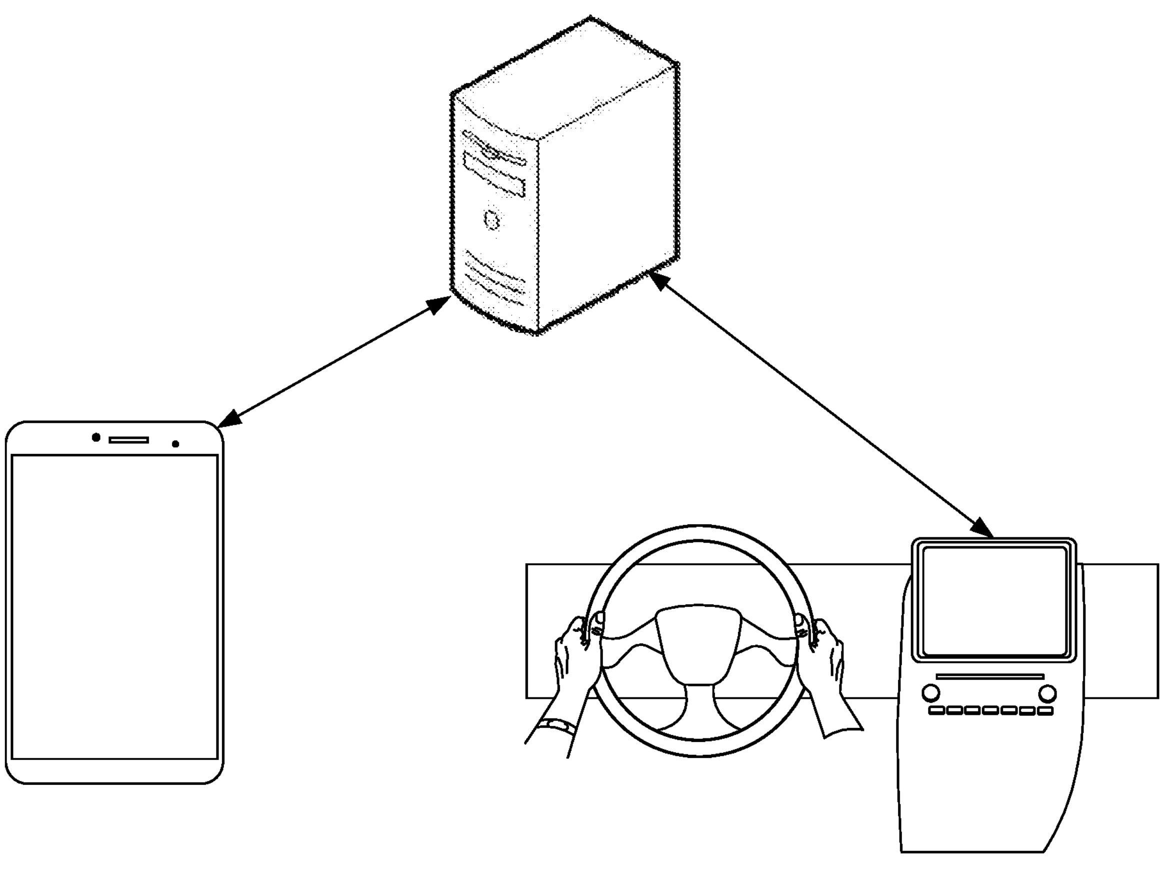
FIG. 15 is a flowchart of a three-party interaction among a user terminal, a vehicle-mounted terminal, and a server according to an embodiment of this application.
Figure 16A:
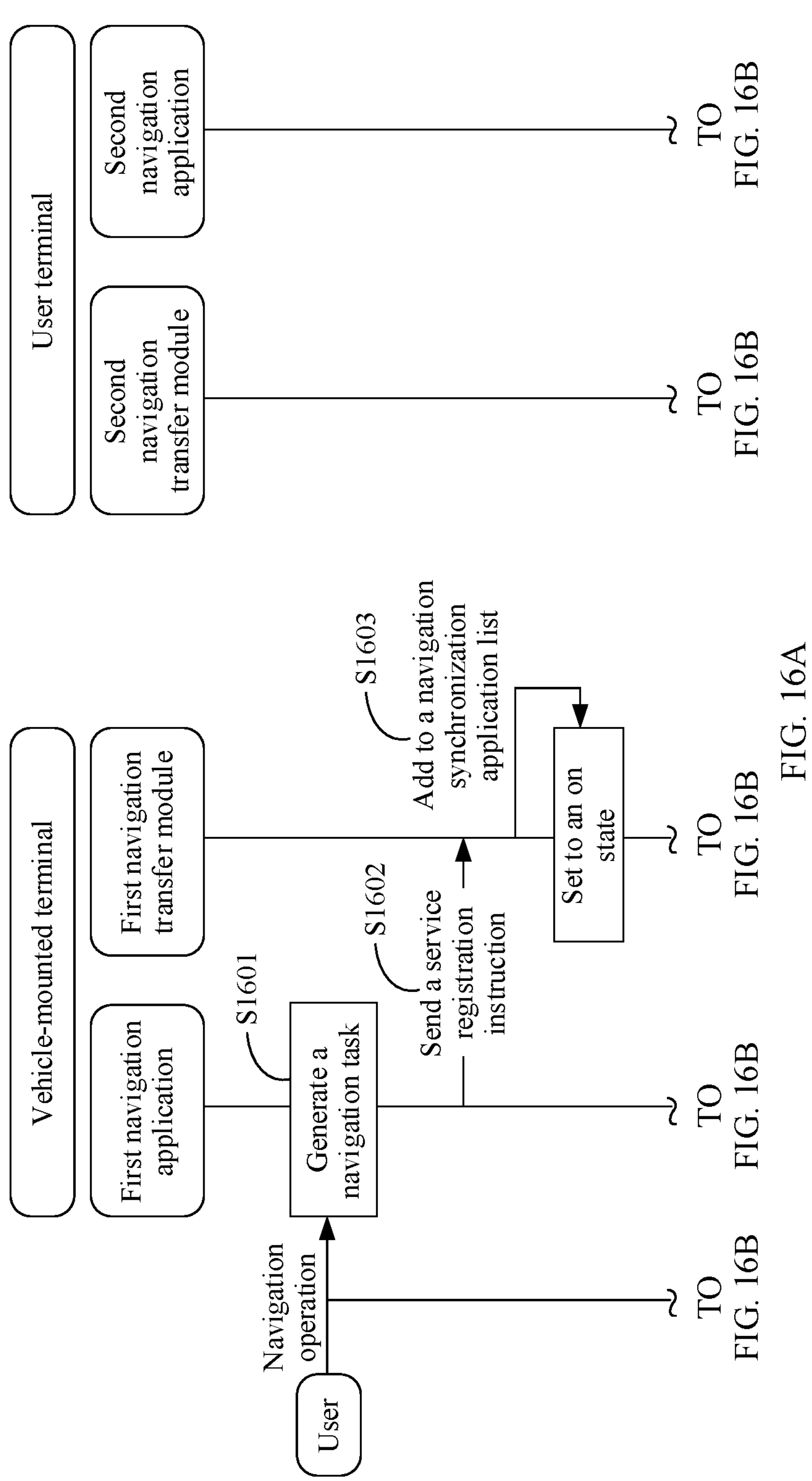
FIG. 16A, FIG. 16B, FIG. 16C, and FIG. 16D are a schematic diagram of an interaction in a navigation task synchronization method according to an embodiment of this application.
Figure 16B:
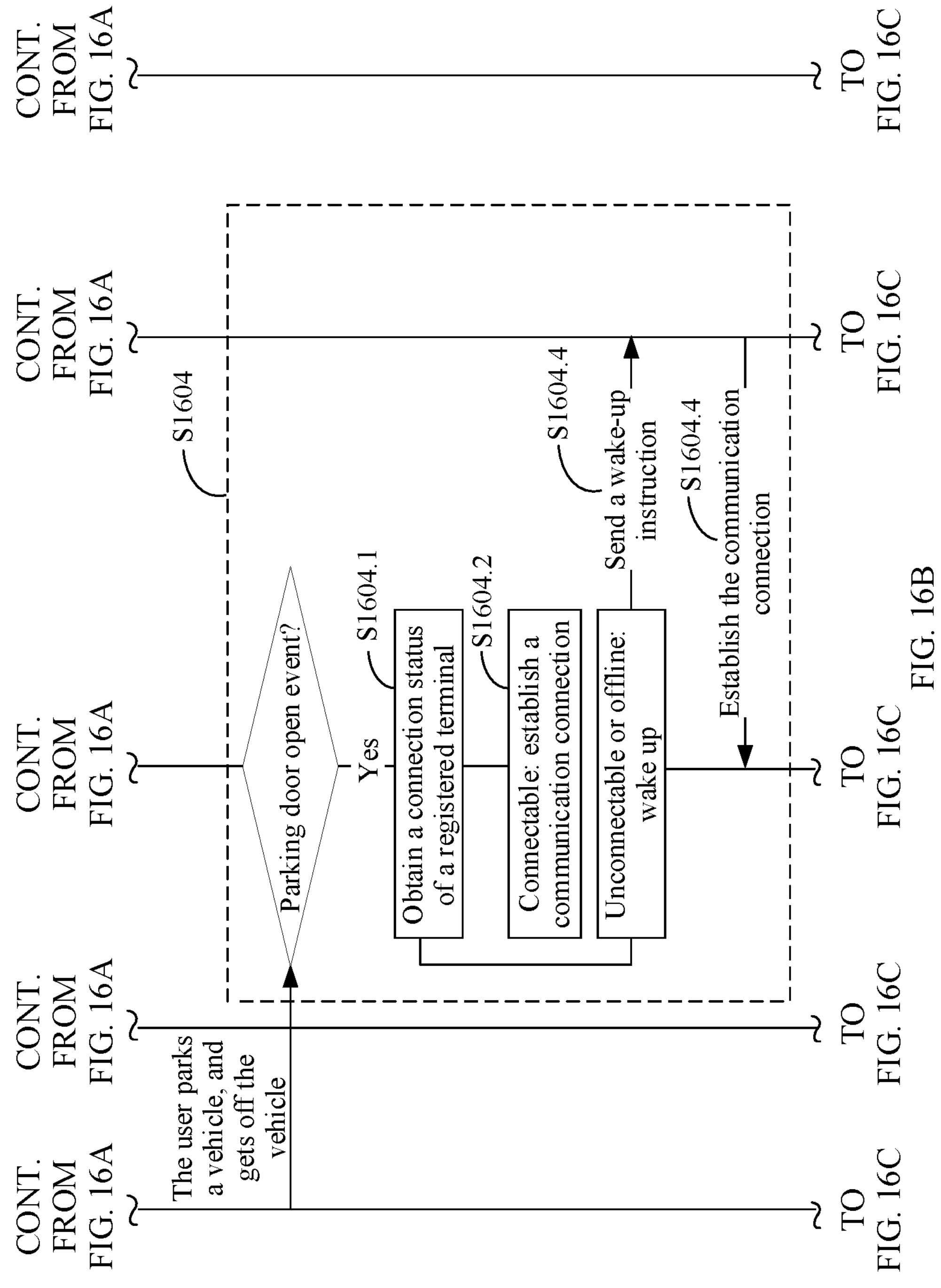
Figure 16C:
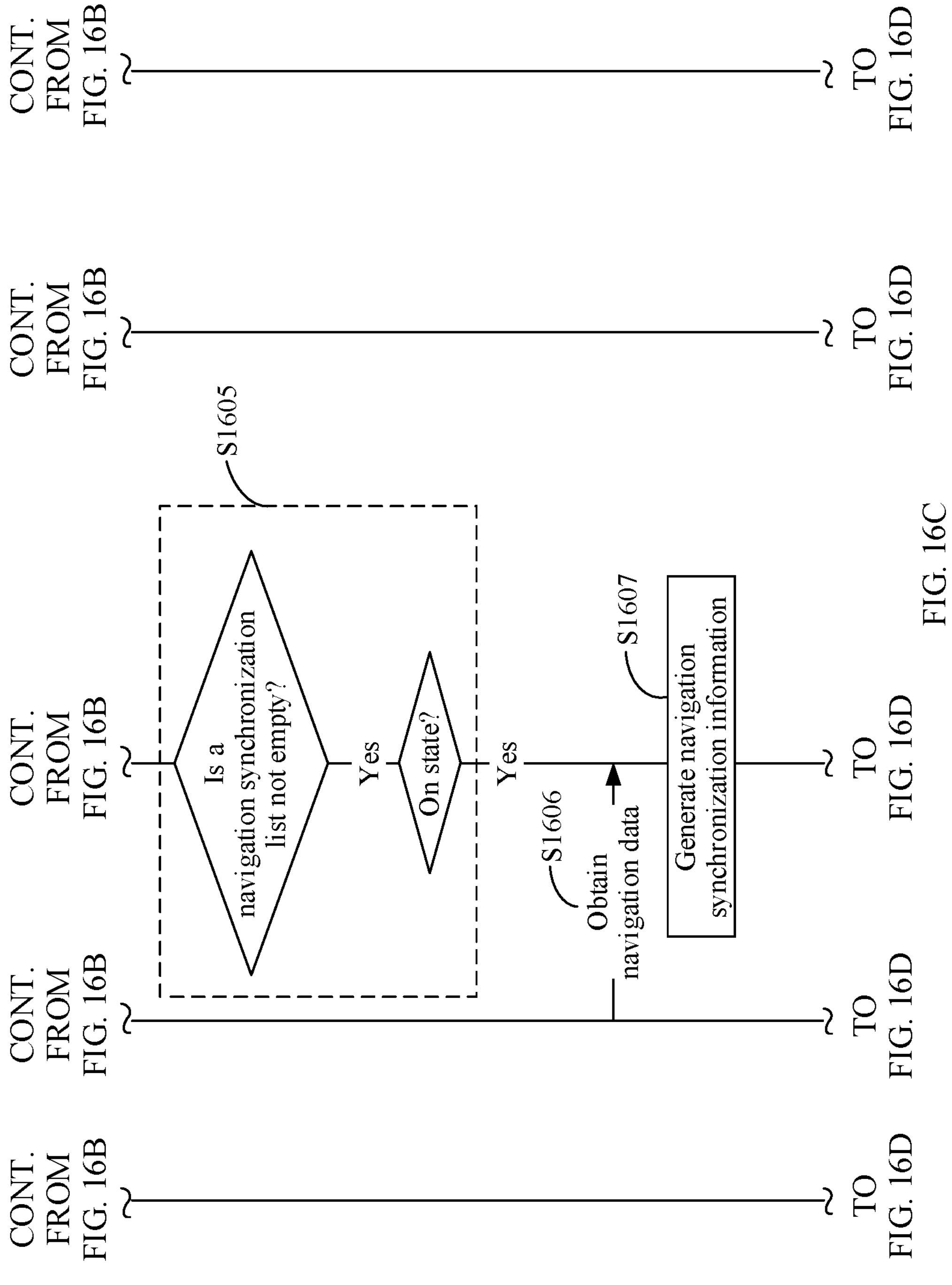
Figure 16D:
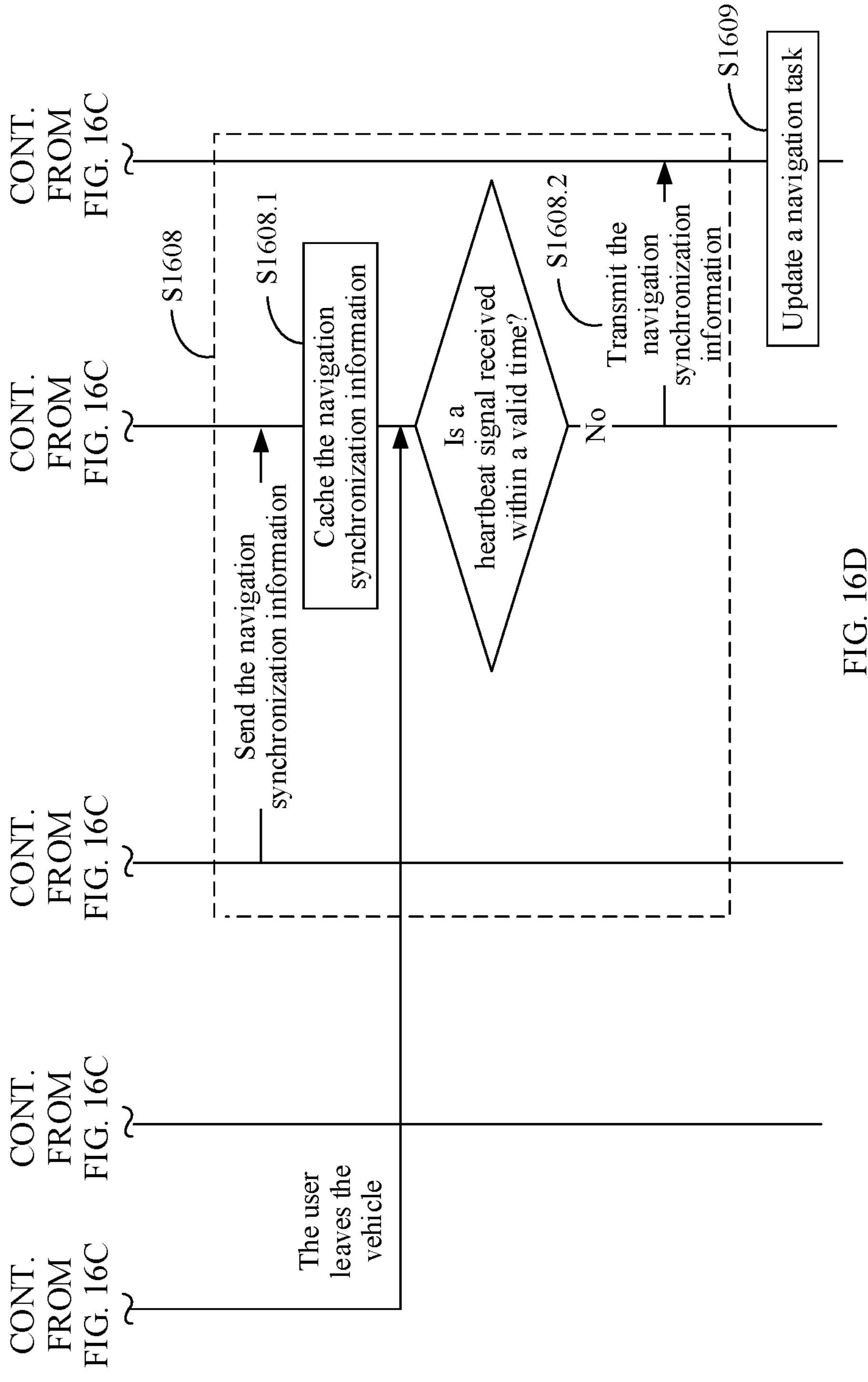

For example, an example in which the navigation transfer notification is transmitted between the user terminal and the vehicle-mounted terminal is used for description. FIG. 15 is a flowchart of a three-party interaction among a user terminal, a vehicle-mounted terminal, and a server according to an embodiment of this application. As shown in FIG. 15, a user account of the user is logged in on the vehicle-mounted terminal. When it is detected that the user terminal is in the connectable state (that is, the same user account is logged in on the user terminal, and the user account is in an online state), in this case, the vehicle-mounted terminal may send the navigation transfer notification to the server. The navigation transfer notification carries an account identifier of the logged-in user account on the vehicle-mounted terminal. After receiving the navigation transfer notification, the server forwards the navigation transfer notification to another terminal on which the same user account is logged in, that is, the user terminal. It can be learned that the communication connection between the user terminal and the vehicle terminal may be the communication connection established based on the server.

In comparison with Embodiment 1, that the user terminal in this embodiment obtains the navigation data from the first navigation application through the first navigation transfer module if the preset cross-device transmission condition is met specifically includes steps S1307 and S1308.

S1307: The user terminal receives the navigation transfer notification sent by the vehicle-mounted terminal.

S1308: The user terminal obtains the navigation data from the first navigation application through the first navigation transfer module in response to the navigation transfer notification.

In this embodiment, after receiving the navigation transfer notification sent by the vehicle terminal, the user terminal triggers the navigation task synchronization procedure, and obtains the corresponding navigation data from the first navigation application through the first navigation transfer module. Certainly, the user terminal may also perform precondition determining, for example, whether the first navigation application has navigation task synchronization permission and whether the first navigation application is allowed to be in the foreground. If yes, the first navigation transfer module may obtain the navigation data from the first navigation application. For a specific manner in which the first navigation transfer module obtains the navigation data, refer to the related description of step S201. Details are not described herein again.

S1309: The user terminal generates the navigation synchronization information of the navigation data through the first navigation transfer module.

Because an implementation of step S1309 in this embodiment is completely the same as that of step S203 in Embodiment 1, for specific description, reference may be made to the related description of step S203. Details are not described herein again.

S1310: The vehicle-mounted terminal receives the navigation synchronization information sent by the user terminal, and transmits the navigation synchronization information to the second navigation application through the second navigation transfer module.

Because an implementation of step S1310 in this embodiment is completely the same as that of step S204 in Embodiment 1, for specific description, reference may be made to the related description of step S204. Details are not described herein again.

S1311: The vehicle-mounted terminal updates a navigation task of the second navigation application based on the navigation synchronization information.

Step S1311 may include: The vehicle-mounted terminal determines a navigation destination based on the navigation synchronization information, and generates task update prompt information based on the navigation destination; and updates the navigation task based on the navigation destination if an update confirmation instruction fed back based on the update prompt information is received.

After step S1310, the following may be further included: The vehicle-mounted terminal sends navigation synchronization complete information to the user terminal through the second navigation transfer module. The user terminal transmits, to the first navigation application through the first navigation transfer module in response to the navigation synchronization complete information, an end instruction about the navigation task, to stop the navigation task of the first navigation application.

In this embodiment of this application, when the door open event is detected from the vehicle, the user terminal may automatically synchronize the navigation task to the vehicle-mounted terminal, so that the navigation task is continued on the vehicle-mounted terminal from the user terminal, thereby reducing user operations and improving navigation efficiency.

Embodiment 4

In comparison with Embodiment 1, an application scenario of this embodiment is specifically: After a vehicle is parked, a navigation task of an intelligent vehicle control terminal mounted on the vehicle is synchronized to a user terminal carried by a user. On this basis, a first terminal is specifically the vehicle-mounted terminal, and a second terminal is the user terminal carried by the user. FIG. 16A, FIG. 16B, FIG. 16C, and FIG. 16D are a schematic diagram of an interaction in a navigation task synchronization method according to an embodiment of this application. Specific description is as follows:

S1601: The vehicle-mounted terminal generates a navigation task through a first navigation application in response to a navigation operation of the user. Navigation data is generated based on the navigation task.

S1602: The vehicle-mounted terminal receives, through a first navigation transfer module, a service registration instruction transmitted by the first navigation application. The service registration instruction is used to authorize the first navigation application to have permission to transmit navigation data between devices.

S1603: In response to the service registration instruction, the vehicle-mounted terminal adds the first navigation application to a navigation synchronization application list, and sets the first navigation transfer module to an on state. The on state is used to: when a cross-device transmission condition is met, send, to the vehicle-mounted terminal, navigation synchronization information generated based on the first navigation application.

An implementation of step S1601 is completely the same as that of step S200.1 in Embodiment 1. An implementation of step S1602 is completely the same as that of step S200.2 in Embodiment 1. An implementation of step S1603 is completely the same as that of step S200.3 in Embodiment 1. For specific description, refer to the related description of steps S200.1 to S200.3. Details are not described herein again.

In comparison with Embodiment 1, that the vehicle-mounted terminal in this embodiment obtains the navigation data from the first navigation application through the first navigation transfer module if the preset cross-device transmission condition is met specifically includes steps S1604 to S1606.

S1604: The vehicle-mounted terminal establishes a communication connection to the user terminal if the vehicle-mounted terminal detects a parking event about the vehicle. The near field communication connection is used to send the navigation synchronization information to the user terminal.

In this embodiment, the vehicle-mounted terminal is a terminal that is executing a navigation task. If a navigation scenario is not switched, the vehicle-mounted terminal is constantly in a driving state. In this case, if the vehicle is parked, for example, a driving velocity is 0, and it is detected that a vehicle door is opened, or the vehicle stalls, or the vehicle is powered off, it may be recognized that the user switches from a driving state to a walking state. In other words, the navigation scenario changes. The navigation task needs to be synchronized to another terminal, namely, the user terminal carried by the user. In this case, the vehicle-mounted terminal establishes communication with the user terminal.

Further, in another embodiment of this application, that the vehicle-mounted terminal establishes the communication connection to the user terminal may specifically include the following steps:

S1604.1: The vehicle-mounted terminal recognizes a connection status of each registered terminal in a preset registered device list through a first navigation transfer module.

S1604.2: If the vehicle-mounted terminal recognizes that the user terminal is in the registered device list and a connection status of the user terminal is a connectable state, the vehicle-mounted terminal establishes the near field communication connection to the user terminal based on connection information associated with the user terminal in the registered device list.

S1604.3: If the vehicle-mounted terminal recognizes that the user terminal is not in the registered device list, or the user terminal is in the registered device list and a connection status of the user terminal is an unconnectable state, the vehicle-mounted terminal sends a wakeup instruction to the user terminal through a near field communication module of the vehicle-mounted terminal.

S1604.4: The user terminal sends a near field connection request to the vehicle-mounted terminal in response to the wake-up instruction, to establish the near field communication connection to the vehicle-mounted terminal.

Specifically, implementations of steps S1604.1 to S1604.4 are completely the same as those of S1304.1 to S1304.5 in Embodiment 3. For specific description, refer to the related description of steps S1304.1 to S1304.5. Details are not described herein again.

S1605: The vehicle-mounted terminal obtains a navigation synchronization application list, and obtains a setting status of the first navigation transfer module if the navigation synchronization application list is not empty.

Specifically, an implementation of step S1605 is completely the same as that of step S1305 in Embodiment 3, and an implementation of step S1606 is completely the same as that of step S1306 in Embodiment 3. For specific description, refer to the related description of steps S1305 and S1306. Details are not described herein again.

S1606: The vehicle-mounted terminal obtains the navigation data from the first navigation application through the first navigation transfer module if the vehicle-mounted terminal recognizes that the first navigation transfer module is in an on state.

In this embodiment, if the vehicle-mounted terminal recognizes that a corresponding navigation task synchronization service is enabled locally, in this case, a navigation task startup procedure may be triggered. Because the vehicle-mounted terminal is a terminal that has executed the navigation task, the navigation task of the vehicle-mounted terminal needs to be synchronized to another device, that is, the user terminal. In this case, the vehicle-mounted terminal may obtain the navigation data from the first navigation application through the local first navigation transfer module.

S1607: The vehicle-mounted terminal generates the navigation synchronization information of the navigation data through the first navigation transfer module.

Specifically, an implementation of step S1607 is completely the same as that of step S202 in Embodiment 1. For specific description, refer to the related description of step S202. Details are not described herein again.

S1608: The user terminal receives the navigation synchronization information sent by the vehicle-mounted terminal, and transmits the navigation synchronization information to the second navigation application through the second navigation transfer module.

Specifically, an implementation of step S1608 is completely the same as that of step S203 in Embodiment 1. For specific description, refer to the related description of step S203. Details are not described herein again.

Further, in another embodiment of this application, step S1608 may specifically include:

S1608.1: The user terminal caches the navigation synchronization information in a cache region through the second navigation transfer module, and detects a heartbeat signal of the communication connection to the vehicle-mounted terminal.

In this embodiment, after the vehicle-mounted terminal sends the navigation synchronization information to the user terminal, the user terminal may not immediately perform the navigation task synchronization operation, but first cache the navigation synchronization information in the cache region, and detect the heartbeat signal that is between the user terminal and the vehicle terminal and that is used to maintain activity of the near field communication connection. In some scenarios, the user parks the vehicle and opens the door. Actually, the user only gets off the vehicle for a rest, but does not switch the navigation scenario. Therefore, the user terminal may detect the heartbeat signal to determine whether the user has left the vehicle, and then determine whether to update the local navigation task of the second navigation application.

The near field communication connection is generally established between the vehicle-mounted terminal and the user terminal, and the near field communication connection is generally maintained between the two near field communication connections through the heartbeat signal. The heartbeat signal is generated at a preset time interval. The time interval is a value less than the following valid time. Therefore, if a distance between the vehicle-mounted terminal and the user terminal is within a communication range, the two communication parties constantly send the heartbeat signal at the preset time interval to maintain the near field communication connection. The user terminal may detect the heartbeat signal to determine whether the user is away from the vehicle.

S1608.2: If the heartbeat signal is not received within the preset valid time, the user terminal recognizes that the near field communication connection to the vehicle-mounted terminal is broken, and transmits the navigation synchronization information to the second navigation application.

In this embodiment, if the user terminal has not received, within the preset valid time, the heartbeat signal sent by the vehicle-mounted terminal, it indicates that the user terminal has left the communication range of the vehicle-mounted terminal or the vehicle-mounted terminal is closed, and it may be determined that the navigation task needs to be continued locally. Therefore, the obtained navigation synchronization information may be transmitted to the second navigation application through the first navigation transfer module, so that the second navigation application updates the navigation task based on the navigation synchronization information. Navigation may be continued for the user through the user terminal, so that navigation is continued on the user terminal from the vehicle-mounted terminal.

In this embodiment of this application, the user terminal first caches the navigation synchronization information in the cache region, and then detects the heartbeat signal between the user terminal and the vehicle-mounted terminal. The navigation task synchronization operation is triggered by a parking door close event. In addition, based on whether the heartbeat signal is detected within the valid time, the user terminal can determine whether the user has moved away from the vehicle, thereby improving accuracy of navigation task synchronization and avoiding a misoperation.

S1609: The user terminal updates a navigation task of the second navigation application based on the navigation synchronization information.

Because an implementation of step S1609 in this embodiment is completely the same as that of step S204 in Embodiment 1, for specific description, reference may be made to the related description of step S204. Details are not described herein again. It should be noted that, before updating the navigation task, the user terminal may also generate corresponding update prompt information, and update the navigation task after receiving an update confirmation instruction.

In this embodiment of this application, after detecting the parking door close event initiated by the user, the vehicle-mounted terminal triggers navigation task synchronization.

In this way, the navigation task of the vehicle-mounted terminal can be automatically synchronized to the user terminal, so that the user does not need to frequently set a navigation destination, thereby improving navigation task synchronization efficiency.

Embodiment 5

Embodiment 1, Embodiment 2, Embodiment 3, and Embodiment 4 describe implementation procedures of the cross-device navigation data synchronization method provided in this application from a perspective of an interaction between a first terminal and a second terminal. Different from Embodiment 1 to Embodiment 4, Embodiment 5 describes an implementation procedure of the cross-device navigation data synchronization method provided in this application from a perspective of a single side of the first terminal. FIG. 17 is a flowchart of implementation of a cross-device navigation data synchronization method performed by a first terminal according to an embodiment of this application. Specific description is as follows:

S1701: Obtain navigation data from a first navigation application through a first navigation transfer module if a preset cross-device transmission condition is met.

S1702: Generate, through the first navigation transfer module, navigation synchronization information corresponding to the navigation data.

S1703: Send the navigation synchronization information to a second terminal, where the navigation synchronization information is used to update a navigation task of a second navigation application in the second terminal. After receiving the navigation synchronization information, the second terminal transmits the received navigation synchronization information to the second navigation application through a second navigation transfer module, and updates the navigation task of the second navigation application based on the navigation synchronization information.

An implementation of step S1701 in this embodiment is completely the same as that of step S201 in Embodiment 1. An implementation of step S1702 in this embodiment is completely the same as that of step S202 in Embodiment 1. An implementation of step S1703 in this embodiment is completely the same as that of step S203 in Embodiment 1. For specific description, refer to the related description of steps S201 to S203. Details are not described herein again.

Optionally, the obtaining navigation data from a first navigation application through a first navigation transfer module if a preset cross-device transmission condition is met includes:

in response to a touch operation with the second terminal, receiving a communication label sent by a second near field communication module of the second terminal; and in response to the communication label, starting the first navigation transfer module, and obtaining the navigation data from the first navigation application through the first navigation transfer module.

Implementations of the foregoing two steps in this embodiment are completely the same as those of steps S1103 and S1104 in Embodiment 2. For specific description, refer to the related description of steps S1103 and S1104. Details are not described herein again.

Optionally, the communication label is written to the second near field communication module by a label service thread in response to a label write request when the second terminal detects that a label write condition is met, and sends the label write request to the label service thread through the second navigation transfer module.

Optionally, the obtaining navigation data from a first navigation application through a first navigation transfer module if a preset cross-device transmission condition is met includes:

receiving a navigation transfer notification sent by the second terminal, where after the second terminal is connected to the first terminal, the navigation transfer notification is sent to the first terminal when it is detected that the second navigation transfer module of the second terminal is in an on state; and obtaining the navigation data from the first navigation application through the first navigation transfer module in response to the navigation transfer notification.

Implementations of the foregoing two steps in this embodiment are completely the same as those of steps S1306 and S1307. For specific description, refer to the related description of steps S1306 and S1307. Details are not described herein again.

Optionally, before the receiving a navigation transfer notification sent by the second terminal, the following may be further included:

receiving a wake-up instruction sent by the second terminal through a second near field communication module; and sending a wireless connection request to the second terminal in response to the wake-up instruction, to establish a communication connection to the second terminal.

Implementations of the foregoing two steps in this embodiment are completely the same as those of steps S1304.4 and S1304.5 in Embodiment 3. For specific description, refer to the related description of steps S1304.4 and S1304.5. Details are not described herein again.

Optionally, the first terminal is an intelligent vehicle control terminal mounted on a vehicle, and the second terminal is a user terminal carried by a user.

Correspondingly, the obtaining navigation data from a first navigation application through a first navigation transfer module if a preset cross-device transmission condition is met includes:

establishing a near field communication connection to the second terminal if a parking event about the vehicle is detected, where the near field communication connection is used to send the navigation synchronization information to the second terminal; and obtaining the navigation data from the first navigation application through the first navigation transfer module if the first navigation transfer module is in an on state.

Implementations of the foregoing two steps in this embodiment are completely the same as those of steps S1604 and S1605. For specific description, refer to the related description of steps S1604 and S1605. Details are not described herein again.

Optionally, the establishing a near field communication connection to the second terminal if a parking event about the vehicle is detected includes:

recognizing a connection status of each registered terminal in a preset registered device list through the second navigation transfer module; and if the second terminal is in the registered device list and a connection status of the second terminal is a connectable state, establishing the near field communication connection to the second terminal based on connection information associated with the second terminal in the registered device list; or if the second terminal is not in the registered device list, or the second terminal is in the registered device list and a connection status of the second terminal is an unconnectable state, sending a wake-up instruction to the second terminal through a first near field communication module, where the wake-up instruction is used to enable the second terminal to establish the communication connection to the first terminal.

Implementations of the foregoing three steps in this embodiment are completely the same as those of S1604.1 to S1604.4 in Embodiment 4. For specific description, refer to the related description of steps S1604.1 to S1604.4. Details are not described herein again.

Correspondingly, before the obtaining navigation data from a first navigation application through a first navigation transfer module if a preset cross-device transmission condition is met, the following may be further included:

generating a navigation task through the first navigation application in response to a navigation operation of the user, where the navigation data is generated based on the navigation task;

receiving, through the first navigation transfer module, a service registration instruction transmitted by the first navigation application, where the service registration instruction is used to authorize the first navigation application to have permission to transmit navigation data between devices; and in response to the service registration instruction, adding the first navigation application to the navigation synchronization application list, and setting the first navigation transfer module to the on state, where the on state is used to: when the cross-device transmission condition is met, send, to the second terminal, the navigation synchronization information generated based on the first navigation application.

Implementations of the foregoing three steps in this embodiment are completely the same as those of steps S200.1 to S200.3 in Embodiment 1. For specific description, refer to the related description of steps S200.1 to S200.3. Details are not described herein again.

Optionally, after the sending the navigation synchronization information to a second terminal, the following may be further included:

receiving navigation synchronization complete information fed back by the second terminal through the second navigation transfer module; and transmitting, to the first navigation application through the first navigation transfer module in response to the navigation synchronization complete information, an end instruction about the navigation task, to stop the navigation task of the first navigation application.

Implementations of the foregoing two steps in this embodiment are completely the same as those of steps S205 and S206 in Embodiment 1. For specific description, refer to the related description of steps S205 and S206. Details are not described herein again.

Optionally, before the sending the navigation synchronization information to a second terminal, the following may be further included:

obtaining a navigation application list of the second terminal, where the navigation application list includes the second navigation application; and sending the navigation synchronization information to the second terminal if a navigation application matching the first navigation application exists in the navigation application list, where the navigation application matching the first navigation application is specifically an application that has permission to implement cross-device navigation data transmission with the first navigation application.

Implementations of the foregoing two steps in this embodiment are completely the same as those of steps S203.1 and S203.2 in Embodiment 1. For specific description, refer to the related description of steps S203.1 and S203.2. Details are not described herein again.

In this embodiment, when the first terminal detects that the cross-device transmission condition is met, the first terminal automatically obtains the navigation data of the started navigation task from the first navigation application through the local first navigation transfer module of the first terminal, generates, through the first navigation transfer module, the navigation synchronization information corresponding to the navigation data, and sends the navigation synchronization information to the second terminal, thereby implementing cross-device navigation data transmission. After receiving the navigation synchronization information, the second terminal may generate and transmit the navigation synchronization information to the second navigation application through the local second navigation transfer module, and then the second terminal may update the navigation task of the second navigation application based on the navigation synchronization information, thereby implementing cross-device navigation task synchronization. In comparison with an existing navigation technology, cross-device navigation task synchronization can be implemented in this application. In a scenario in which cross-device navigation needs to be performed, the user does not need to set a task of a navigation application of a terminal for a plurality of times. Instead, navigation data can be automatically transferred through a navigation transfer module, to update the navigation task of the navigation application, thereby greatly improving navigation task setting efficiency and reducing repeated operations of the user. In addition, after obtaining the navigation data from the first navigation application, the first navigation transfer module in the first terminal does not directly send the navigation data to the second navigation transfer module of the second terminal, but converts the navigation data into the corresponding navigation synchronization information. The navigation synchronization information can be transmitted between navigation transfer modules of different terminals. Then, the navigation synchronization information is transmitted to the second navigation application through the second navigation transfer module. The navigation synchronization information is not directly transmitted between the navigation applications of the two terminals. Therefore, a same navigation application does not need to be installed on the first terminal and the second terminal. In this way, cross-device and cross-application navigation data transfer can be implemented, thereby further improving an application scope of navigation task synchronization.

Embodiment 6

Embodiment 1, Embodiment 2, Embodiment 3, and Embodiment 4 describe implementation procedures of the cross-device navigation data synchronization method provided in this application from a perspective of an interaction between a first terminal and a second terminal. Different from Embodiment 1 to Embodiment 4, Embodiment 6 describes an implementation procedure of the cross-device navigation data synchronization method provided in this application from a perspective of a single side of the second terminal. FIG. 18 is a flowchart of implementation of a cross-device navigation data synchronization method performed by a second terminal according to an embodiment of this application. Specific description is as follows:

S1801: Receive navigation synchronization information sent by a first terminal, where the navigation synchronization information is generated based on navigation data of a first navigation application in the first terminal.

S1802: Transmit the navigation synchronization information to a second navigation application through a second navigation transfer module.

S1803: Update a navigation task of the second navigation application based on the navigation synchronization information.

Implementations of steps S1801 and S1802 in this embodiment are completely the same as those of step S203 in Embodiment 1. An implementation of step S1803 is completely the same as that of step S204 in Embodiment 1. For specific description, refer to the related description of steps S203 and S204. Details are not described herein again.

Optionally, the receiving navigation synchronization information sent by a first terminal includes:

sending a communication label to the first terminal through a second near field communication module in response to a touch operation with the first terminal, so that the first terminal starts a first navigation transfer module and obtains the navigation data from the first navigation application through the first navigation transfer module in response to the communication label.

An implementation of the foregoing step in this embodiment is completely the same as that of step S1103 in Embodiment 2. For specific description, refer to the related description of step S1103. Details are not described herein again.

The navigation synchronization information sent by the first terminal through the first navigation transfer module is received.

An implementation of the foregoing step in this embodiment is completely the same as that of step S1110 in Embodiment 2. For specific description, refer to the related description of step S1110. Details are not described herein again.

Optionally, before the sending a communication label to the first terminal through a second near field communication module in response to a touch operation with the first terminal, the following is further included:

sending a label write request to a label service thread through the second navigation transfer module if a preset label write condition is met; and responding to the label write request through the label service thread, and writing the communication label to the second near field communication module.

Implementations of the foregoing two steps in this embodiment are completely the same as those of steps S1101 and S1102 in Embodiment 2. For specific description, refer to the related description of steps S1101 and S1102. Details are not described herein again.

Optionally, the second terminal is an intelligent vehicle control terminal mounted on a vehicle.

Correspondingly, before the receiving navigation synchronization information sent by a first terminal, the following is further included:

establishing a communication connection to the first terminal if a door open event about the vehicle is detected;

obtaining a navigation synchronization application list, and obtaining a setting status of the second navigation transfer module if the navigation synchronization application list is not empty; and sending a navigation transfer notification to the first terminal if the second navigation transfer module is in an on state, so that the first terminal sends the navigation synchronization information.

Implementations of the foregoing three steps in this embodiment are completely the same as those of steps S1304 to S1306 in Embodiment 3. For specific description, refer to the related description of steps S1304 to S1306. Details are not described herein again.

Optionally, the establishing a communication connection to the first terminal if a door open event about the vehicle is detected includes:

recognizing a connection status of each registered terminal in a preset registered device list through the second navigation transfer module; and if the first terminal is in the registered device list and a connection status of the first terminal is a connectable state, establishing the communication connection to the first terminal based on connection information associated with the first terminal in the registered device list; or if the first terminal is not in the registered device list, or the first terminal is in the registered device list and a connection status of the first terminal is an unconnectable state, sending a wake-up instruction to the first terminal through a second near field communication module, where the wake-up instruction is used to enable the first terminal to establish the near field communication connection to the second terminal.

Implementations of the foregoing three steps in this embodiment are completely the same as those of steps S1304.1 to S1304.3 in Embodiment 3. For specific description, refer to the related description of steps S1304 to S1306. Details are not described herein again.

Optionally, the second terminal is a user terminal carried by a user, and the first terminal is an intelligent vehicle control terminal mounted on a vehicle.

Correspondingly, the transmitting the navigation synchronization information to a second navigation application through a second navigation transfer module includes:

caching the navigation synchronization information in a cache region through the second navigation transfer module, and detecting a heartbeat signal of the near field communication connection to the first terminal; and if the heartbeat signal is not received within a preset valid time, recognizing that the near field communication connection to the first terminal is broken, and transmitting the navigation synchronization information to the second navigation application.

Implementations of the foregoing two steps in this embodiment are completely the same as those of steps S1608.1 and S1608.2 in Embodiment 4. For specific description, refer to the related description of steps S1608.1 and S1608.2. Details are not described herein again.

Optionally, after the receiving navigation synchronization information sent by a first terminal, the following is further included:

detecting whether a navigation application matching the first navigation application exists in a navigation application list, where the navigation application list includes the first navigation application; and if it is detected that the navigation application matching the first navigation application exists in the navigation application list, using, as the second navigation application, the navigation application matching the first navigation application, and performing the operation of transmitting the navigation synchronization information to the second navigation application through the second navigation transfer module, where the navigation application matching the first navigation application is specifically an application that has permission to implement cross-device navigation data transmission with the second navigation application.

Implementations of the foregoing two steps in this embodiment are completely the same as those of steps S203.1 and S203.2 in Embodiment 1. For specific description, refer to the related description of steps S203.1 and S203.2. Details are not described herein again.

Optionally, the updating a navigation task of the second navigation application based on the navigation synchronization information includes:

determining a navigation destination based on the navigation synchronization information, and generating task update prompt information based on the navigation destination; and updating the navigation task based on the navigation destination if an update confirmation instruction fed back based on the update prompt information is received.

Implementations of the foregoing two steps in this embodiment are completely the same as those of steps S204.1 and S204.2 in Embodiment 1. For specific description, refer to the related description of steps S204.1 and S204.2. Details are not described herein again.

Optionally, the updating the navigation task based on the navigation destination if an update confirmation instruction fed back based on the update prompt information is received includes:

sending navigation synchronization complete information to the first terminal, so that the first terminal transmits, to the first navigation application through the first navigation transfer module in response to the navigation synchronization complete information, an end instruction about a navigation task, to stop a navigation task of the first navigation application.

An implementation of the foregoing step in this embodiment is completely the same as that of step S205 in Embodiment 1. For specific description, refer to the related description of step S205. Details are not described herein again.

Embodiment 7

Figure 19:
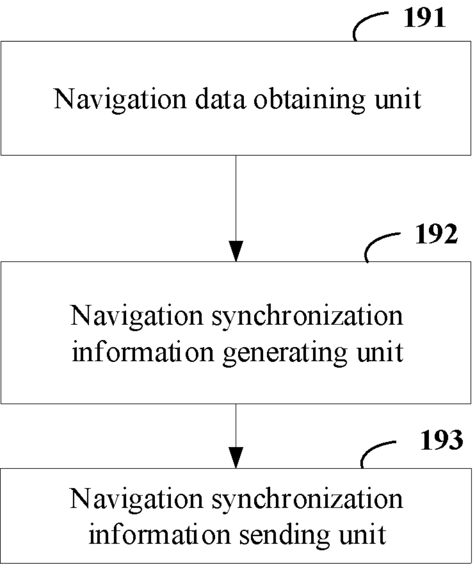
FIG. 19 is a block diagram of a structure of a cross-device navigation task synchronization apparatus according to an embodiment of this application.

Corresponding to the cross-device navigation task synchronization method described in Embodiment 5, FIG. 19 is a block diagram of a structure of a cross-device navigation task synchronization apparatus according to an embodiment of this application. For ease of description, only a part related to this embodiment of this application is shown.

With reference to FIG. 19, the cross-device navigation task synchronization apparatus includes:

a navigation data obtaining unit 191, configured to obtain navigation data from a first navigation application through a first navigation transfer module if a preset cross-device transmission condition is met;

a navigation synchronization information generating unit 192, configured to generate, through the first navigation transfer module, navigation synchronization information corresponding to the navigation data; and a navigation synchronization information sending unit 193, configured to send the navigation synchronization information to a second terminal, where the navigation synchronization information is used to update a navigation task of a second navigation application in the second terminal.

Optionally, the navigation data obtaining unit 191 includes:

a communication label receiving unit, configured to: in response to a touch operation with the second terminal, receive a communication label sent by a second near field communication module of the second terminal, where the communication label carries a navigation task synchronization start identifier; and a navigation transfer module starting unit, configured to: in response to the communication label, start the first navigation transfer module, and obtain the navigation data from the first navigation application through the first navigation transfer module.

Optionally, the communication label is obtained after the second terminal sends a label write request to a label service thread through a second navigation transfer module when the second terminal detects that a label write condition is met, responds to the label write request through the label service thread, adds the start identifier to the communication label, and writes the communication label to the second near field communication module.

Optionally, the navigation data obtaining unit 191 includes:

a navigation transfer notification receiving unit, configured to receive a navigation transfer notification sent by the second terminal, where after the second terminal is connected to the first terminal, the navigation transfer notification is sent to the first terminal when it is detected that the second navigation transfer module of the second terminal is in an on state; and a navigation transfer notification responding unit, configured to obtain the navigation data from the first navigation application through the first navigation transfer module in response to the navigation transfer notification.

Optionally, the navigation task synchronization apparatus further includes:

a wake-up instruction receiving unit, configured to receive a wake-up instruction sent by the second terminal through the second near field communication module; and a wake-up instruction responding unit, configured to send a wireless connection request to the second terminal in response to the wake-up instruction, to establish the communication connection to the second terminal.

Optionally, the first terminal is an intelligent vehicle control terminal mounted on a vehicle, and the second terminal is a user terminal carried by a user.

Correspondingly, the navigation data obtaining unit 191 includes:

a parking door open trigger unit, configured to establish a near field communication connection to the second terminal if a parking event about the vehicle is detected, where the near field communication connection is used to send the navigation synchronization information to the second terminal;

a first status recognizing unit, configured to: obtain a navigation synchronization application list, and obtain a setting status of the first navigation transfer module if the navigation synchronization application list is not empty; and a first start state responding unit, configured to obtain the navigation data from the first navigation application through the first navigation transfer module if the first navigation transfer module is in an on state.

Optionally, the parking door open trigger unit includes:

a connection status detection unit, configured to recognize a connection status of each registered terminal in a preset registered device list through the second navigation transfer module;

a direct connection trigger unit, configured to: if the second terminal is in the registered device list and a connection status of the second terminal is a connectable state, establish the near field communication connection to the second terminal based on connection information associated with the second terminal in the registered device list; and a wake-up instruction sending unit, configured to: if the second terminal is not in the registered device list, or the second terminal is in the registered device list and a connection status of the second terminal is an unconnectable state, send a wake-up instruction to the second terminal through a first near field communication module, where the wake-up instruction is used to enable the second terminal to establish the communication connection to the first terminal.

Optionally, the navigation task synchronization apparatus further includes:

a navigation operation responding unit, configured to generate a navigation task through the first navigation application in response to a navigation operation of the user, where the navigation data is generated based on the navigation task;

a service registration unit, configured to receive, through the first navigation transfer module, a service registration instruction transmitted by the first navigation application, where the service registration instruction is used to authorize the first navigation application to have permission to transmit navigation data between devices; and a service registration responding unit, configured to: in response to the service registration instruction, add the first navigation application to the navigation synchronization application list, and set the first navigation transfer module to the on state, where the on state is used to: when the cross-device transmission condition is met, send, to the second terminal, the navigation synchronization information generated based on the first navigation application.

Optionally, the navigation task synchronization apparatus further includes:

a navigation synchronization complete information receiving unit, configured to receive navigation synchronization complete information fed back by the second terminal through the second navigation transfer module; and a navigation ending unit, configured to transmit, to the first navigation application through the first navigation transfer module in response to the navigation synchronization complete information, an end instruction about the navigation task, to stop the navigation task of the first navigation application.

Optionally, the navigation task synchronization apparatus further includes:

a navigation application list obtaining unit, configured to obtain a navigation application list of the second terminal, where the navigation application list includes the second navigation application; and a navigation application matching unit, configured to send the navigation synchronization information to the second terminal if a navigation application matching the first navigation application exists in the navigation application list, where the navigation application matching the first navigation application is specifically an application that has permission to implement cross-device navigation data transmission with the first navigation application.

Therefore, when the first terminal detects that the cross-device transmission condition is met, the cross-device navigation task synchronization apparatus provided in this embodiment of this application may automatically obtain the navigation data of the started navigation task from the first navigation application through the local first navigation transfer module of the first terminal, generate, through the first navigation transfer module, the navigation synchronization information corresponding to the navigation data, and send the navigation synchronization information to the second terminal, thereby implementing cross-device navigation data transmission. After receiving the navigation synchronization information, the second terminal may generate and transmit the navigation synchronization information to the second navigation application through the local second navigation transfer module, and then the second terminal may update the navigation task of the second navigation application based on the navigation synchronization information, thereby implementing cross-device navigation task synchronization. In comparison with an existing navigation technology, cross-device navigation task synchronization can be implemented in this application. In a scenario in which cross-device navigation needs to be performed, the user does not need to set a task of a navigation application of a terminal for a plurality of times. Instead, navigation data can be automatically transferred through a navigation transfer module, to update the navigation task of the navigation application, thereby greatly improving navigation task setting efficiency and reducing repeated operations of the user. In addition, after obtaining the navigation data from the first navigation application, the first navigation transfer module in the first terminal does not directly send the navigation data to the second navigation transfer module of the second terminal, but converts the navigation data into the corresponding navigation synchronization information. The navigation synchronization information can be transmitted between navigation transfer modules of different terminals. Then, the navigation synchronization information is transmitted to the second navigation application through the second navigation transfer module. The navigation synchronization information is not directly transmitted between the navigation applications of the two terminals. Therefore, a same navigation application does not need to be installed on the first terminal and the second terminal. In this way, cross-device and cross-application navigation data transfer can be implemented, thereby further improving an application scope of navigation task synchronization.

Embodiment 8

Figure 20:
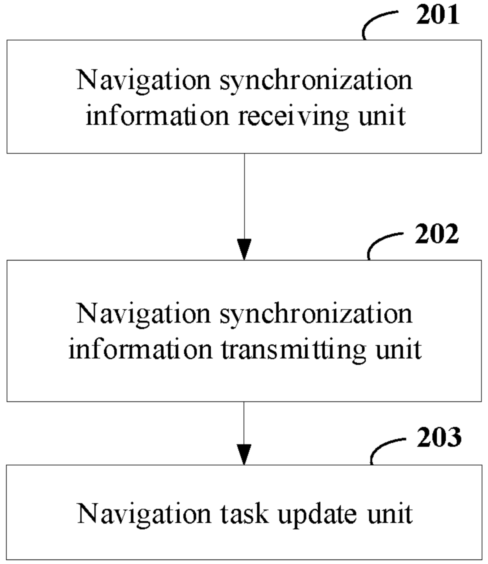
FIG. 20 is a block diagram of a structure of a cross-device navigation task synchronization apparatus according to an embodiment of this application.

Corresponding to the cross-device navigation task synchronization method described in Embodiment 5, FIG. 20 is a block diagram of a structure of a cross-device navigation task synchronization apparatus according to an embodiment of this application. For ease of description, only a part related to this embodiment of this application is shown.

With reference to FIG. 20, the cross-device navigation task synchronization apparatus includes:

a navigation synchronization information receiving unit 201, configured to receive navigation synchronization information sent by a first terminal, where the navigation synchronization information is generated based on navigation data of a first navigation application in the first terminal;

a navigation synchronization information transmitting unit 202, configured to transmit the navigation synchronization information to a second navigation application through a second navigation transfer module; and a navigation task update unit 203, configured to update a navigation task of the second navigation application based on the navigation synchronization information.

Optionally, the navigation synchronization information receiving unit 201 includes:

a communication label sending unit, configured to send a communication label to the first terminal through a second near field communication module in response to a touch operation with the first terminal, so that the first terminal starts a first navigation transfer module and obtains the navigation data from the first navigation application through the first navigation transfer module in response to the communication label, where the communication label carries a navigation task synchronization start identifier; and a touch operation feedback unit, configured to receive the navigation synchronization information sent by the first terminal through the first navigation transfer module.

Optionally, the navigation task synchronization apparatus further includes:

a label write request unit, configured to send a label write request to a label service thread through the second navigation transfer module if a preset label write condition is met; and a communication label write unit, configured to: respond to the label write request through the label service thread, add the start identifier to the communication label, and write the communication label to the second near field communication module.

Optionally, the second terminal is an intelligent vehicle control terminal mounted on a vehicle.

Correspondingly, the navigation task synchronization apparatus further includes:

a door open event trigger unit, configured to establish a communication connection to the first terminal if a door open event about the vehicle is detected;

a second status recognizing unit, configured to: obtain a navigation synchronization application list, and obtain a setting status of the second navigation transfer module if the navigation synchronization application list is not empty; and a second start state responding unit, configured to send a navigation transfer notification to the first terminal if the second navigation transfer module is in an on state, so that the first terminal sends the navigation synchronization information.

Optionally, the door open event trigger unit includes:

a connection status determining unit, configured to recognize a connection status of each registered terminal in a preset registered device list through the second navigation transfer module;

a direct connection transmitting unit, configured to: if the first terminal is in the registered device list and a connection status of the first terminal is a connectable state, establish the communication connection to the first terminal based on connection information associated with the first terminal in the registered device list; and a wake-up execution unit, configured to: if the first terminal is not in the registered device list, or the first terminal is in the registered device list and a connection status of the first terminal is an unconnectable state, send a wake-up instruction to the first terminal through a second near field communication module, where the wake-up instruction is used to enable the first terminal to establish the communication connection to the second terminal.

Optionally, the second terminal is a user terminal carried by a user, and the first terminal is an intelligent vehicle control terminal mounted on a vehicle.

Correspondingly, the navigation synchronization information transmitting unit 202 includes:

an information caching unit, configured to: cache the navigation synchronization information in a cache region through the second navigation transfer module, and detect a heartbeat signal of a communication connection to the first terminal; and a heartbeat signal listening unit, configured to: if the heartbeat signal is not received within a preset valid time, recognize that a near field communication connection to the first terminal is broken, and transmit the navigation synchronization information to the second navigation application.

Optionally, the navigation task synchronization apparatus further includes:

a matching application detection unit, configured to detect whether a navigation application matching the first navigation application exists in a navigation application list, where the navigation application list includes the first navigation application; and a second navigation application recognizing unit, configured to: if it is detected that the navigation application matching the first navigation application exists in the navigation application list, use, as the second navigation application, the navigation application matching the first navigation application, and perform the operation of transmitting the navigation synchronization information to the second navigation application through the second navigation transfer module, where the navigation application matching the first navigation application is specifically an application that has permission to implement cross-device navigation data transmission with the second navigation application.

Optionally, the navigation task update unit 203 includes:

an update prompt information generating unit, configured to: determine a navigation destination based on the navigation synchronization information, and generate task update prompt information based on the navigation destination; and an update confirmation instruction responding unit, configured to: update the navigation task based on the navigation destination if an update confirmation instruction fed back based on the update prompt information is received.

Optionally, the navigation task synchronization apparatus further includes:

a navigation synchronization complete information sending unit, configured to send navigation synchronization complete information to the first terminal, so that the first terminal transmits, to the first navigation application through the first navigation transfer module in response to the navigation synchronization complete information, an end instruction about a navigation task, to stop a navigation task of the first navigation application.

The cross-device navigation task synchronization method provided in embodiments of this application may be applied to a terminal device such as a mobile phone, a tablet computer, a wearable device, a vehicle-mounted terminal, an augmented reality (AR) device/a virtual reality (VR) device, a notebook computer, an ultra-mobile personal computer (UMPC), a netbook, or a personal digital assistant (PDA). A specific type of the terminal device is not limited in embodiments of this application.

For example, the terminal device may be a station (ST) in a WLAN, or may be a cellular phone, a cordless phone, a Session Initiation Protocol (SIP) phone, a wireless local loop (WLL) station, a personal digital assistant (PDA) device, a handheld device having a wireless communication function, a computing device, another processing device connected to a wireless modem, a computer, a laptop computer, a handheld communication device or a handheld computing device, and/or another device used for communication in a wireless system and a next-generation communication system, for example, a mobile terminal in a 5G network or a mobile terminal in a future evolved public land mobile network (PLMN) network.

Figure 21:
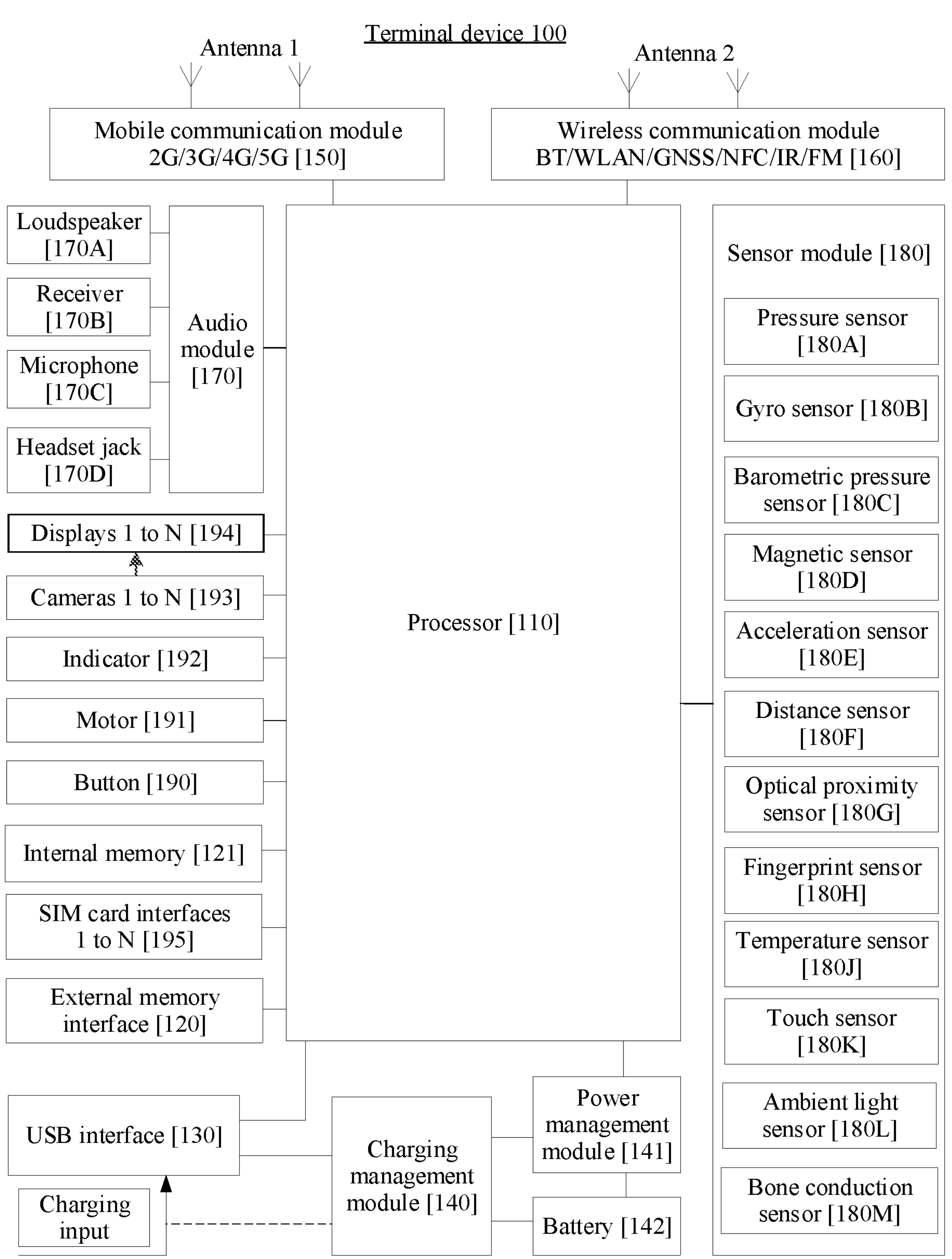
FIG. 21 is a schematic diagram of a structure of a terminal device according to an embodiment of this application.

FIG. 21 is a schematic diagram of a structure of a terminal device 100.

The terminal device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that, a structure illustrated in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural network processing unit (NPU), and/or the like. Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store an instruction or data that is just used or cyclically used by the processor 110. If the processor 110 needs to use the instruction or the data again, the processor 110 may directly invoke the instruction or the data from the memory. This avoids repeated access, reduces a waiting time of the processor 110, and improves system efficiency.

In some embodiments, the processor 110 may include one or more interfaces. The interface may include an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface to implement a touch function of the terminal device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

A PCM interface may also be configured to perform audio communication, and sample, quantize, and code an analog signal. In some embodiments, the audio module 170 may be coupled to the wireless communication module 160 through the PCM bus interface. In some embodiments, the audio module 170 may also transmit an audio signal to the wireless communication module 160 through the PCM interface, to implement a function of answering a call through a Bluetooth headset. Both the I2S interface and the PCM interface may be configured to perform audio communication.

A UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal device 100. The processor 110 communicates with the display 194 through the DSI interface, to implement a display function of the terminal device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may be alternatively configured as an I2C interface, an I2S interface, a UART interface, a MIPI interface, or the like.

A USB interface 130 is an interface that conforms to a USB standard specification, and may be specifically a mini USB interface, a micro USB interface, a USB type C interface, or the like. The USB interface 130 may be configured to connect to a charger to charge the terminal device 100, or may be configured to transmit data between the terminal device 100 and a peripheral device, or may be configured to connect to a headset for playing audio through the headset. The interface may be alternatively configured to connect to another terminal device, for example, an AR device.

It can be understood that an interface connection relationship between the modules illustrated in this embodiment of this application is merely an example for description, and does not constitute a limitation on the structure of the terminal device 100. In some other embodiments of this application, the terminal device 100 may alternatively use different interface connection manners in the foregoing embodiments or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the terminal device 100. When charging the battery 142, the charging management module 140 may further supply power to the terminal device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a state of battery health (electric leakage and impedance). In some other embodiments, the power management module 141 may be alternatively disposed in the processor 110. In some other embodiments, the power management module 141 and the charging management module 140 may be alternatively disposed in a same device.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be further multiplexed, to increase antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the terminal device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the loudspeaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another function module.

The wireless communication module 160 may provide a solution that is applied to the terminal device 100 and that includes wireless communication such as a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device 100 is coupled to the mobile communication module 150, and the antenna 2 is coupled to the wireless communication module 160, so that the terminal device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 implements a display function through a GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information. The display 194 may specifically display a generated detection report, so that a user can view the detection report by using the display 194.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum-dot light-emitting diode (QLED), or the like. In some embodiments, the terminal device 100 may include one or N displays 194, where N is a positive integer greater than 1. The display 194 may include a touch panel and another input device.

The terminal device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 193, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transform on frequency energy.

The video codec is configured to compress or decompress a digital video. The terminal device 100 may support one or more types of video codecs. In this way, the terminal device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. The NPU can implement applications such as intelligent cognition of the terminal device 100, for example, image recognition, facial recognition, speech recognition, and text understanding.

The external memory interface 120 may be configured to connect to an external memory card, for example, a micro SD card, to extend a storage capability of the terminal device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage region and a data storage region. The program storage region may store an operating system, an application required by at least one function (for example, a sound play function and an image play function), and the like. The data storage region may store data (for example, audio data or a phone book) created in a process of using the terminal device 100. In addition, the internal memory 121 may include a high-speed random access memory, and may further include a nonvolatile memory, for example, at least one magnetic disk storage device, a flash storage device, a universal flash storage (UFS), and the like. The processor 110 performs various function applications and data processing of the terminal device 100 by running the instructions stored in the internal memory 121 and/or the instructions stored in the memory disposed in the processor.

The terminal device 100 may implement an audio function such as music playing or recording through the audio module 170, the loudspeaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The loudspeaker 170A, also referred to as a "speaker", is configured to convert an audio electrical signal into a sound signal. The terminal device 100 may be used to listen to music or answer a hands-free call through the loudspeaker 170A. In particular, the loudspeaker 170A may be configured to output prompt information, to notify the user of a part that needs to be in contact with an electronic scale.

The receiver 170B, also referred to as an "earpiece", is configured to convert an electrical audio signal into a sound signal. When a call is answered or voice information is received by using the terminal device 100, the receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to collect a sound signal and further implement a noise reduction function. In some other embodiments, three, four, or more microphones 170C may be alternatively disposed in the terminal device 100, to collect a sound signal, implement noise reduction, and recognize a sound source, to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. For example, the terminal device may obtain the weight of the user through the pressure sensor 180A. There are a plurality of types of pressure sensors 180A, such as a resistive pressure sensor, an inductive pressure sensor, and a capacitive pressure sensor. The capacitive pressure sensor may include at least two parallel plates with conductive materials. When force is applied to the pressure sensor 180A, capacitance between electrodes changes. The terminal device 100 determines pressure strength based on a capacitance change. When a touch operation is performed on the display 194, the terminal device 100 detects strength of the touch operation through the pressure sensor 180A. The terminal device 100 may further calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an SMS message application icon, an instruction for viewing an SMS message is executed; or when a touch operation whose touch operation strength is greater than or equal to the first pressure threshold is performed on the SMS message application icon, an instruction for creating a new SMS message is executed.

The gyro sensor 180B may be configured to determine a motion posture of the terminal device 100. In some embodiments, angular velocities of the terminal device 100 around three axes (namely, x, y, and z axes) may be determined by using the gyro sensor 180B. The gyro sensor 180B may be configured to implement image stabilization during photographing. For example, when the shutter is pressed, the gyro sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyro sensor 180B may also be used in a navigation scenario and a motion sensing game scenario.

The barometric pressure sensor 180C is configured to measure barometric pressure. In some embodiments, the terminal device 100 calculates an altitude based on a barometric pressure value measured by the barometric pressure sensor 180C, to assist in positioning and navigation.

The magnetic sensor 180D includes a Hall sensor. The terminal device 100 may detect opening and closing of a flip cover and a leather case through the magnetic sensor 180D. In some embodiments, when the terminal device 100 is a flip phone, the terminal device 100 may detect opening and closing of the flip cover through the magnetic sensor 180D. Further, a feature such as automatic unlocking of the flip cover is set based on a detected opening or closing state of the leather case or a detected opening or closing state of the flip cover.

The acceleration sensor 180E may detect acceleration in various directions (usually on three axes) of the terminal device 100. A magnitude and a direction of gravity may be detected when the terminal device 100 is stationary. The acceleration sensor 180E may be further configured to recognize a posture of the terminal device, and is used in an application such as switching between a landscape mode and a portrait mode or a pedometer.

The distance sensor 180F is configured to measure a distance. The terminal device 100 may measure a distance by using infrared light or a laser. In some embodiments, in a photographing scenario, the terminal device 100 may measure a distance by using the distance sensor 180F, to implement fast focusing.

The optical proximity sensor 180G may include, for example, a light emitting diode (LED) and an optical detector, for example, a photodiode. The light-emitting diode may be an infrared light-emitting diode. The terminal device 100 emits infrared light outward through the light-emitting diode. The terminal device 100 detects infrared reflected light from a nearby object through the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, through the optical proximity sensor 180G, that the user holds the terminal device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light intensity. The terminal device 100 may adaptively adjust brightness of the display 194 based on the sensed ambient light intensity. The ambient light sensor 180L may also be configured to automatically adjust white balance during photographing. The ambient light sensor 180L may further cooperate with the optical proximity sensor 180G to detect whether the terminal device 100 is in a pocket, to prevent accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy based on the temperature detected by the temperature sensor 180J. For example, when the temperature reported by the temperature sensor 180J exceeds a threshold, the terminal device 100 reduces performance of a processor located near the temperature sensor 180J, to reduce power consumption and implement heat protection. In some other embodiments, when the temperature is lower than another threshold, the terminal device 100 heats the battery 142, to avoid abnormal shutdown of the terminal device 100 caused due to a low temperature. In some other embodiments, when the temperature is lower than still another threshold, the terminal device 100 boosts an output voltage of the battery 142, to avoid abnormal shutdown caused due to a low temperature.

The touch sensor 180K is also referred to as a "touch component". The touch sensor 180K may be disposed in the display 194, so that the touch sensor 180K and the display 194 constitute a touchscreen, also referred to as a "touch control screen". The touch sensor 180K is configured to detect a touch operation on or near the touchscreen. The touch sensor may transfer a detected touch operation to the application processor to determine a touch event type. A visual output related to the touch operation may be provided by using the display 194. In some other embodiments, the touch sensor 180K may be alternatively disposed on a surface of the terminal device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may be alternatively disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive a button input, and generate a button signal input related to a user setting and function control of the terminal device 100.

The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effect. The motor 191 may also correspond to different vibration feedback effect for touch operations performed on different regions of the display 194. Different application scenarios (for example, a time reminder, information receiving, an alarm clock, and a game) may also correspond to different vibration feedback effect. Touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible to different types of SIM cards. The SIM card interface 195 may also be compatible with an external storage card. The terminal device 100 interacts with a network through the SIM card, to implement functions such as calling and data communication. In some embodiments, the terminal device 100 uses an eSIM, namely, an embedded SIM card. The eSIM card may be embedded in the terminal device 100, and cannot be separated from the terminal device 100.

A software system of the terminal device 100 may use a layered architecture, an event-driven architecture, a microkernel architecture, a microservice architecture, or a cloud architecture. In embodiments of this application, an Android system with a layered architecture is used as an example to describe a software structure of the terminal device 100.

Figure 22:
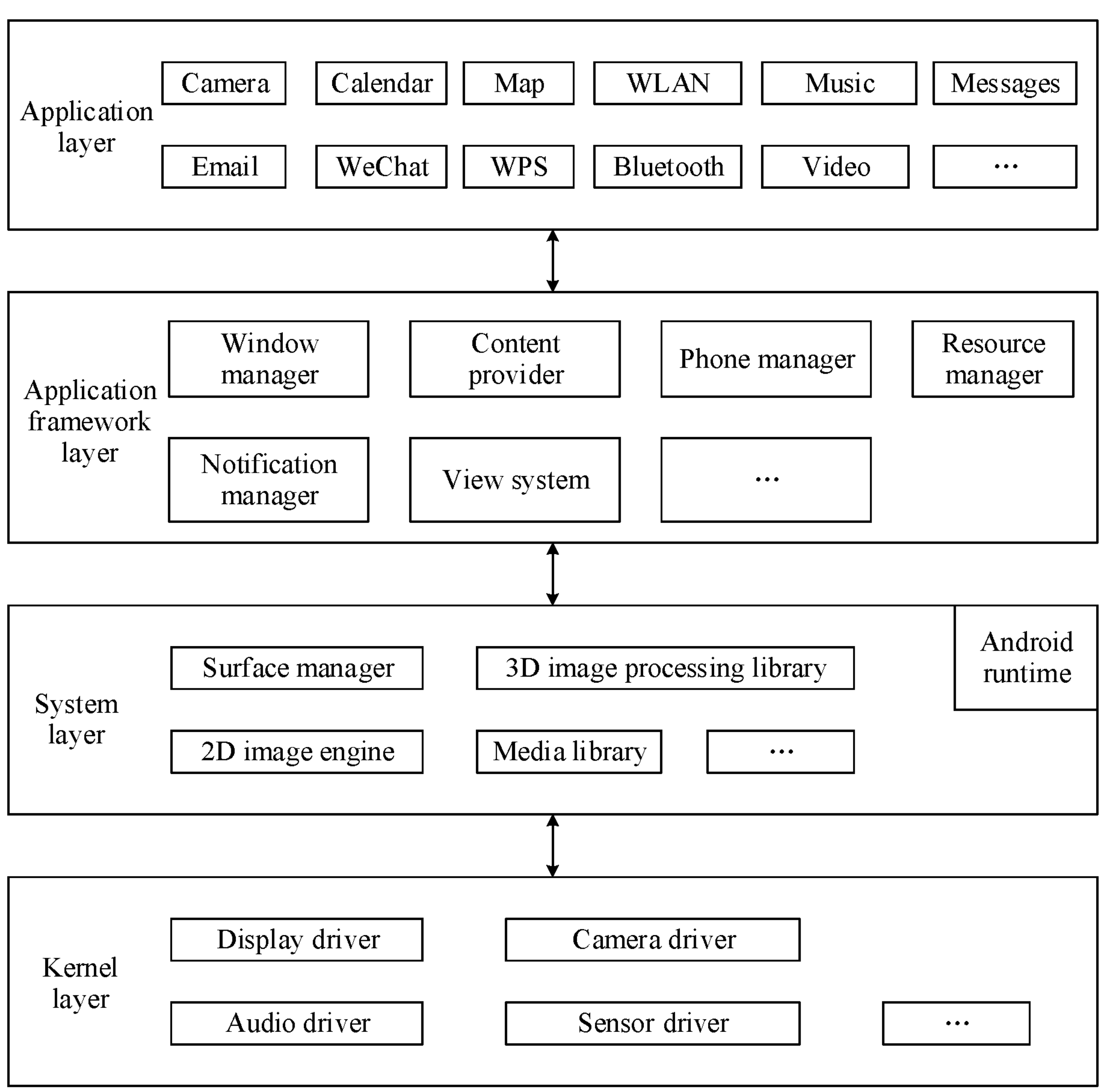
FIG. 22 is a block diagram of a software structure of a terminal device according to an embodiment of this application.

FIG. 22 is a block diagram of a software structure of a terminal device according to an embodiment of this application.

In a layered architecture, software is divided into several layers. Each layer has a clear role and task. The layers communicate with each other through a software interface. In some embodiments, the Android system is divided into four layers: an application layer, an application framework layer, an Android runtime system layer, and a kernel layer from top to bottom.

The application layer may include a series of application packages.

As shown in FIG. 22, the application packages may include applications such as Camera, Calendar, Map, WLAN, Bluetooth, Music, Video, Messages, Email, WeChat, and WPS.

The application framework layer provides an application programming interface (API) and a programming framework for an application at the application layer. The application framework layer includes some predefined functions.

As shown in FIG. 22, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessible to an application. The data may include a video, an image, audio, calls that are made and answered, a browsing history and bookmarks, a phone book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the terminal device, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without a user interaction. For example, the notification manager is configured to notify download completion, give a message notification, and the like. The notification manager may be alternatively a notification that appears in a top status bar of the system in a form of a graph or a scroll bar text, for example, a notification of an application run in the background, or may be a notification that appears on the screen in a form of a dialog window. For example, text information is displayed in the status bar, a prompt tone is given, the terminal device vibrates, or an indicator light blinks.

Android runtime includes a kernel library and a virtual machine. Android runtime is responsible for scheduling and management of the Android system.

The kernel library includes two parts: a function that needs to be invoked in Java language and a kernel library of Android.

The application layer and the application framework layer are run on the virtual machine. The virtual machine executes Java files of the application layer and the application framework layer as binary files. The virtual machine is configured to implement functions such as object lifecycle management, stack management, thread management, security and exception management, and garbage collection.

The system layer may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal device 100 with reference to a photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and recognizes a control corresponding to the input event. For example, the touch operation is a single-tap operation, and a control corresponding to the single-tap operation is a control of a camera application icon. A camera application invokes an interface of the application framework layer, to start the camera application. Then, the camera driver is started by invoking the kernel layer, and a static image or a video is captured by using the camera 193.

Figure 23:
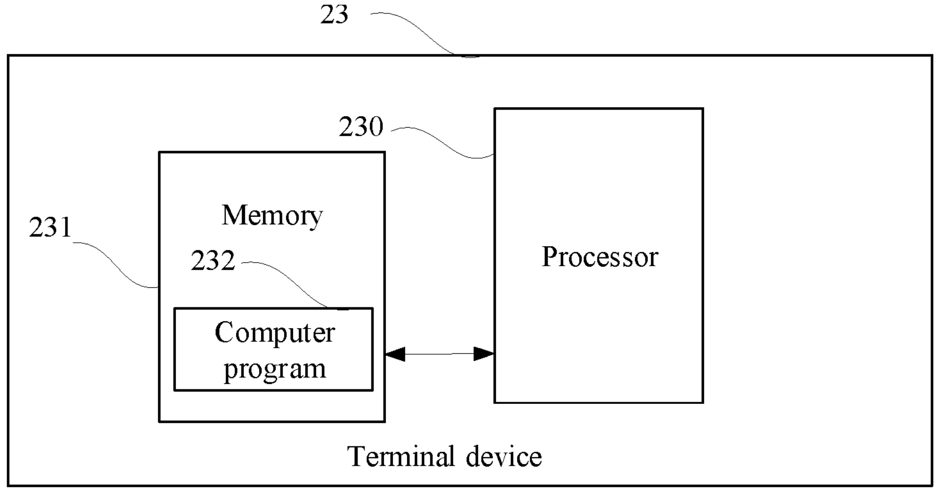
FIG. 23 is a block diagram of a structure of a terminal device according to an embodiment of this application.

FIG. 23 is a schematic diagram of a structure of a terminal device according to an embodiment of this application. As shown in FIG. 23, the terminal device 23 in this embodiment includes: at least one processor 230 (FIG. 23 shows only one processor), a memory 231, and a computer program 232 that is stored in the memory 231 and that can be run on the at least one processor 230. When executing the computer program 232, the processor 230 implements the steps in any of the foregoing cross-device navigation task synchronization method embodiments.

The terminal device 23 may be a computing device such as a desktop computer, a notebook computer, a palmtop computer, or a cloud server. The terminal device may include but is not limited to the processor 230 and the memory 231. Persons skilled in the art may understand that FIG. 23 is merely an example of the terminal device 23, and does not constitute a limitation on the terminal device 23. The terminal device 23 may include more or fewer components than those shown in the figure, or some components may be combined, or different components may be used. For example, the terminal device 23 may further include an input/output device or a network access device.

The processor 230 may be a central processing unit (CPU). The processor 230 may be alternatively another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

In some embodiments, the memory 231 may be an internal storage unit of the terminal device 23, for example, a hard disk drive or internal storage of the terminal device 23. In some other embodiments, the memory 231 may be alternatively an external storage device of the terminal device 23, for example, a plug-in hard disk, a smart media card (SMC), a secure digital (SD) card, or a flash card that is provided on the terminal device 23. Further, the memory 231 may include both the internal storage unit and the external storage device that are of the terminal device 23. The memory 231 is configured to store an operating system, an application, a bootloader, data, another program, and the like, for example, program code of the computer program. The memory 231 may be further configured to temporarily store data that has been output or that is to be output.

It should be noted that content such as information exchange between the foregoing apparatuses/units and the execution processes thereof is based on a same concept as the method embodiments of this application. For specific functions and technical effect of the content, refer to the method embodiments. Details are not described herein again.

Persons skilled in the art may clearly understand that, for the purpose of convenient and brief description, division into the foregoing function units or modules is merely used as an example for description. In actual application, the foregoing functions may be allocated to different function units or modules for implementation according to a requirement. In other words, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units or modules in the foregoing system, refer to a corresponding process in the foregoing method embodiments. Details are not described herein again.

An embodiment of this application further provides a terminal device. The terminal device includes at least one processor, a memory, and a computer program that is stored in the memory and that can be run on the at least one processor. When executing the computer program, the processor implements the steps in any one of the foregoing method embodiments.

An embodiment of this application further provides a computer-readable storage medium. The computer-readable storage medium stores a computer program. When the computer program is executed by a processor, the steps in the foregoing method embodiments can be implemented.

An embodiment of this application provides a computer program product. When the computer program product is run on a mobile terminal, the mobile terminal is enabled to implement the steps in the foregoing method embodiments when executing the computer program product.

When an integrated unit is implemented in a form of a software function unit and sold or used as an independent product, the integrated unit may be stored in a computer-readable storage medium. Based on such an understanding, all or some of the procedures in the method embodiments of this application may be implemented by a computer program instructing related hardware. The computer program may be stored in a computer-readable storage medium. When the computer program is executed by a processor, the steps in the foregoing method embodiments can be implemented. The computer program includes computer program code. The computer program code may be in a source code form, an object code form, an executable file form, some intermediate forms, or the like. The computer-readable medium may include at least any entity or apparatus that can carry computer program code to a photographing apparatus/terminal device, a recording medium, a computer memory, a read-only memory (ROM), a random access memory (RAM), an electrical carrier signal, a telecommunication signal, and a software distribution medium, for example, a USB flash drive, a removable hard disk, a magnetic disk, or an optical disc. In some jurisdictions, the computer-readable medium cannot be the electrical carrier signal or the telecommunication signal according to legislation and patent practices.

In the foregoing embodiments, the description of each embodiment has respective focuses. For a part that is not described in detail or recorded in an embodiment, refer to the related description in other embodiments.

Persons of ordinary skill in the art may be aware that, in combination with examples described in embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus/network device embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be at one location or may be distributed on a plurality of network units. Some or all of the units may be selected according to actual requirements to achieve the objectives of the solutions of embodiments.

The foregoing embodiments are merely intended to describe the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application. These modifications and replacements shall fall within the protection scope of this application.

What is claimed is:

1. A synchronization method for a cross-device navigation task performed by a first terminal, comprising:

obtaining navigation data from a first navigation application through a first navigation transfer module in response to determining that a preset cross-device transmission condition is satisfied;

generating, through the first navigation transfer module, navigation synchronization information corresponding to the navigation data, wherein the navigation synchronization information is converted from the navigation data by the first navigation transfer module into a format compatible with the first navigation application and a second navigation application that is different from the first navigation application; and sending, to a second terminal, the navigation synchronization information for updating a navigation task of the second navigation application in the second terminal, wherein the navigation synchronization information is formatted for cross-application compatibility between the first navigation application and the second navigation application, and wherein the second navigation application uses the navigation synchronization information to continue the navigation task initiated by the first navigation application.

2. The synchronization method according to claim 1, wherein the obtaining navigation data from a first navigation application comprises:

in response to a touch operation with the second terminal, receiving a communication label sent by a second near field communication module of the second terminal, wherein the communication label comprises a navigation task synchronization start identifier; and in response to the communication label, starting the first navigation transfer module, and obtaining the navigation data from the first navigation application through the first navigation transfer module.

3. The synchronization method according to claim 2, wherein the communication label is obtained after the second terminal sends a label write request to a label service thread through a second navigation transfer module when the second terminal detects that a label write condition is satisfied, responds to the label write request through the label service thread, adds the navigation task synchronization start identifier to the communication label, and writes the communication label to the second near field communication module.

4. The synchronization method according to claim 1, wherein the obtaining navigation data from a first navigation application comprises:

receiving a navigation transfer notification sent by the second terminal, wherein after the second terminal is connected to the first terminal, the navigation transfer notification is sent to the first terminal in response to detecting that a second navigation transfer module of the second terminal is in an on state; and obtaining the navigation data from the first navigation application through the first navigation transfer module in response to the navigation transfer notification.

5. The synchronization method according to claim 4, wherein before the receiving a navigation transfer notification sent by the second terminal, the method further comprises:

receiving a wake-up instruction sent by the second terminal through a second near field communication module; and sending a wireless connection request to the second terminal in response to the wake-up instruction, to establish a communication connection to the second terminal.

6. The synchronization method according to claim 1, wherein the first terminal is an intelligent vehicle control terminal mounted on a vehicle, and the second terminal is a user device; and wherein the obtaining navigation data from a first navigation application comprises:

establishing a near field communication connection to send the navigation synchronization information to the second terminal in response to detecting that the vehicle is parking;

obtaining a navigation synchronization application list;

obtaining a setting status of the first navigation transfer module in response to determining that the navigation synchronization application list is not empty; and obtaining the navigation data from the first navigation application through the first navigation transfer module if the first navigation transfer module is in an on state.

7. The synchronization method according to claim 6, wherein the establishing a near field communication connection to the second terminal comprises:

determining a connection status of each registered terminal in a preset registered device list through a second navigation transfer module; and in response to determining that the second terminal is in the preset registered device list and the connection status of the second terminal is a connectable state, establishing the near field communication connection to the second terminal based on connection information associated with the second terminal in the preset registered device list; or in response to determining that the second terminal is not in the preset registered device list, or the second terminal is in the preset registered device list and the connection status of the second terminal is an unconnectable state, sending a wake-up instruction to the second terminal through a first near field communication module for enabling the second terminal to establish the near field communication connection to the first terminal.

8. The synchronization method according to claim 6, wherein the obtaining navigation data from a first navigation application through a first navigation transfer module comprises:

generating a navigation task through the first navigation application in response to a navigation operation, wherein the navigation data is generated based on the navigation task;

receiving, through the first navigation transfer module from the first navigation application, a service registration instruction for authorizing the first navigation application to have permission to transmit navigation data between devices; and in response to the service registration instruction:

adding the first navigation application to the navigation synchronization application list; and setting the first navigation transfer module to the on state, wherein the on state is used to send, to the second terminal, the navigation synchronization information generated based on the first navigation application in response to determining that the preset cross-device transmission condition is satisfied.

9. The synchronization method according to claim 7, wherein after the sending the navigation synchronization information to a second terminal, the method further comprises:

receiving navigation synchronization complete information fed back by the second terminal through the second navigation transfer module; and transmitting, to the first navigation application through the first navigation transfer module in response to the navigation synchronization complete information, an end instruction to end the navigation task of the first navigation application.

10. The synchronization method according to claim 1, wherein before the sending the navigation synchronization information to a second terminal, the method further comprises:

obtaining a navigation application list of the second terminal, wherein the navigation application list comprises the second navigation application; and sending the navigation synchronization information to the second terminal in response to determining that a navigation application matching the first navigation application exists in the navigation application list, wherein the navigation application matching the first navigation application is an application that has permission to implement cross-device navigation data transmission with the first navigation application.

11. A synchronization method for a cross-device navigation task performed by a second terminal, comprising:

receiving navigation synchronization information sent by a first terminal, wherein the navigation synchronization information is generated based on navigation data of a first navigation application in the first terminal, and wherein the navigation synchronization information is converted from the navigation data by the first navigation transfer module into a format compatible with the first navigation application and a second navigation application that is different from the first navigation application;

transmitting the navigation synchronization information to a second navigation application through a second navigation transfer module; and updating a navigation task of the second navigation application based on the navigation synchronization information, wherein the navigation synchronization information is formatted for cross-application compatibility between the first navigation application and the second navigation application, and wherein the second navigation application uses the navigation synchronization information to continue the navigation task initiated by the first navigation application.

12. The synchronization method according to claim 11, wherein the receiving navigation synchronization information sent by a first terminal comprises:

sending a communication label to the first terminal through a second near field communication module in response to a touch operation with the first terminal, so that the first terminal starts a first navigation transfer module and obtains the navigation data from the first navigation application through the first navigation transfer module in response to the communication label, wherein the communication label comprises a navigation task synchronization start identifier; and receiving the navigation synchronization information sent by the first terminal through the first navigation transfer module.

13. The synchronization method according to claim 12, wherein before the sending a communication label to the first terminal through a second near field communication module in response to a touch operation with the first terminal, the method further comprises:

sending a label write request to a label service thread through the second navigation transfer module in response to determining that a preset label write condition is satisfied; and in response to the label write request through the label service thread, adding the navigation task synchronization start identifier to the communication label, and writing the communication label to the second near field communication module.

14. The synchronization method according to claim 12, wherein after the updating a navigation task of the second navigation application, the method further comprises:

sending navigation synchronization complete information to the first terminal, so that the first terminal transmits, to the first navigation application through the first navigation transfer module in response to the navigation synchronization complete information, an end instruction to end the navigation task of the first navigation application.

15. The synchronization method according to claim 11, wherein the second terminal is an intelligent vehicle control terminal mounted on a vehicle; and before the receiving navigation synchronization information sent by a first terminal, the method further comprises:

establishing a communication connection to the first terminal in response to a door opening event about the vehicle being detected;

obtaining a navigation synchronization application list;

obtaining a setting status of the second navigation transfer module in response to determining that the navigation synchronization application list is not empty; and sending a navigation transfer notification to the first terminal in response to determining that the second navigation transfer module is in an on state, so that the first terminal sends the navigation synchronization information.

16. The synchronization method according to claim 15, wherein the establishing a communication connection to the first terminal comprises:

determining a connection status of each registered terminal in a preset registered device list through the second navigation transfer module; and in response to determining that the first terminal is in the preset registered device list and the connection status of the first terminal is a connectable state, establishing the communication connection to the first terminal based on connection information associated with the first terminal in the preset registered device list; or in response to determining that the first terminal is not in the preset registered device list, or the first terminal is in the preset registered device list and the connection status of the first terminal is an unconnectable state, sending a wake-up instruction to the first terminal through a second near field communication module for enabling the first terminal to establish a near field communication connection to the second terminal.

17. The synchronization method according to claim 11, wherein the second terminal is a user device, and the first terminal is an intelligent vehicle control terminal mounted on a vehicle; and the transmitting the navigation synchronization information to a second navigation application comprises:

caching the navigation synchronization information in a cache region through the second navigation transfer module;

detecting a heartbeat signal of a communication connection to the first terminal; and in response to determining that the heartbeat signal is not received within a preset valid time;

determining that a near field communication connection to the first terminal is broken; and transmitting the navigation synchronization information to the second navigation application.

18. The synchronization method according to claim 11, wherein after the receiving navigation synchronization information sent by a first terminal, the method further comprises:

detecting whether a navigation application matching the first navigation application exists in a navigation application list, wherein the navigation application list comprises the first navigation application; and in response to detecting that the navigation application matching the first navigation application exists in the navigation application list:

using, as the second navigation application, the navigation application matching the first navigation application; and performing the transmitting the navigation synchronization information to the second navigation application through the second navigation transfer module, wherein the navigation application matching the first navigation application is an application that has permission to implement cross-device navigation data transmission with the second navigation application.

19. The synchronization method according to any one of claim 11, wherein the updating a navigation task of the second navigation application comprises:

determining a navigation destination based on the navigation synchronization information;

generating task update prompt information based on the navigation destination; and updating the navigation task based on the navigation destination in response to receiving an update confirmation instruction fed back based on the update prompt information.

20. An electronic device, comprising a memory, at least one processor, and a computer program that is stored in the memory for execution by the at least one processor to perform operations comprising:

obtaining navigation data from a first navigation application through a first navigation transfer module if a preset cross-device transmission condition is met;

generating, through the first navigation transfer module, navigation synchronization information corresponding to the navigation data, wherein the navigation synchronization information is converted from the navigation data by the first navigation transfer module into a format compatible with the first navigation application and a second navigation application that is different from the first navigation application; and sending the navigation synchronization information to a second terminal, wherein the navigation synchronization information is used to update a navigation task of a second navigation application in the second terminal, wherein the navigation synchronization information is formatted for cross-application compatibility between the first navigation application and the second navigation application, and wherein the second navigation application uses the navigation synchronization information to continue the navigation task initiated by the first navigation application.

* * * * *